US011868461B2

(12) United States Patent
McLachlan et al.

(10) Patent No.: US 11,868,461 B2
(45) Date of Patent: Jan. 9, 2024

(54) USER INTERFACES FOR SHARING AN ACCOUNT WITH ANOTHER USER IDENTITY

(71) Applicant: Apple Inc., Cupertino, CA (US)

(72) Inventors: Mischa McLachlan, San Francisco, CA (US); Steven Eastcott, Mountain View, CA (US); Brian Jett, San Francisco, CA (US); Katie McIndoe, San Jose, CA (US); Thomas John Miller, San Jose, CA (US); Ashish Chandrakant Nagre, Sunnyvale, CA (US); Rachel Reddy, Morris Plains, NJ (US); Marcel Van Os, Santa Cruz, CA (US); Vinay Venkatesh, San Jose, CA (US); Haya Iris Villanueva Gaviola, San Jose, CA (US); Nicole Marie Weaver, Chesterfield, VA (US); Jennifer Bailey, Los Altos Hills, CA (US); Corey Fugman, Saratoga, CA (US); Richard Heard, San Francisco, CA (US); Akila Suresh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/395,251

(22) Filed: Aug. 5, 2021

(65) Prior Publication Data
US 2022/0245232 A1     Aug. 4, 2022

Related U.S. Application Data

(60) Provisional application No. 63/144,436, filed on Feb. 1, 2021.

(51) Int. Cl.
*G06F 21/44* (2013.01)
*G06Q 20/22* (2012.01)
(Continued)

(52) U.S. Cl.
CPC .............. *G06F 21/44* (2013.01); *G06F 9/451* (2018.02); *G06Q 20/2295* (2020.05); *G06F 3/0482* (2013.01)

(58) Field of Classification Search
CPC ......... G06F 21/44; G06F 9/451; G06F 3/0482
See application file for complete search history.

(56) References Cited

U.S. PATENT DOCUMENTS 7,377,425 B1     5/2008   Ma et al.
7,922,098 B1     4/2011   Ma et al.
(Continued)

FOREIGN PATENT DOCUMENTS

WO     2019/214817 A1     11/2019

OTHER PUBLICATIONS

Office Action received for European Patent Application No. 22154216.0, dated Jul. 1, 2022, 9 pages.
(Continued)

*Primary Examiner* — Beau D Spratt
(74) *Attorney, Agent, or Firm* — DLA Piper LLP (US)

(57) ABSTRACT

The present disclosure generally relates to displaying a user interface for sharing an account associated with a first user identity with a second user identity. The user interface includes a first sharing option and a second sharing option. One or more inputs corresponding to a request to share the account are detected. If the one or more inputs include a selection of the first sharing option, a request to invite the second user identity to become a joint owner of the account is transmitted. If the one or more inputs include a selection of the second sharing option, a request to invite the second user identity to become a participant of the account without becoming a joint owner of the account is transmitted.

54 Claims, 39 Drawing Sheets

(51) Int. Cl.
    *G06F 9/451*     (2018.01)
    *G06F 3/0482*     (2013.01)

(56) References Cited

U.S. PATENT DOCUMENTS

| | | |
|---|---|---|
| 7,925,555 B2 | 4/2011 | Likas et al. |
| 8,112,262 B1 | 2/2012 | Michelsen |
| 8,326,679 B1 | 12/2012 | Rowe et al. |
| 8,827,153 B1 | 9/2014 | Rhoades et al. |
| 10,032,100 B2 | 7/2018 | Mullen et al. |
| 10,223,631 B2 | 3/2019 | Mullen et al. |
| 10,255,545 B2 | 4/2019 | Mullen et al. |
| 10,402,896 B1 * | 9/2019 | Lopez .................. G06Q 40/00 |
| 10,445,739 B1 * | 10/2019 | Sahni .................. G06Q 20/405 |
| 10,909,582 B1 | 2/2021 | Brandt et al. |
| 11,521,245 B1 | 12/2022 | Brandt et al. |
| 11,631,127 B1 | 4/2023 | Brandt et al. |
| 2009/0144143 A1 | 6/2009 | Iyer |
| 2010/0312696 A1 | 12/2010 | Sinha et al. |
| 2012/0197794 A1 * | 8/2012 | Grigg .................. G06Q 20/40 |
| | | 705/41 |
| 2013/0006848 A1 * | 1/2013 | Kuttuva .............. G06Q 20/3223 |
| | | 705/39 |
| 2014/0316941 A1 | 10/2014 | Mekala et al. |
| 2015/0012358 A1 | 1/2015 | Almendras Riesco |
| 2015/0073959 A1 * | 3/2015 | Connors .................. G06Q 40/00 |
| | | 705/35 |
| 2015/0095170 A1 | 4/2015 | Lang et al. |
| 2015/0317842 A1 | 11/2015 | Evans |
| 2015/0348032 A1 | 12/2015 | Ioveva et al. |
| 2016/0088036 A1 | 3/2016 | Corbin et al. |
| 2016/0358133 A1 | 12/2016 | Van Os et al. |
| 2016/0358134 A1 | 12/2016 | Van Os et al. |
| 2016/0358180 A1 | 12/2016 | Van Os et al. |
| 2017/0076265 A1 * | 3/2017 | Royyuru ................. G06Q 20/18 |
| 2018/0197238 A1 * | 7/2018 | Bergin .................. G06Q 20/389 |
| 2019/0109842 A1 * | 4/2019 | Kumar ................... G06Q 30/06 |
| 2020/0074099 A1 | 3/2020 | Felice-Steele et al. |
| 2020/0074541 A1 | 3/2020 | Finneran et al. |
| 2020/0076813 A1 | 3/2020 | Felice-Steele et al. |
| 2020/0265457 A1 * | 8/2020 | Miller .................. G06Q 20/382 |
| 2020/0322800 A1 | 10/2020 | Ozanian |
| 2020/0380972 A1 | 12/2020 | Carrigan et al. |
| 2021/0019156 A1 | 1/2021 | Carrigan |
| 2021/0373745 A1 | 12/2021 | Chang |
| 2021/0374709 A1 | 12/2021 | Suresh et al. |
| 2021/0374750 A1 | 12/2021 | Miller et al. |
| 2022/0005039 A1 | 1/2022 | Hires |
| 2022/0053333 A1 | 2/2022 | Ozanian |
| 2022/0270094 A1 | 8/2022 | Yeh et al. |
| 2023/0177497 A1 | 6/2023 | Takamatsu et al. |

OTHER PUBLICATIONS

European Search Report received for European Patent Application No. 22154216.0, dated Jun. 20, 2022, 4 pages.
Applicant-Initiated Interview Summary received for U.S. Appl. No. 17/726,405, dated Sep. 6, 2023, 8 pages.
Final Office Action received for U.S. Appl. No. 17/726,405, dated Sep. 21, 2023, 19 pages.
Non-Final Office Action received for U.S. Appl. No. 17/726,405, dated Aug. 7, 2023, 29 pages.

* cited by examiner

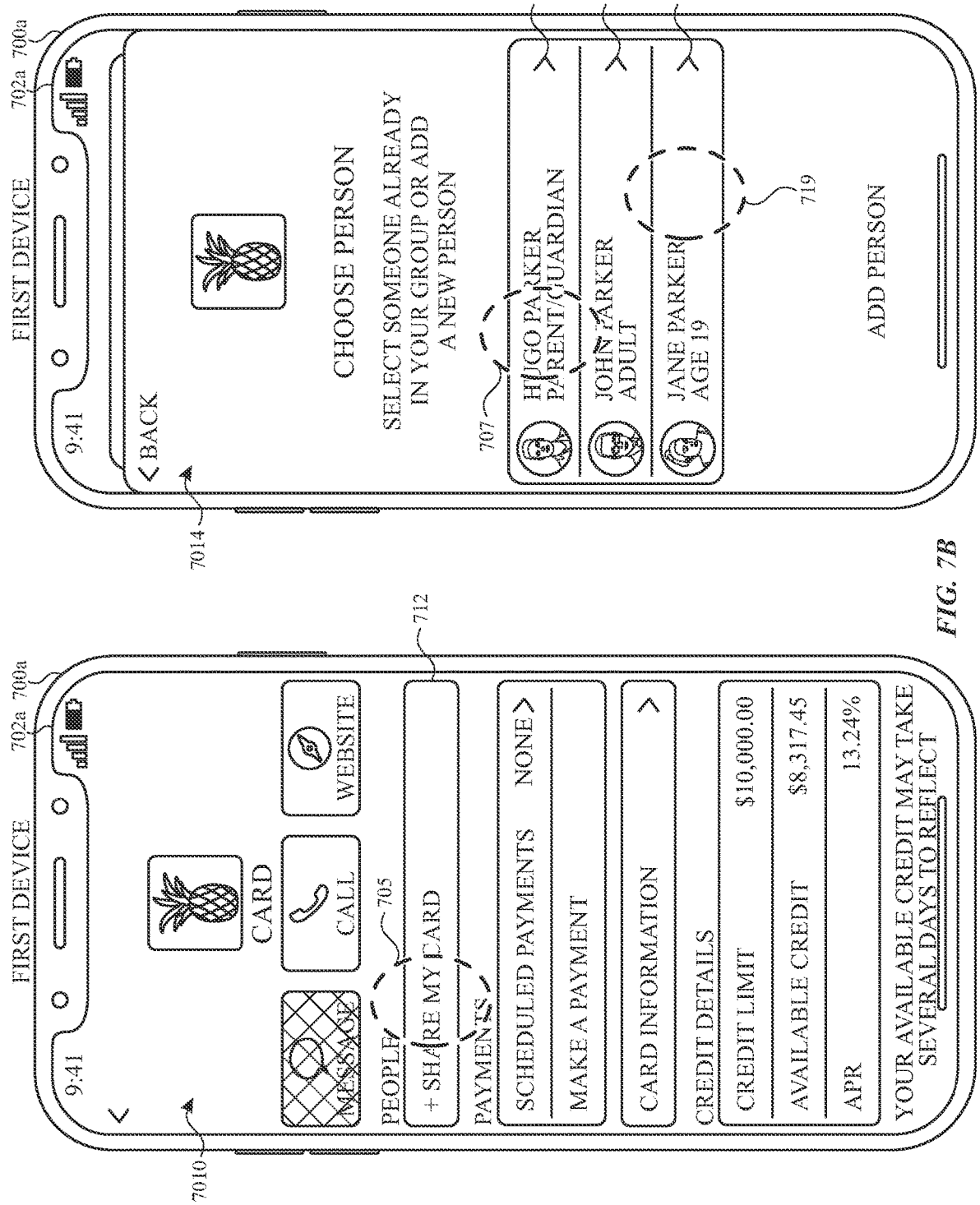

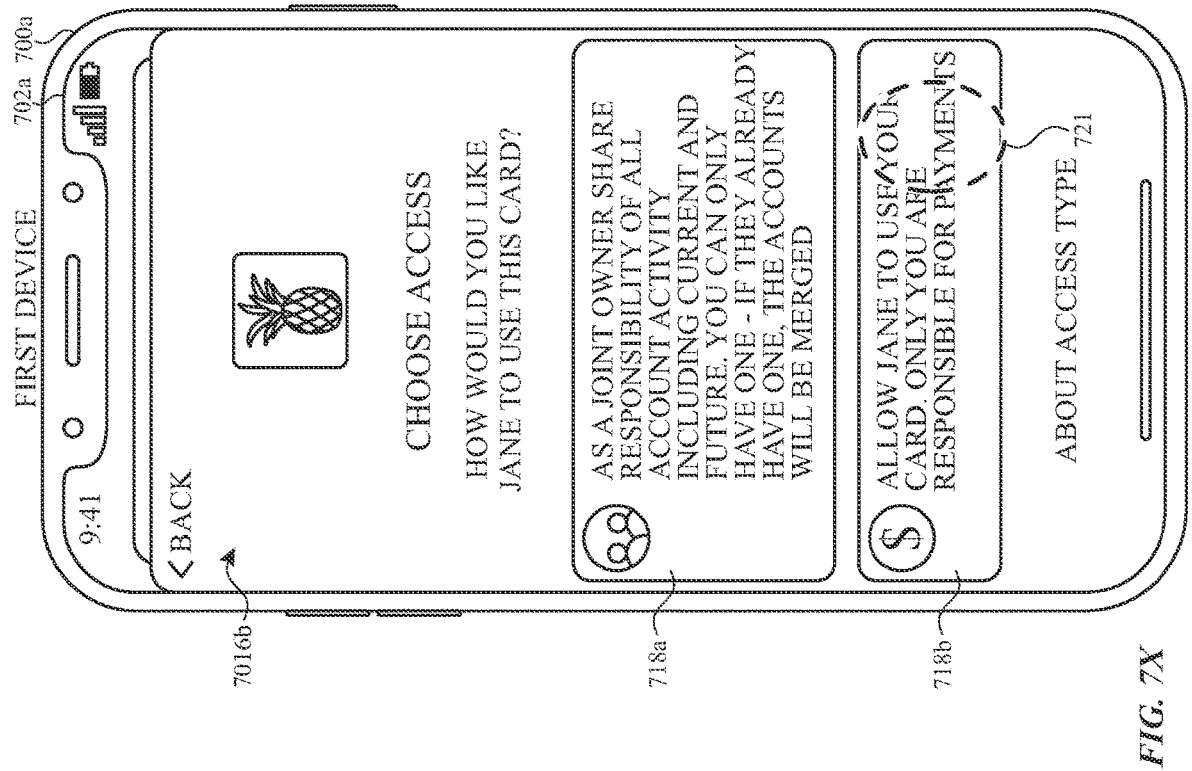

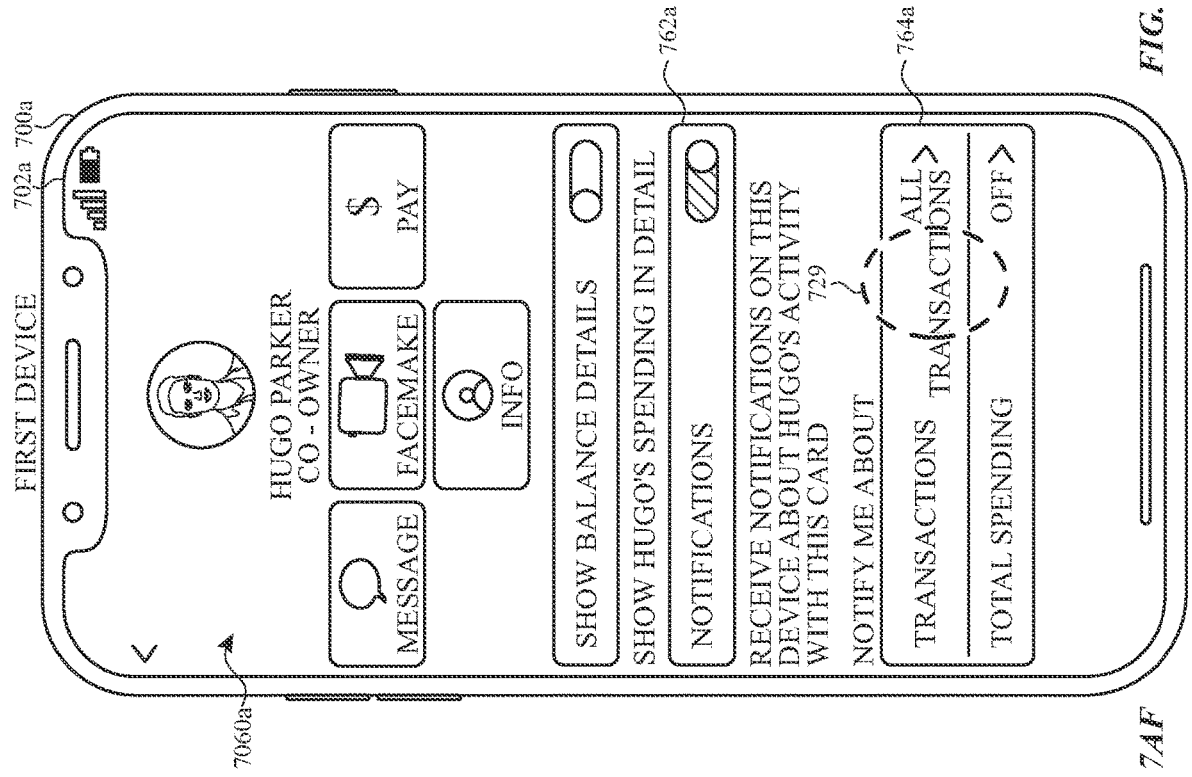
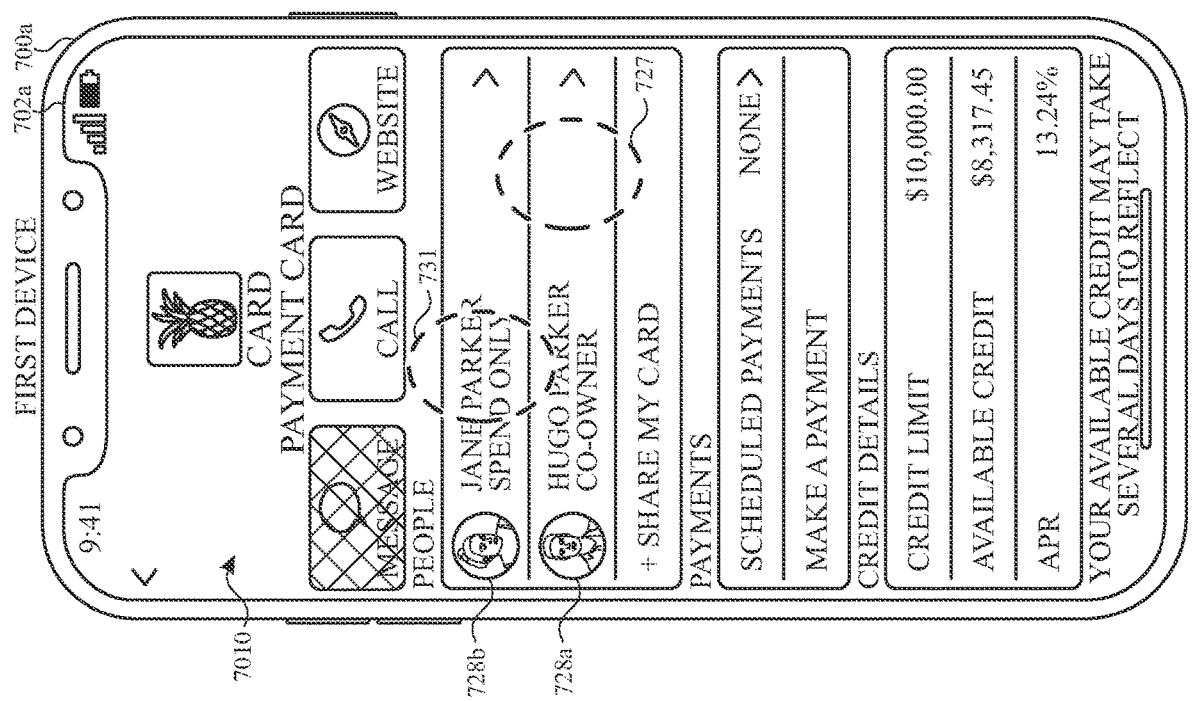

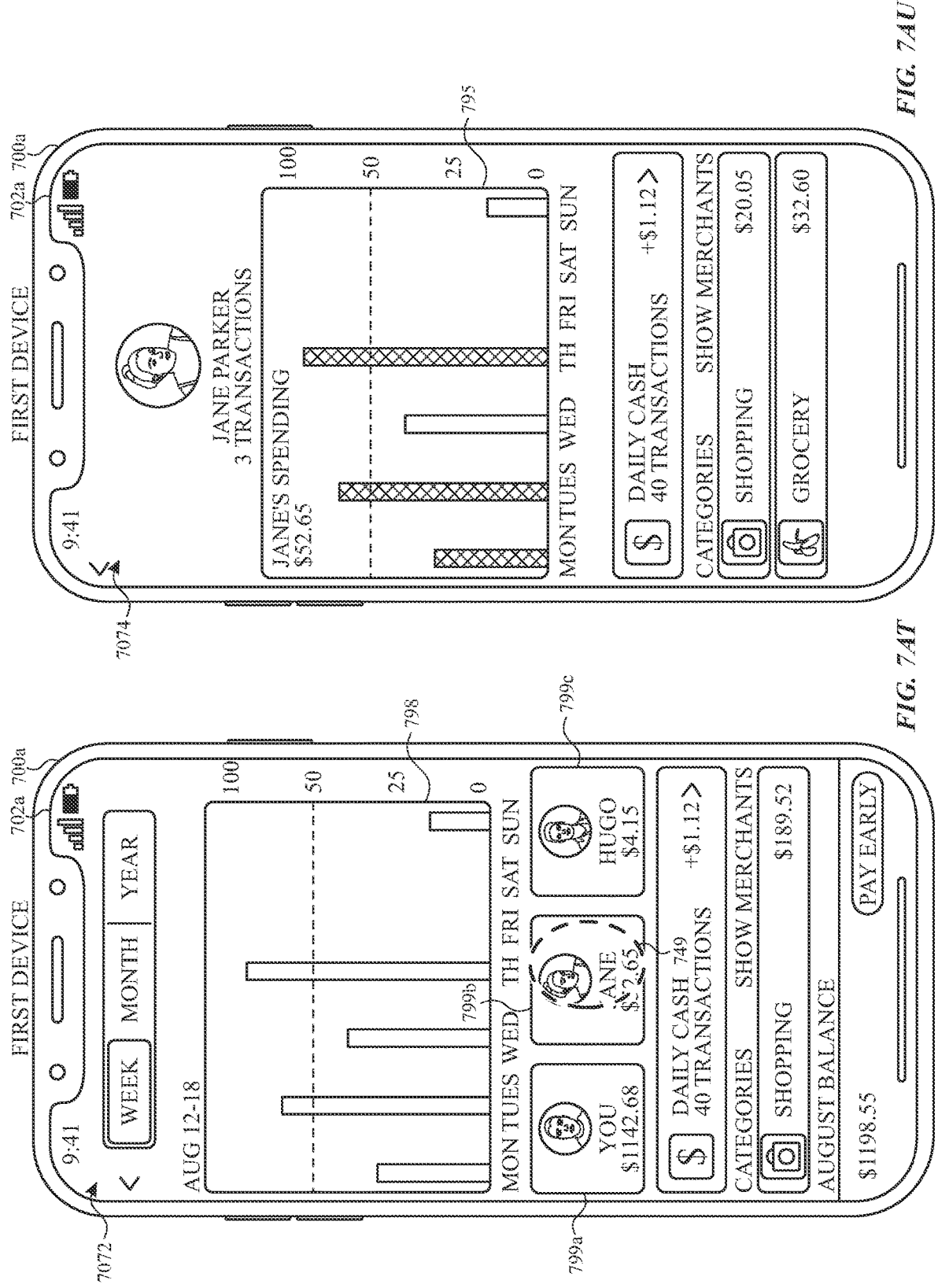

USER INTERFACES FOR SHARING AN ACCOUNT WITH ANOTHER USER IDENTITY

CROSS-REFERENCE TO RELATED APPLICATIONS

This application claims the benefit of U.S. Provisional Patent Application No. 63/144,436, entitled "USER INTERFACES FOR SHARING AN ACCOUNT WITH ANOTHER USER IDENTITY," filed Feb. 1, 2021, the contents of which is hereby incorporated by reference in its entirety.

FIELD

The present disclosure relates generally to computer user interfaces, and more specifically to user interfaces and techniques for sharing an account with another user identity.

BACKGROUND

A computer system can be used to configure various aspects of an account, such as an account provisioned on the computer system. Typically, the account is associated with a user of the computer system.

BRIEF SUMMARY

Some customary techniques for configuring an account using a computer system are generally cumbersome and inefficient. For example, some existing techniques are unable to share the account with another user identity. In addition, some existing techniques for configuring the account use a complex and time-consuming user interface, which may include multiple key presses or keystrokes. Thus, some existing techniques for configuring the account require more time than necessary, wasting user time and device energy. This latter consideration is particularly important in battery-operated devices.

Accordingly, the present technique provides computer systems with faster, more efficient methods and interfaces for configuring and sharing an account for use by another user identity. Such methods and interfaces optionally complement or replace other methods for configuring an account. Such methods and interfaces reduce the cognitive burden on a user and produce a more efficient human-machine interface. For battery-operated computing devices, such methods and interfaces conserve power and increase the time between battery charges.

Example methods are disclosed herein. An example method includes, at a computer system associated with a first user identity that is in communication with a display generation component and one or more input devices: displaying, via the display generation component, a user interface for sharing an account associated with the first user identity with a second user identity, the user interface including a first sharing option and a second sharing option; detecting, via the one or more input devices, one or more inputs corresponding to a request to share the account; and in response to detecting the one or more inputs corresponding to the request to share the account: in accordance with a determination that the one or more inputs include a selection of the first sharing option, transmitting a request to invite the second user identity to become a joint owner of the account; and in accordance with a determination that the one or more inputs include a selection of the second sharing option, transmitting a request to invite the second user identity to become a participant of the account without becoming a joint owner of the account.

Example non-transitory computer-readable storage media are described herein. An example non-transitory computer-readable storage medium stores one or more programs configured to be executed by one or more processors of a computer system associated with a first user identity that is in communication with a display generation component and one or more input devices, the one or more programs including instructions for: displaying, via the display generation component, a user interface for sharing an account associated with the first user identity with a second user identity, the user interface including a first sharing option and a second sharing option; detecting, via the one or more input devices, one or more inputs corresponding to a request to share the account; and in response to detecting the one or more inputs corresponding to the request to share the account: in accordance with a determination that the one or more inputs include a selection of the first sharing option, transmitting a request to invite the second user identity to become a joint owner of the account; and in accordance with a determination that the one or more inputs include a selection of the second sharing option, transmitting a request to invite the second user identity to become a participant of the account without becoming a joint owner of the account.

Example transitory computer-readable storage media are described herein. An example transitory computer-readable storage medium stores one or more programs configured to be executed by one or more processors of a computer system associated with a first user identity that is in communication with a display generation component and one or more input devices, the one or more programs including instructions for: displaying, via the display generation component, a user interface for sharing an account associated with the first user identity with a second user identity, the user interface including a first sharing option and a second sharing option; detecting, via the one or more input devices, one or more inputs corresponding to a request to share the account; and in response to detecting the one or more inputs corresponding to the request to share the account: in accordance with a determination that the one or more inputs include a selection of the first sharing option, transmitting a request to invite the second user identity to become a joint owner of the account; and in accordance with a determination that the one or more inputs include a selection of the second sharing option, transmitting a request to invite the second user identity to become a participant of the account without becoming a joint owner of the account.

Example computer systems are described herein. An example computer system associated with a first user identity includes a display generation component; one or more input devices; one or more processors; and memory storing one or more programs configured to be executed by the one or more processors, the one or more programs including instructions for: displaying, via the display generation component, a user interface for sharing an account associated with the first user identity with a second user identity, the user interface including a first sharing option and a second sharing option; detecting, via the one or more input devices, one or more inputs corresponding to a request to share the account; and in response to detecting the one or more inputs corresponding to the request to share the account: in accordance with a determination that the one or more inputs include a selection of the first sharing option, transmitting a request to invite the second user identity to become a joint owner of the account; and in accordance with a determination that the one or more inputs include a selection of the second sharing option, transmitting a request to invite the second user identity to become a participant of the account without becoming a joint owner of the account.

An example computer system associated with a first user identity includes a display generation component; one or more input devices; means for displaying, via the display generation component, a user interface for sharing an account associated with the first user identity with a second user identity, the user interface including a first sharing option and a second sharing option; means for detecting, via the one or more input devices, one or more inputs corresponding to a request to share the account; and means for, in response to detecting the one or more inputs corresponding to the request to share the account: in accordance with a determination that the one or more inputs include a selection of the first sharing option, transmitting a request to invite the second user identity to become a joint owner of the account; and in accordance with a determination that the one or more inputs include a selection of the second sharing option, transmitting a request to invite the second user identity to become a participant of the account without becoming a joint owner of the account.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, computer systems are provided with faster, more efficient methods and interfaces for configuring and sharing an account for use by another user identity, thereby increasing the effectiveness, efficiency, and user satisfaction with such computer systems. Such methods and interfaces may complement or replace other methods for configuring an account.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for computer systems that provide efficient methods and interfaces for sharing an account with another user identity. For example, there is a need for a user to share an account with a family member of the user (e.g., a child or spouse), where the user can select what account information and/or account funds are available to the family member. Such techniques can reduce the cognitive burden on the user who is sharing the account, thereby enhancing productivity. Such techniques can also reduce the need for resources (e.g., computer resources, such as memory), by enabling sharing of the resource among multiple users. Further, such techniques can reduce processor and battery power otherwise wasted on redundant user inputs.

Figure 6B:
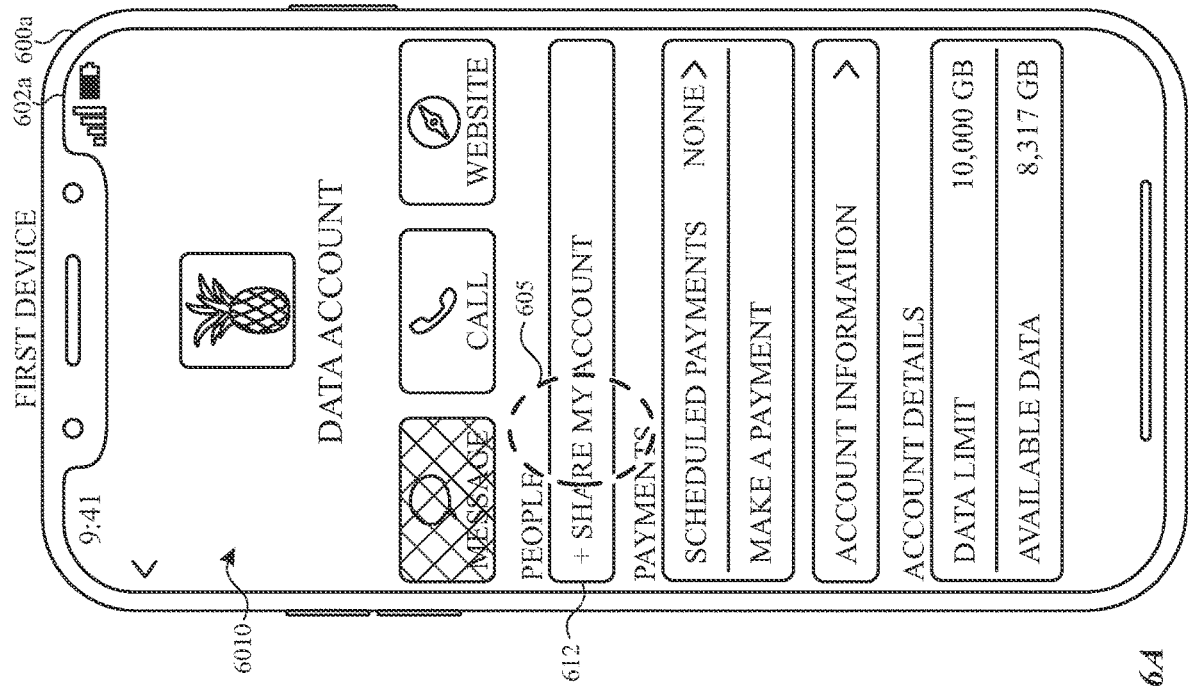
FIGS. 6A-6G illustrate exemplary user interfaces for sharing an account with a another user identity in accordance with some embodiments.
Figure 7A:
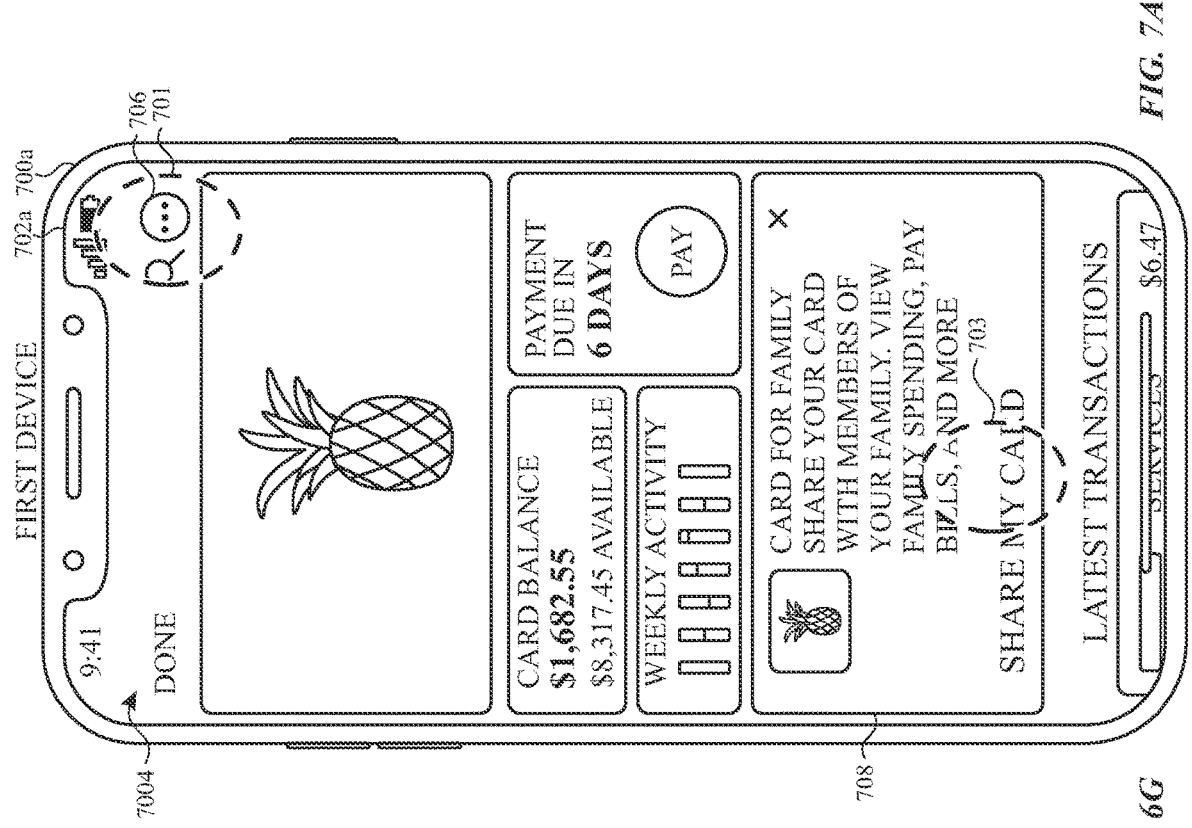
FIGS. 7A-7BA illustrate exemplary user interfaces for sharing an account with a another user identity and viewing/configuring the shared account in accordance with some embodiments.
Figure 7B:
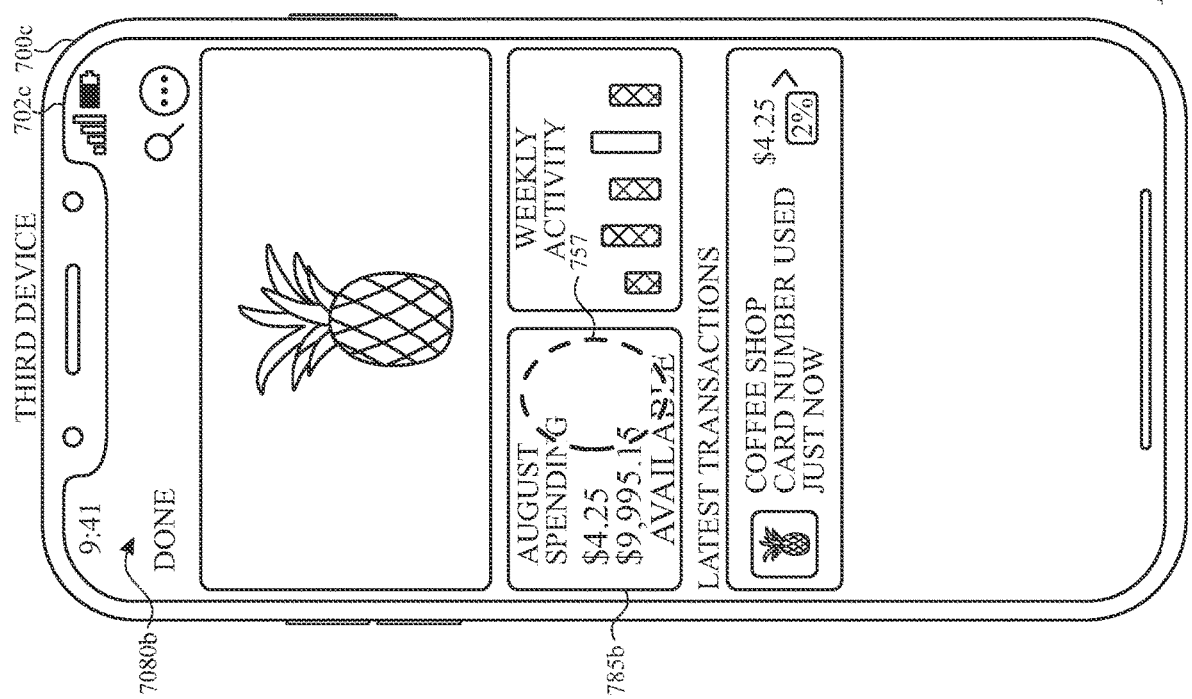
Figure 8:
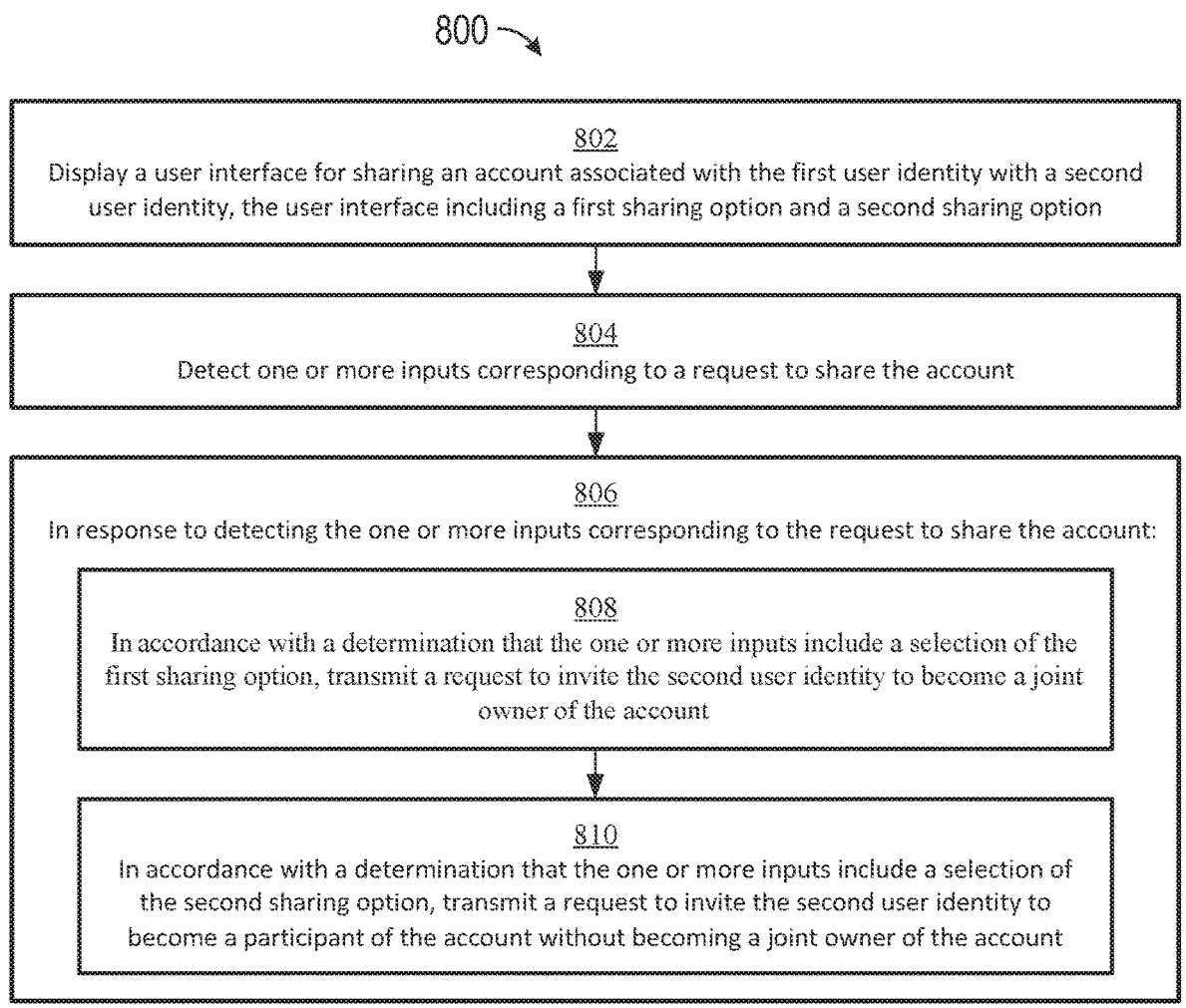
FIG. 8 is a flow diagram illustrating a method for sharing an account with another user identity using a computer system in accordance with some embodiments.

Below, FIGS. 1A-1B, 2, 3, 4A-4B, and 5A-5B provide a description of exemplary devices for performing the techniques for sharing an account with another user identity. FIGS. 6A-6G illustrate exemplary user interfaces for sharing an account with another user identity, in accordance with some embodiments. FIGS. 7A-7BA illustrate exemplary user interfaces for sharing an account with another user identity and viewing/configuring the shared account, in accordance with some embodiments. FIG. 8 is a flow diagram illustrating methods for sharing an account with another user identity, in accordance with some embodiments. The user interfaces in FIGS. 6A-6G and FIGS. 7A-7BA are used to illustrate the processes described below, including the processes in FIG. 8.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
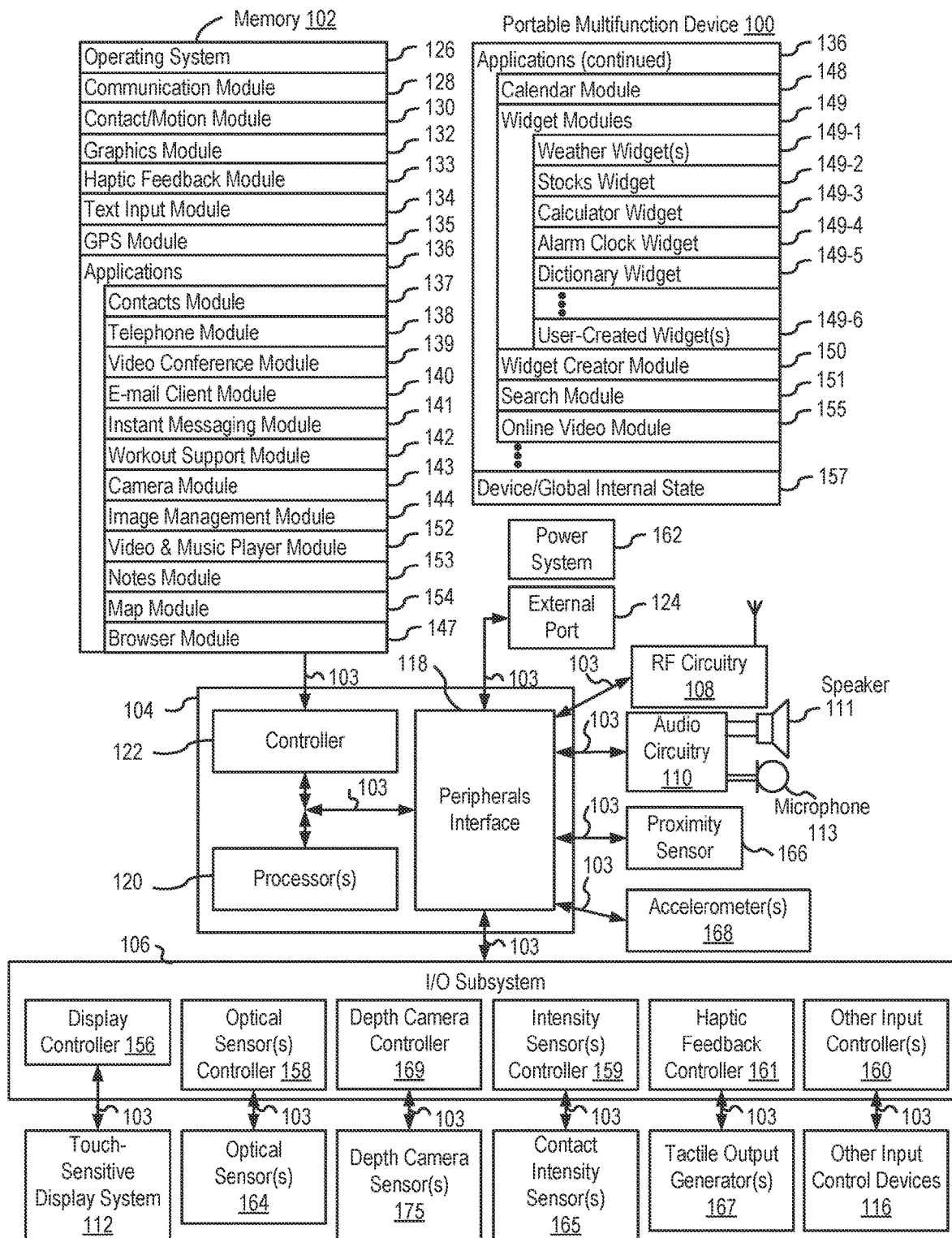
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S.

patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. Nos. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
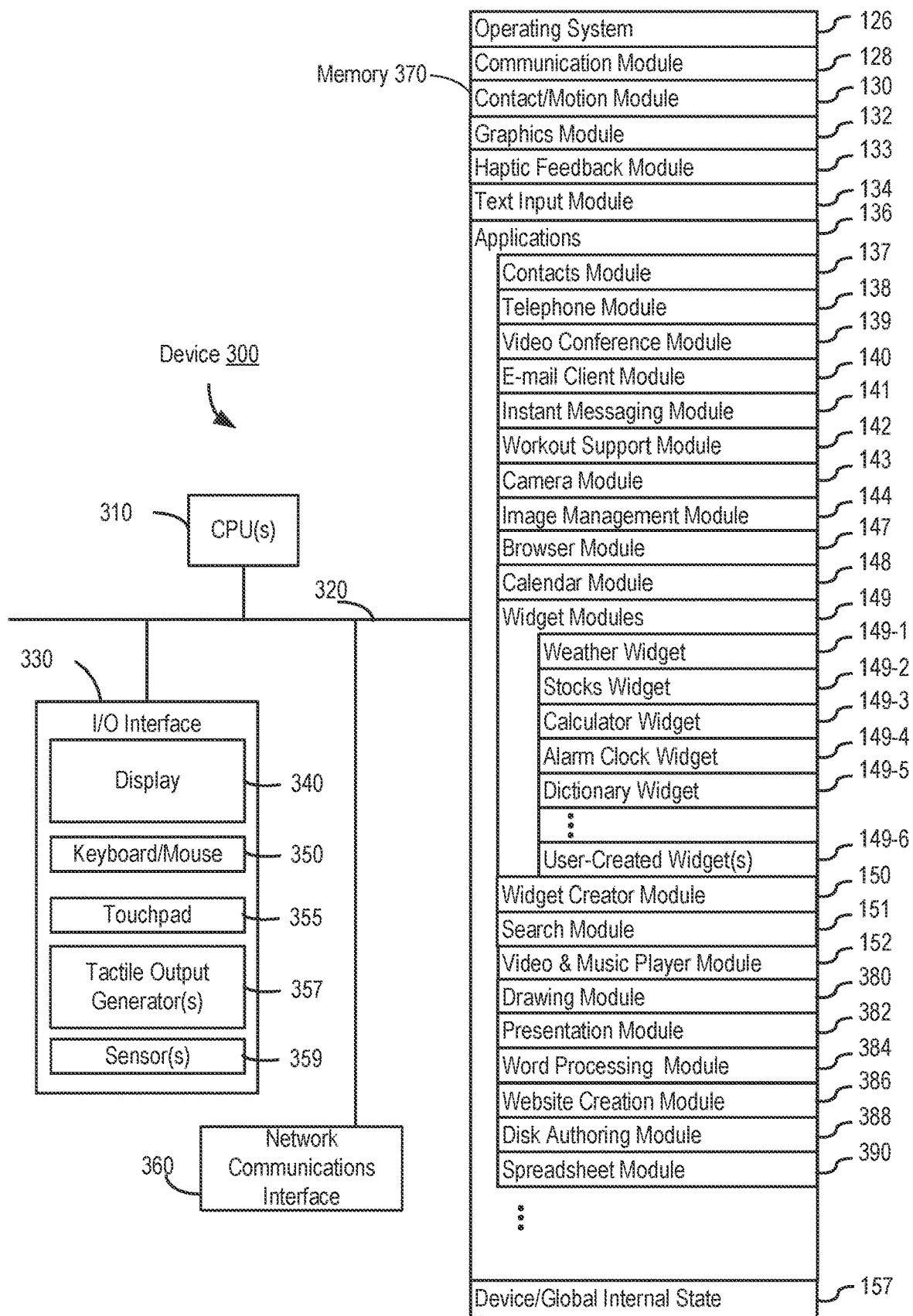
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
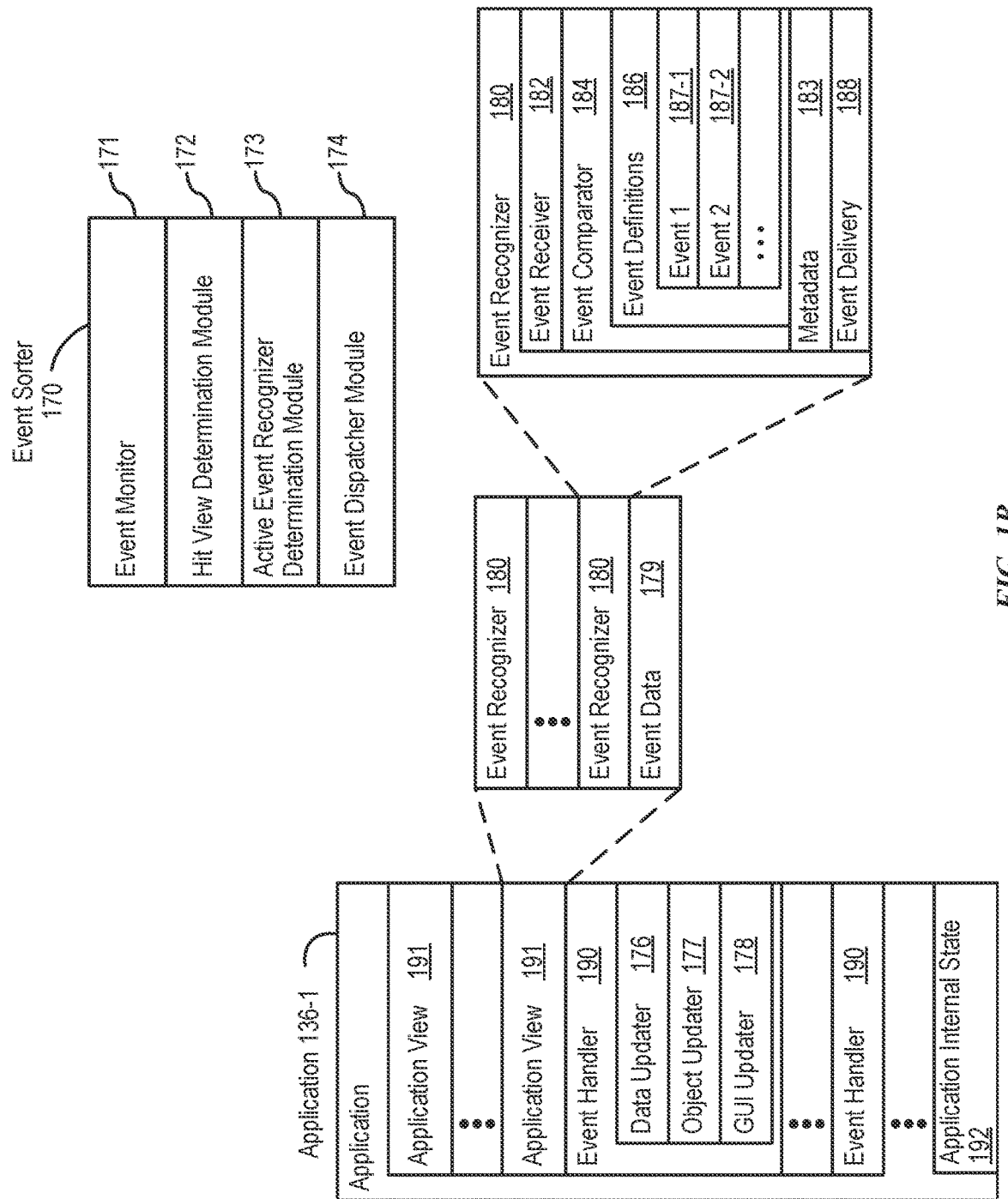
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
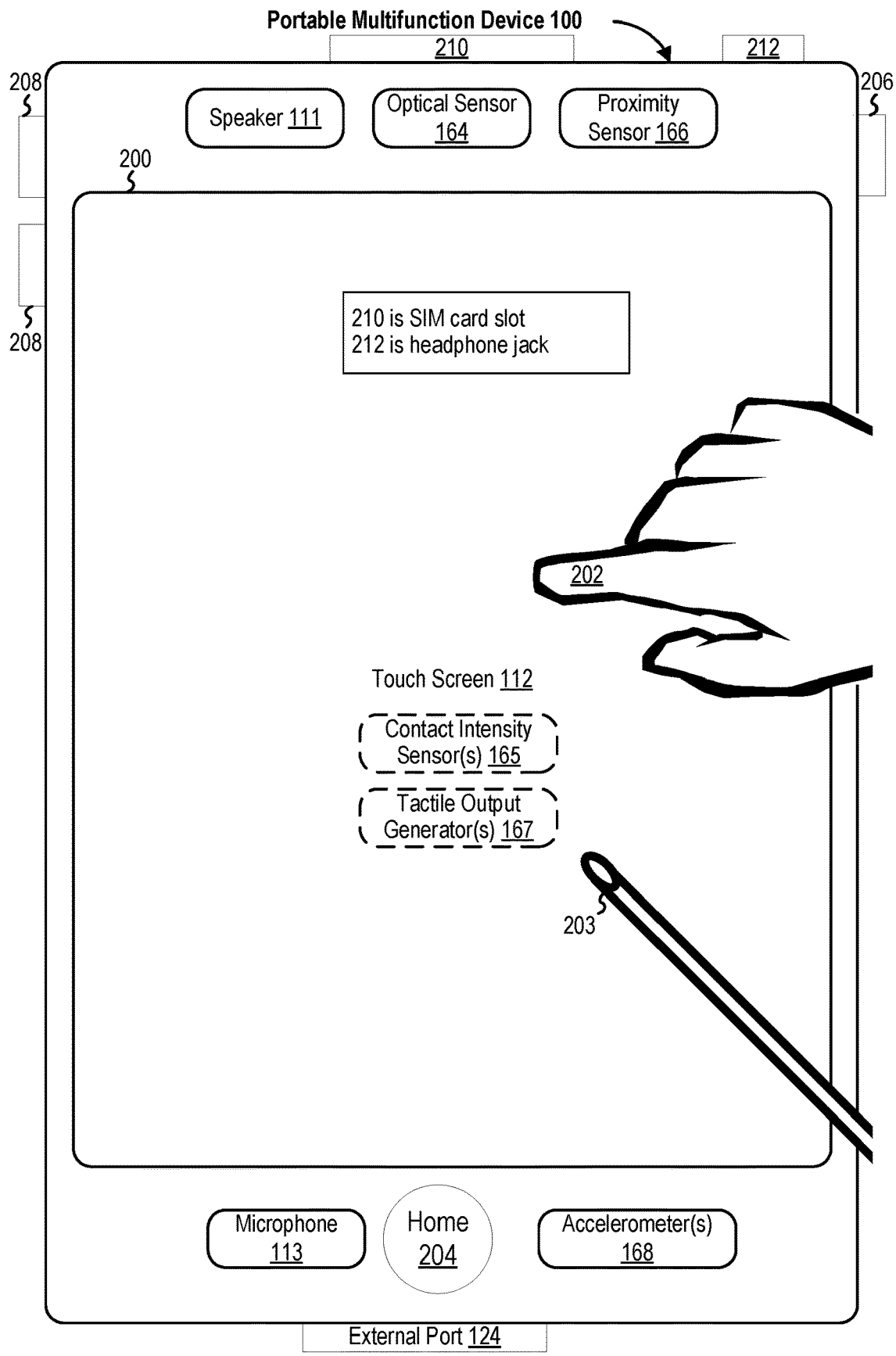
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100.

Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
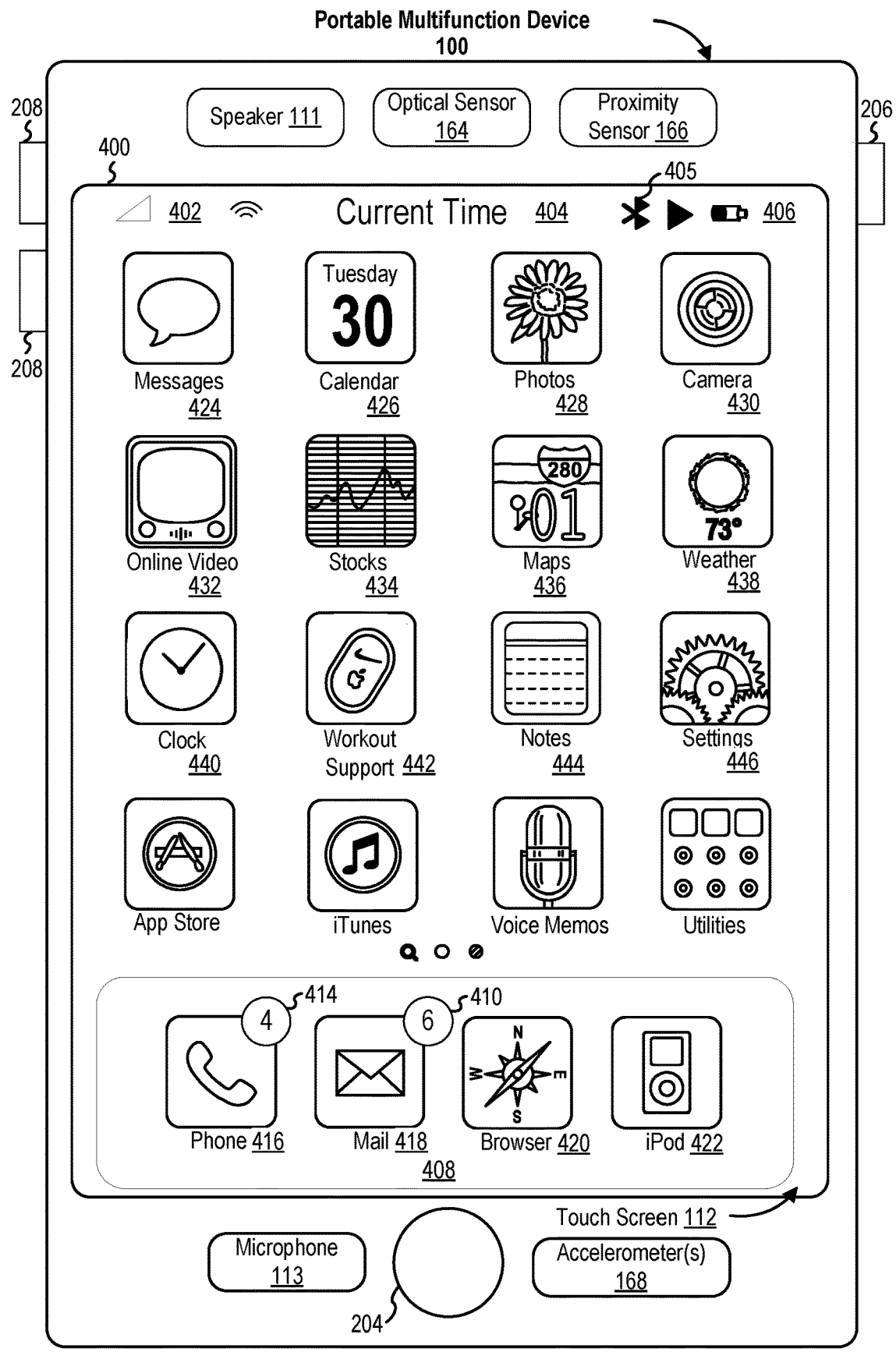
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
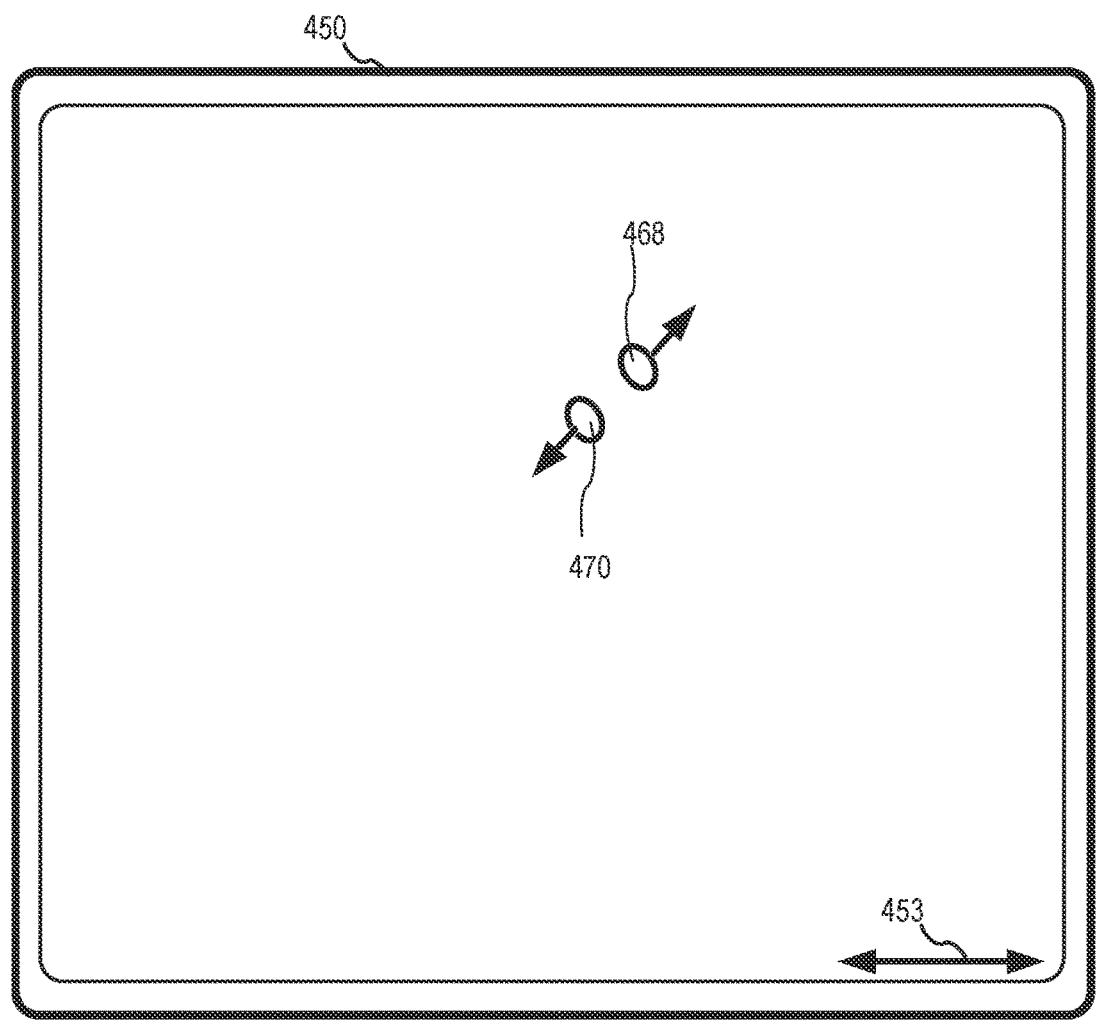
FIG. 4B illustrates an exemplary user interface for a multifunction device with a touch-sensitive surface that is separate from the display in accordance with some embodiments.
Figure 4B:
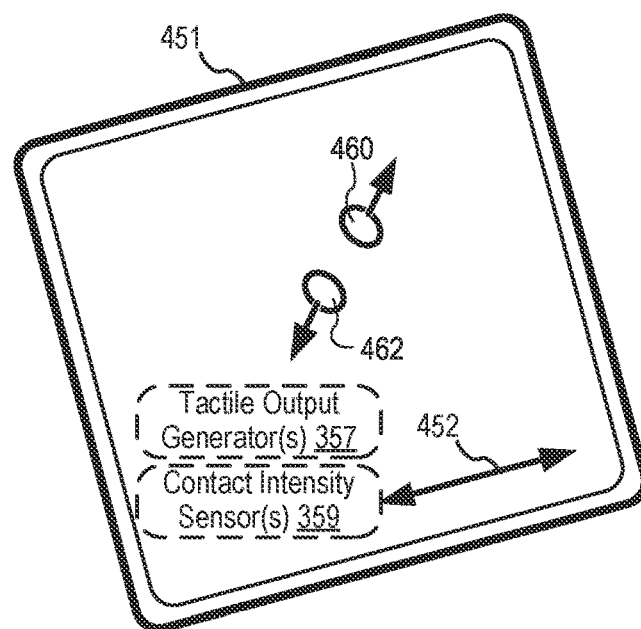

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
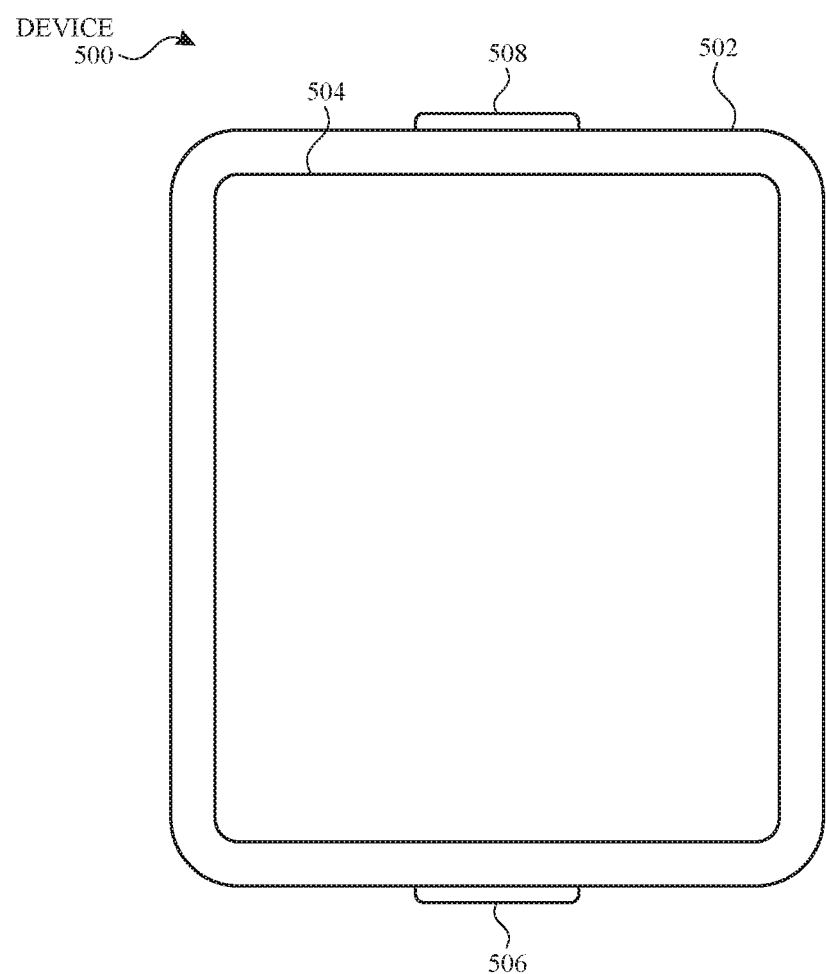
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
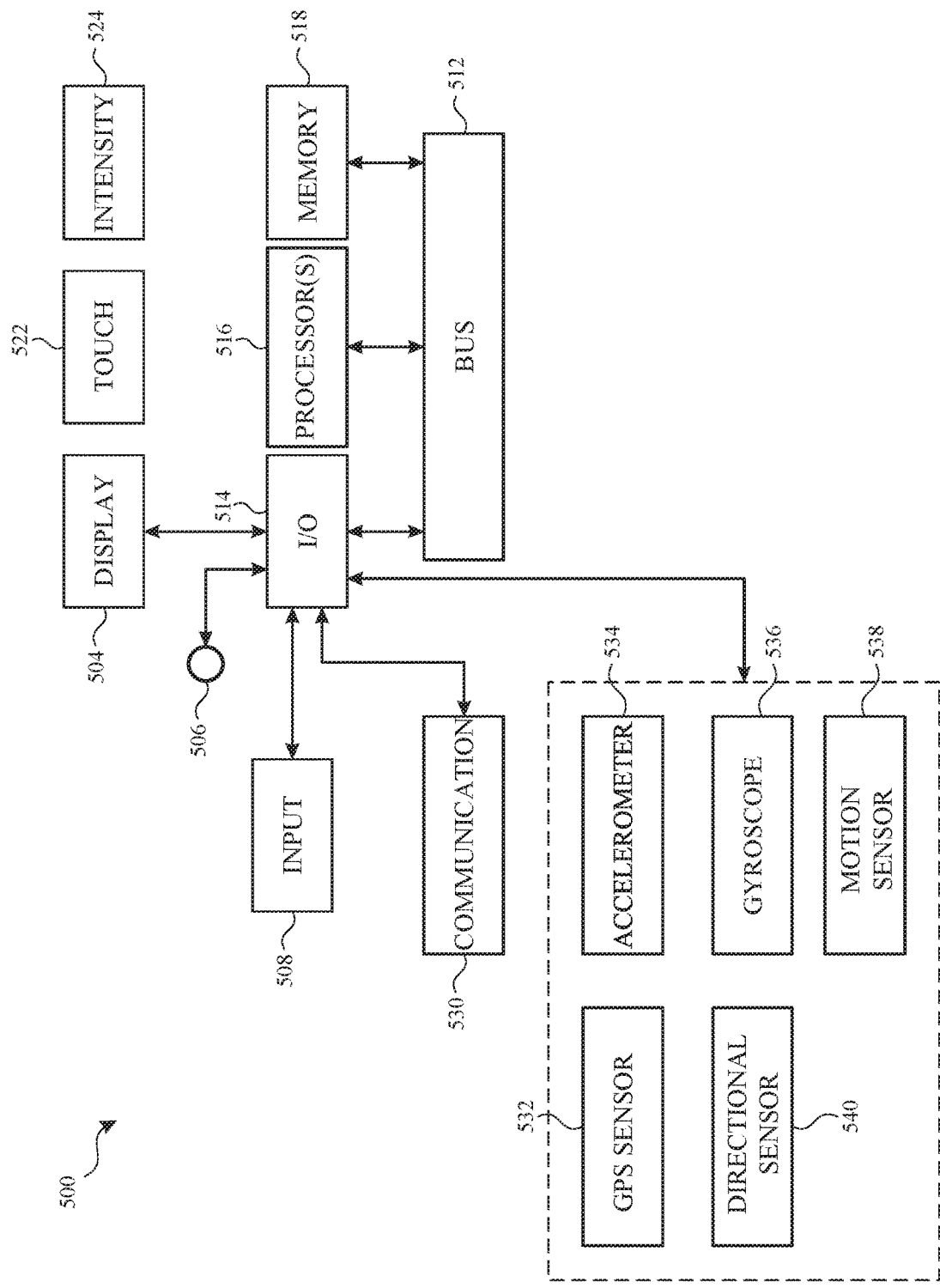
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 800 (FIG. 8). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, device 500, devices 600*a* and/or 600*b*, and devices 700*a* and/or 700*b*.

FIGS. 6A-6G illustrate exemplary user interfaces for sharing an account with another user identity, in accordance with some embodiments. The user interfaces in these figures are used to illustrate the processes described below, including the processes in FIG. 8.

Figure 6A:
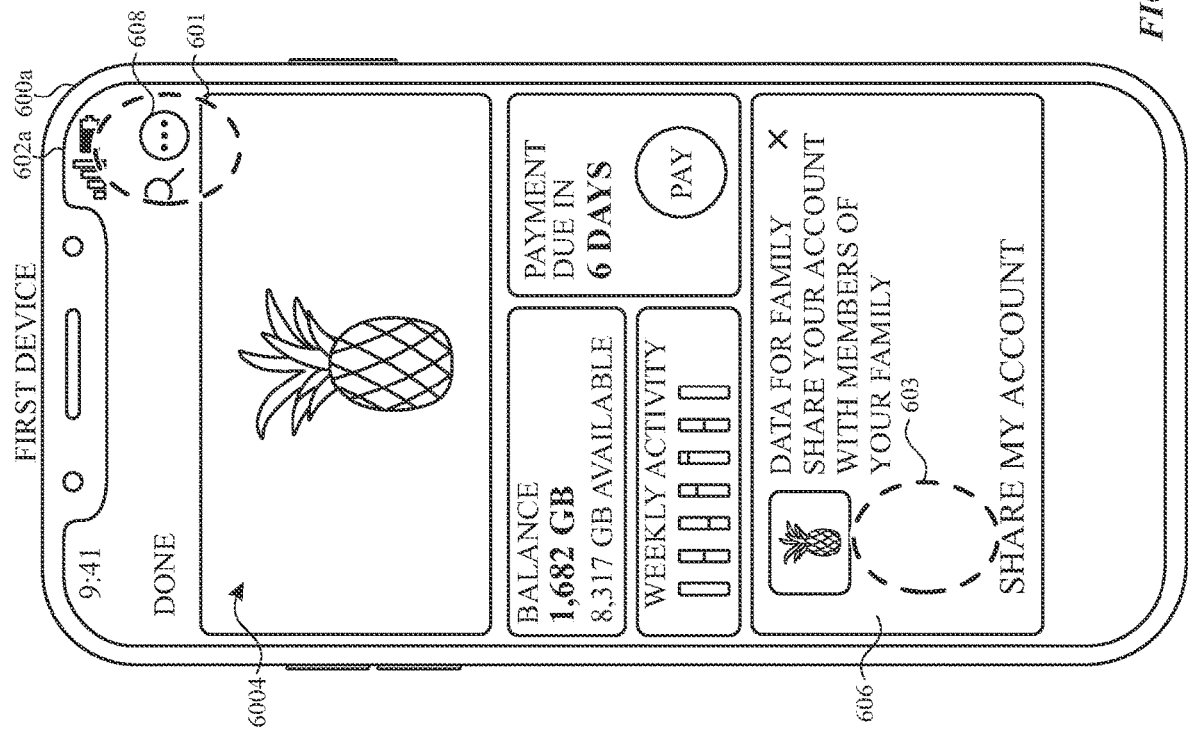
Figure 7E:
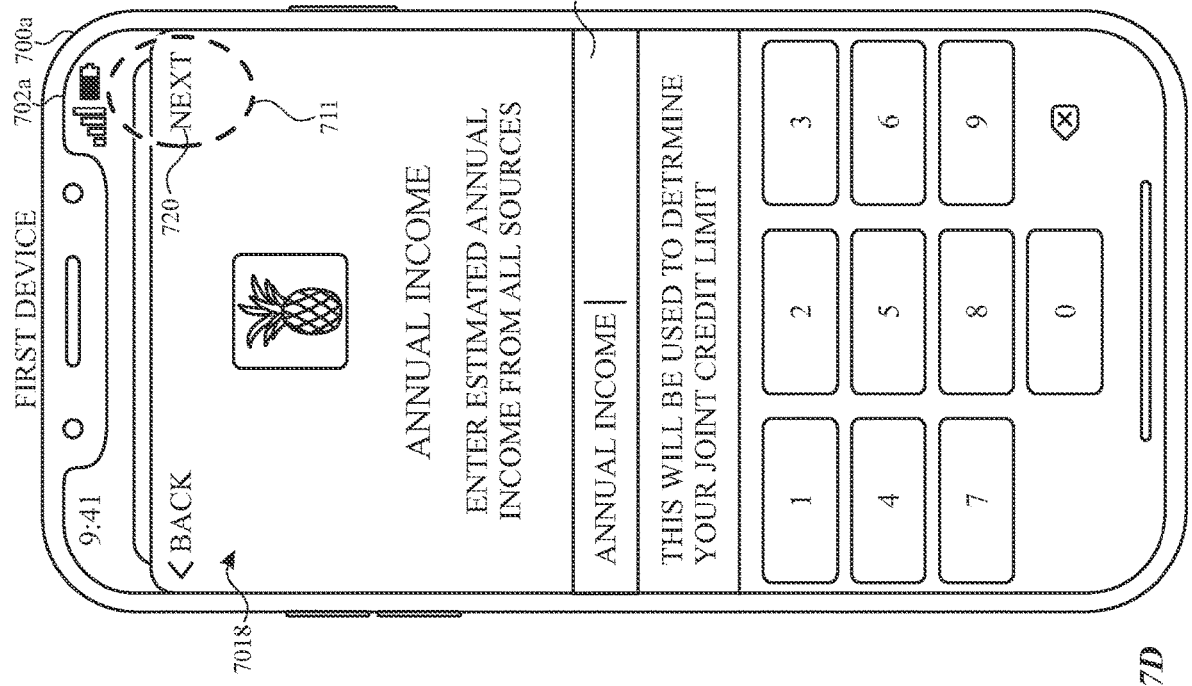

FIG. 6A illustrates device 600*a* (e.g., "first device") associated with a first user identity (e.g., a primary owner of an account). Device 600*a* displays, on display 602*a*, user interface 6004 for viewing a summary of an account associated with the first user identity. In some embodiments, the account is for a data service (e.g., a data storage account). User interface 6004 includes a notification 606 that the account can be shared with another user identity, such as a family member. In some embodiments, a family member is a second user with which a user of device 600*a* has established a relationship. In some embodiments, a relationship is established by adding the second user to a list of family members associated with device 600*a*. In some embodiments, the second user is sent a request to be added to the list of family members and is required to confirm the request prior to being added to the list of family members. In some embodiments, family members include immediate family members, extended family members, friends, co-workers, or any other person who has been added to the list of family members. After adding the second user to the list of family members, one or more features (e.g., photos, video, music, data storage, applications, financial accounts) accessed with device 600*a* can be shared with the second user.

In some embodiments, user interface 6004 for viewing the summary of the account further includes affordance 608 for viewing details and settings for the account.

FIG. 6B illustrates device 600*a* displaying, on display 602*a*, user interface 6010 for viewing details and settings for the account. In some embodiments, user interface 6010 is displayed in response to detecting input 601 (e.g., a tap gesture) corresponding to the location of affordance 608 on display 602*a*, as shown in FIG. 6A. User interface 6010 includes an affordance 612 for sharing the account with another user identity.

Figure 6D:
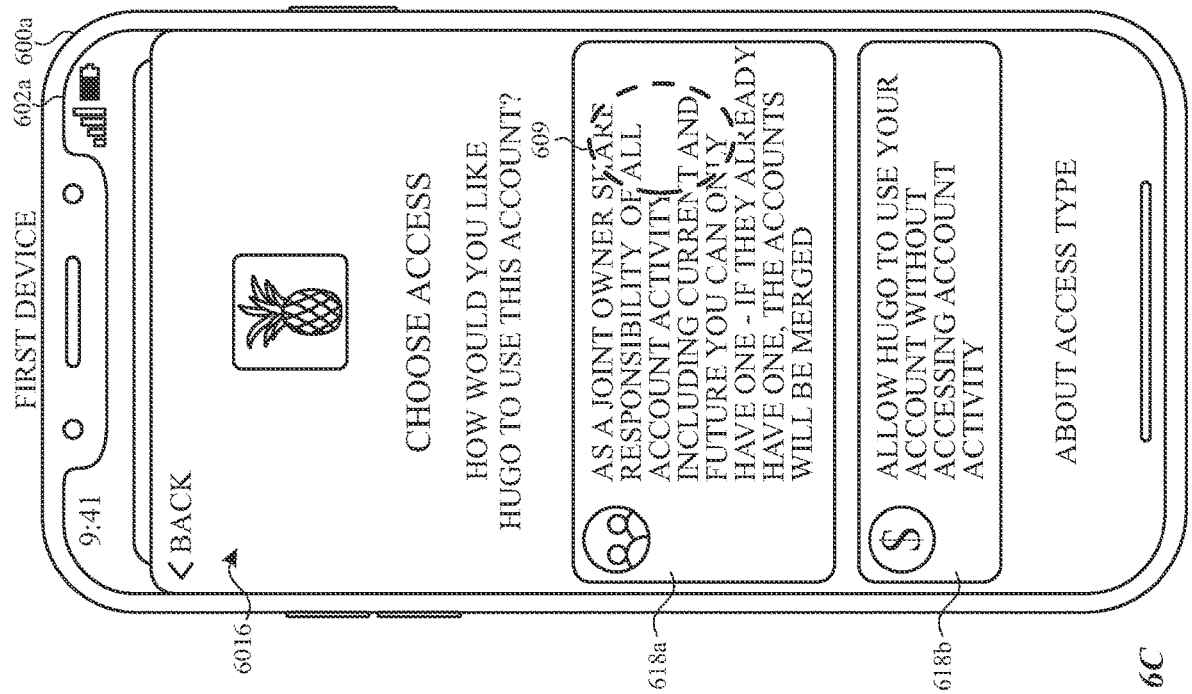
Figure 6C:
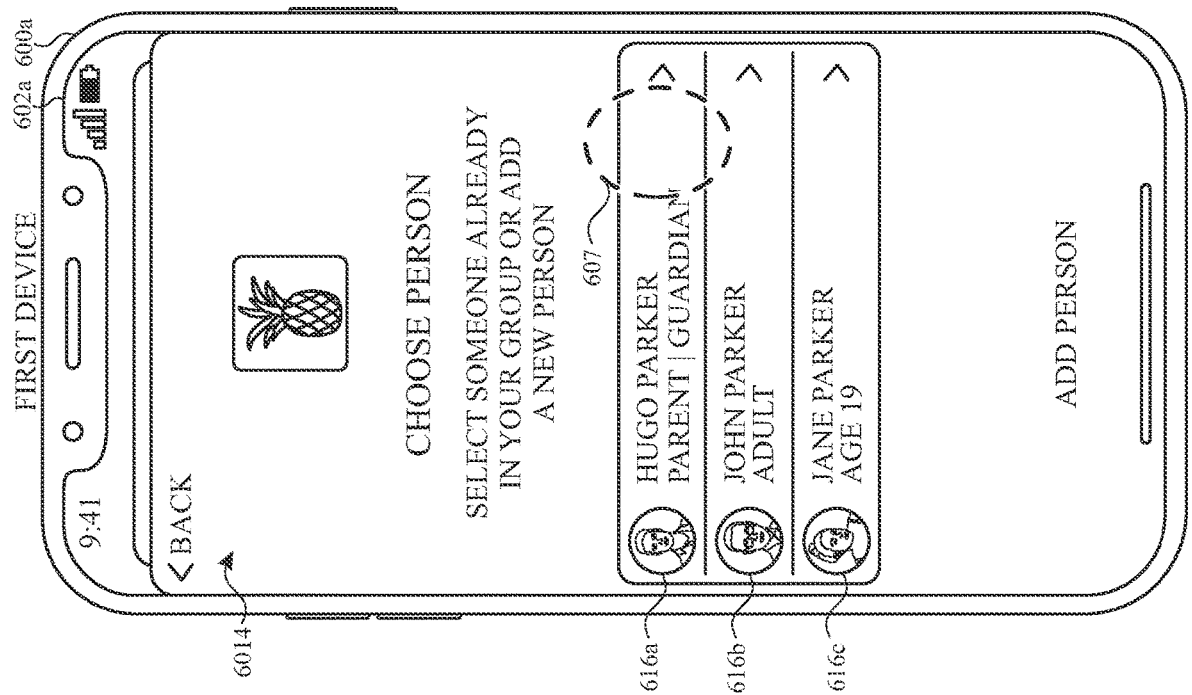

FIG. 6C illustrates device 600*a* displaying, on display 602*a*, user interface 6014 for sharing the account. In some embodiments, user interface 6014 is displayed in response to detecting input 603 (e.g., a tap gesture) corresponding to the location of notification 606 on display 602*a*, as shown in FIG. 6A. In some embodiments, user interface 6014 is displayed in response to detecting input 605 (e.g., a tap gesture) corresponding to the location of affordance 612 on display 602*a*, as shown in FIG. 6B. A user of device 600*a* may have at least two avenues for initiating the process for sharing the account with a second user identity—notification 606 as shown in FIG. 6A and affordance 612 as shown in FIG. 6B.

User interface 6014 includes first family member user interface object 616*a*, second family member user interface object 616*b*, and third family member user interface object 616*c*. While shown with three family member user interface objects in FIG. 6C, the number of family member user interface objects may vary based on the number of family members with which a user of device 600*a* has established a relationship. In some embodiments, the family member user interface objects included in user interface 6014 are a subset of (e.g., less than) all family members with which a user of device 600*a* has established a relationship. For example, in some embodiments, the family member user interface objects included in user interface 614 include family members without a personal account for the service. In some embodiments, the family member user interface objects included in user interface 614 include all family members with which a user of device 600*a* has established a relationship.

FIG. 6D illustrates device 600*a* displaying, on display 602*a*, user interface 6016 for sharing the account. User interface 6016 includes first sharing option 618*a* and second sharing option 618*b* for a respective family member. In some embodiments, first and second sharing options 618*a* and 618*b* are displayed in response to detecting input 607 (e.g., a tap gesture) corresponding to the location of affordance 616*a* (e.g., the affordance for "Hugo Parker") on display 602*a*, as shown in FIG. 6C.

In some embodiments, if first sharing option 618*a* illustrated in FIG. 6D is selected, the respective family member (as selected in FIG. 6C) will be invited to be a joint owner of the account. If second sharing option 618*b* illustrated in FIG. 6D is selected, the respective family member will be invited to be a participant of the account, with fewer account features than a joint owner would have. In some embodiments, a joint owner of the account is provided access to all details of the account, e.g., account data storage and data usage information of the account. In some embodiments, a participant of the account is provided access to a limited amount of details of the account, e.g., only the amount of data storage available and only the participant's data usage.

Figure 6E:
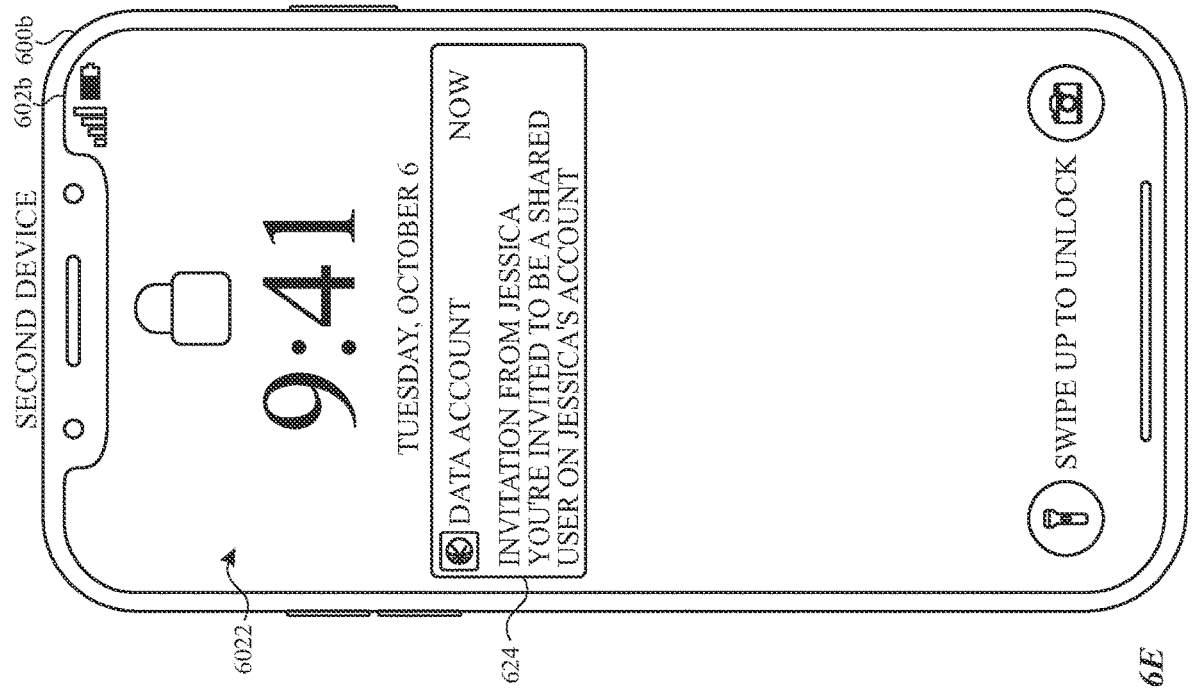

FIG. 6E illustrates device 600*a* displaying, on display 602*a*, user interface 6018 for sharing the account. User interface 6018 includes send invitation affordance 620. In some embodiments, send invitation affordance 620 is displayed in response to detecting input 609 (e.g., a tap gesture) corresponding to the location of first sharing option 618*a* on display 602*a*, as shown in FIG. 6D. Send invitation affordance 620 allows a user of device 600*a* to confirm the invitation should be sent to the selected family member, and to view the terms and conditions for sharing the account, before the invitation is sent.

Figure 6F:
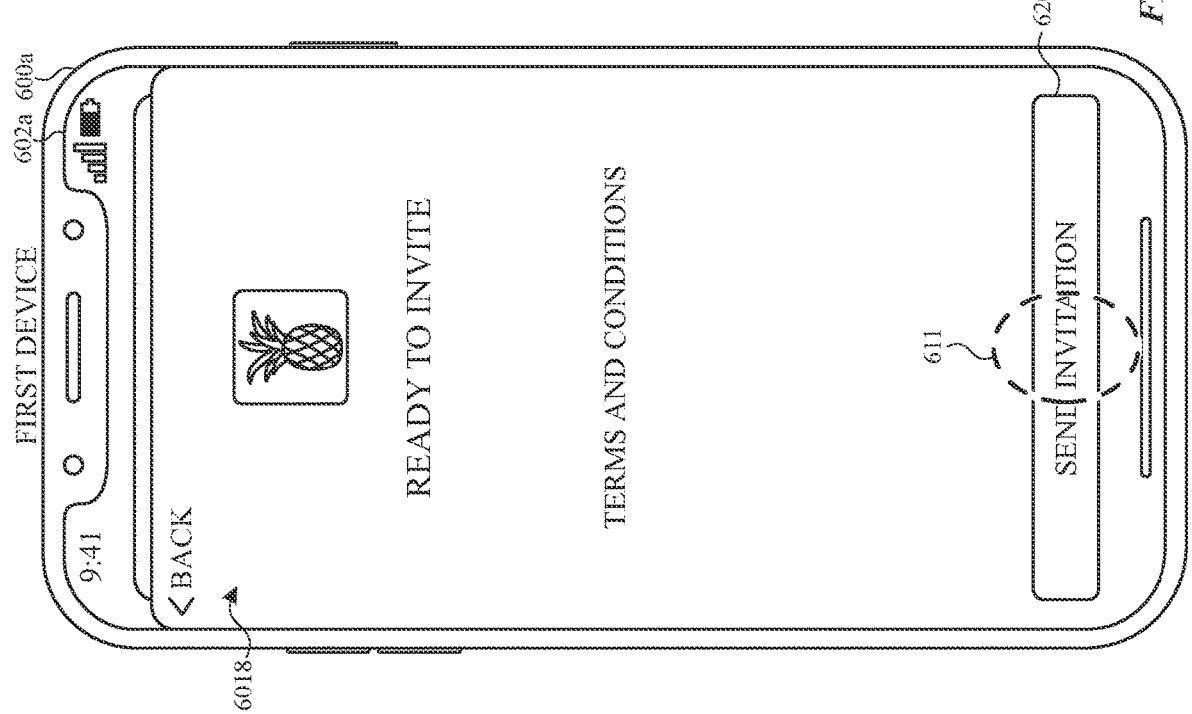

FIG. 6F illustrates device 600*b* (e.g., "second device") associated with a respective user identity (e.g., "Hugo Parker"). Device 600*b* receives an indication that the respective user identity has been invited to become a joint owner of the account. In response to receiving the indication, device 600*b* displays, on display 602*b*, notification 624 that an invitation to become a shared user of the account has been received. In some embodiments, notification 624 is displayed on a lock screen interface 622 while device 600*b* is in a locked state.

Figure 6G:
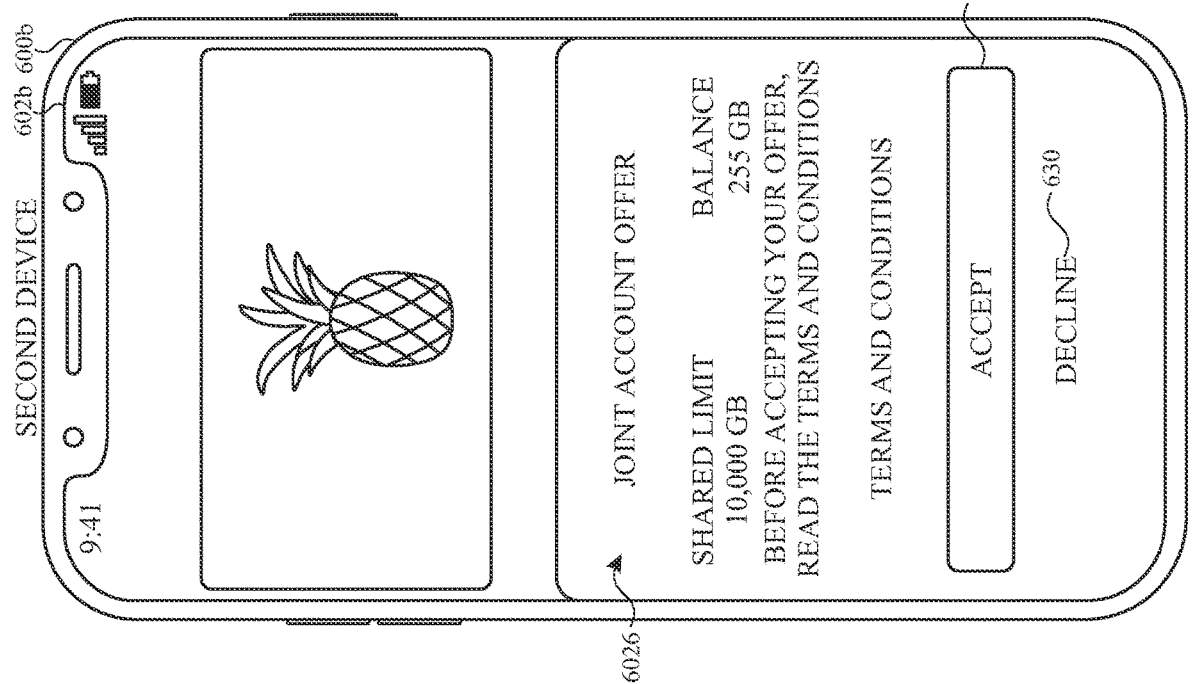

FIG. 6G illustrates device 600*b* displaying, on display 602*b*, user interface 6026 for becoming a shared user of the account. In some embodiments, user interface 6026 is displayed after receiving an indication that the respective family member has been approved to become a joint owner of the account. In some embodiments, user interface 6026 is displayed in response to detecting a selection of notification 624 (e.g., a tap gesture or a long press on notification 624), as shown in FIG. 6F. In some embodiments, user interface 6026 is displayed in response to detecting a request to access the service associated with the account (e.g., in response to launching an application associated with the service). User interface 6026 includes information about the type of account sharing being offered (e.g., a joint account, where the respective user identity associated with device 600*b* would become a joint owner of the account) and details about the account. In some embodiments, the details about the account include the account limit, balance, and terms and conditions.

User interface 6026 further includes accept affordance 628 and decline affordance 630. If accept affordance 628 is selected (e.g., with a tap gesture), the respective user identity associated with device 600*b* will become a joint owner of the account. In some embodiments, after selecting the accept affordance 628, device 600*b* will be provided access to all account data storage and data usage information of the account. If decline affordance 630 is selected, the respective user identity associated with device 600*b* will not become a joint owner of the account and will not be provided access to account data or data storage information of the account.

FIGS. 7A-7BA illustrate exemplary user interfaces for sharing an account with another user identity and viewing/configuring the shared account, in accordance with some embodiments. The user interfaces in these figures are used to illustrate the processes described below, including the processes in FIG. 8.

FIG. 7A illustrates device 700*a* (e.g., "first device") associated with a first user identity (e.g., a primary owner of an account). Device 700*a* displays, on display 702*a*, user interface 7004 for viewing a summary of an account associated with the first user identity. In some embodiments, the account is for a financial service (e.g., a bank account and/or a credit card account). User interface 7004 includes a notification 708 that the account can be shared with another user identity, such as a family member. In some embodiments, a family member is a second user with which a user of device 700a has established a relationship. In some embodiments, a relationship is established by adding the second user to a list of family members associated with device 700a. In some embodiments, the second user is sent a request to be added to the list of family members and is required to confirm the request prior to being added to the list of family members. In some embodiments, family members include immediate family members, extended family members, friends, co-workers, or any other person who has been added to the list of family members. After adding the second user to the list of family members, one or more features (e.g., photos, video, music, data storage, applications, financial accounts) accessed with device 700a can be shared with the second user.

In some embodiments, user interface 7004 for viewing the summary of the account further includes affordance 706 for viewing details and settings for the account.

FIG. 7B illustrates device 700a displaying, on display 702a, user interface 7010 for viewing details and settings for the account. In some embodiments, user interface 7010 is displayed in response to detecting input 701 (e.g., a tap gesture) corresponding to the location of affordance 706 on display 702a, as shown in FIG. 7A. User interface 7010 includes an affordance 712 for sharing the account with another user identity.

FIG. 7C illustrates device 700a displaying, on display 702a, user interface 7014 for sharing the account. In some embodiments, user interface 7014 is displayed in response to detecting input 703 (e.g., a tap gesture) corresponding to the location of notification 708 on display 702a, as shown in FIG. 7A. In some embodiments, user interface 7014 is displayed in response to detecting input 705 (e.g., a tap gesture) corresponding to the location of affordance 712 on display 702a, as shown in FIG. 7B. A user of device 700a may have at least two avenues for initiating the process for sharing the account with a second user identity—notification 708 as shown in FIG. 7A and affordance 712 as shown in FIG. 7B.

User interface 7014 includes first family member user interface object 716a, second family member user interface object 716b, and third family member user interface object 716c. While shown with three family member user interface objects in FIG. 7C, the number of family member user interface objects may vary based on the number of family members with which a user of device 700a has established a relationship. In some embodiments, the family member user interface objects included in user interface 7014 are a subset (e.g., less than) of all family members with which a user of device 700a has established a relationship. For example, in some embodiments, the family member user interface objects included in user interface 7014 include family members without a personal account for the service. In some embodiments, the family member user interface objects included in user interface 7014 include all family members with which a user of device 700a has established a relationship.

Figure 7D:
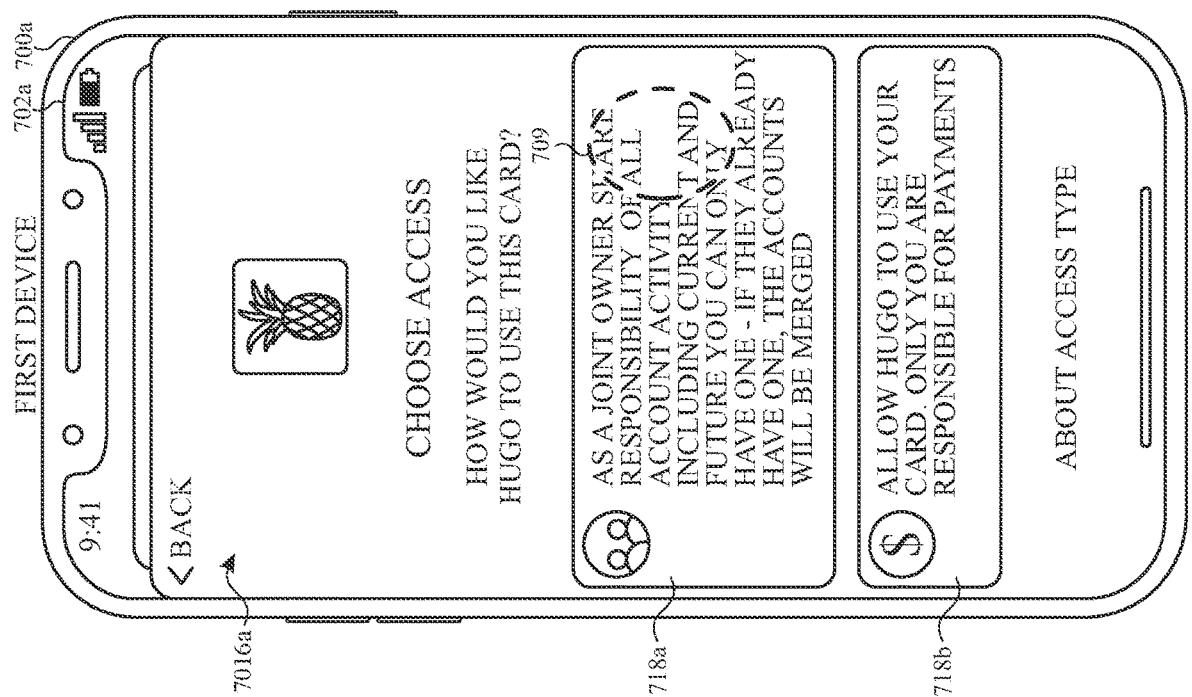

FIG. 7D illustrates device 700a displaying, on display 702a, user interface 7016a for sharing the account. User interface 7016a includes first sharing option 718a and second sharing option 718b for a respective family member. In some embodiments, first and second sharing options 718a and 718b are displayed in response to detecting input 707 (e.g., a tap gesture) corresponding to the location of affordance 716a (e.g., the affordance for "Hugo Parker") on display 702a, as shown in FIG. 7C.

In some embodiments, if first sharing option 718a as illustrated in FIG. 7D is selected, the respective family member (as selected in FIG. 7C) will be invited to be a joint owner of the account. If second sharing option 718b as illustrated in FIG. 7D is selected, the respective family member will be invited to be a participant of the account, with fewer account features than a joint owner would have. In some embodiments, a joint owner of the account will be provided access to transaction and balance information for all participants and owners of the account. In some embodiments, a participant of the account will be provided access to transaction information of the account for the participant without being provided access to transaction and balance information for other participants or owners of the account.

FIG. 7E illustrates device 700a displaying, on display 702a, user interface 7018 for sharing the account. User interface 7018 includes income entry field 722. In some embodiments, income entry field 722 is displayed in response to detecting input 709 (e.g., a tap gesture) corresponding to the location of first sharing option 718a (e.g., the option for inviting another user to become a joint owner) on display 702a, as shown in FIG. 7D. In some embodiments, when inviting a respective family member to become a joint owner of the account, the service may request the first user identity (e.g., the primary account owner) to confirm their income, in order to determine a joint credit limit for the account if the respective family member accepts the invite. In some embodiments, after entering an income amount in the income entry field 722, next affordance 720 is enabled.

Figure 7F:
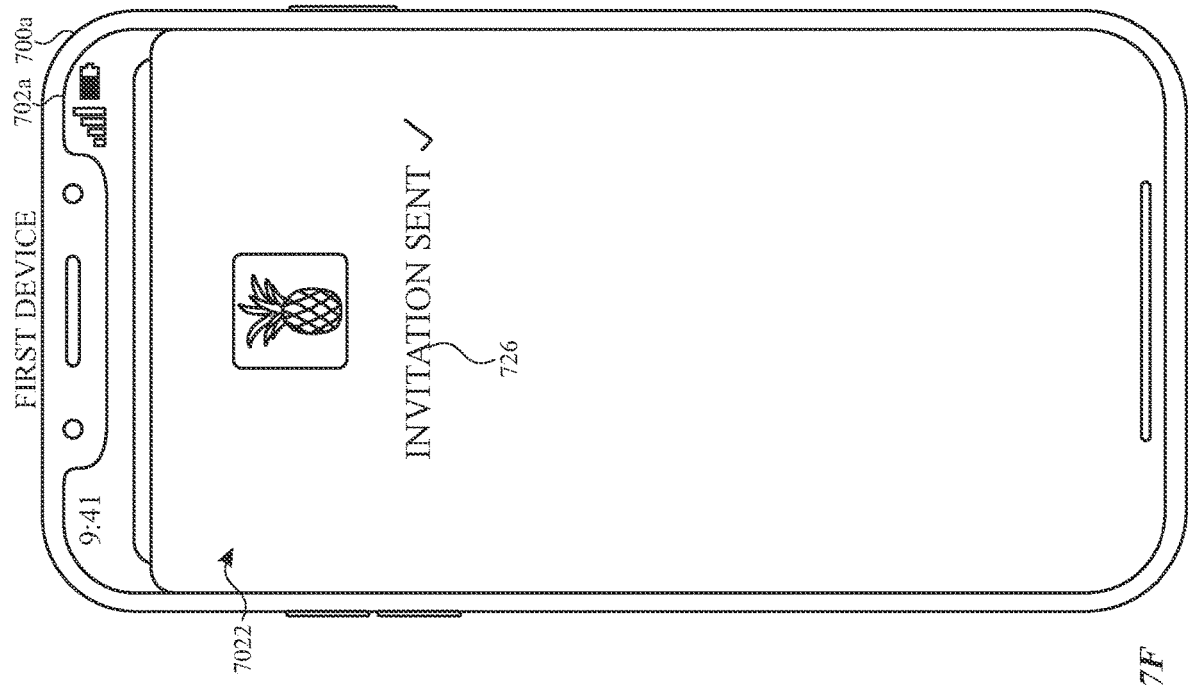

FIG. 7F illustrates device 700a displaying, on display 702a, user interface 7020 for sharing the account. User interface 7020 includes send invitation affordance 724. In some embodiments, send invitation affordance 724 is displayed in response to detecting input 709 (e.g., a tap gesture) corresponding to the location of first sharing option 718a (e.g., the option for inviting a joint owner) on display 702a, as shown in FIG. 7D. In some embodiments, send invitation affordance 724 is displayed in response to detecting input 711 (e.g., a tap gesture) corresponding to the location of next affordance 720 on display 702a, as shown in FIG. 7E. Send invitation affordance 724 allows a user of device 700a to confirm the invitation should be sent to the selected family member, and to view the terms and conditions for sharing the account, before the invitation is sent.

Figure 7G:
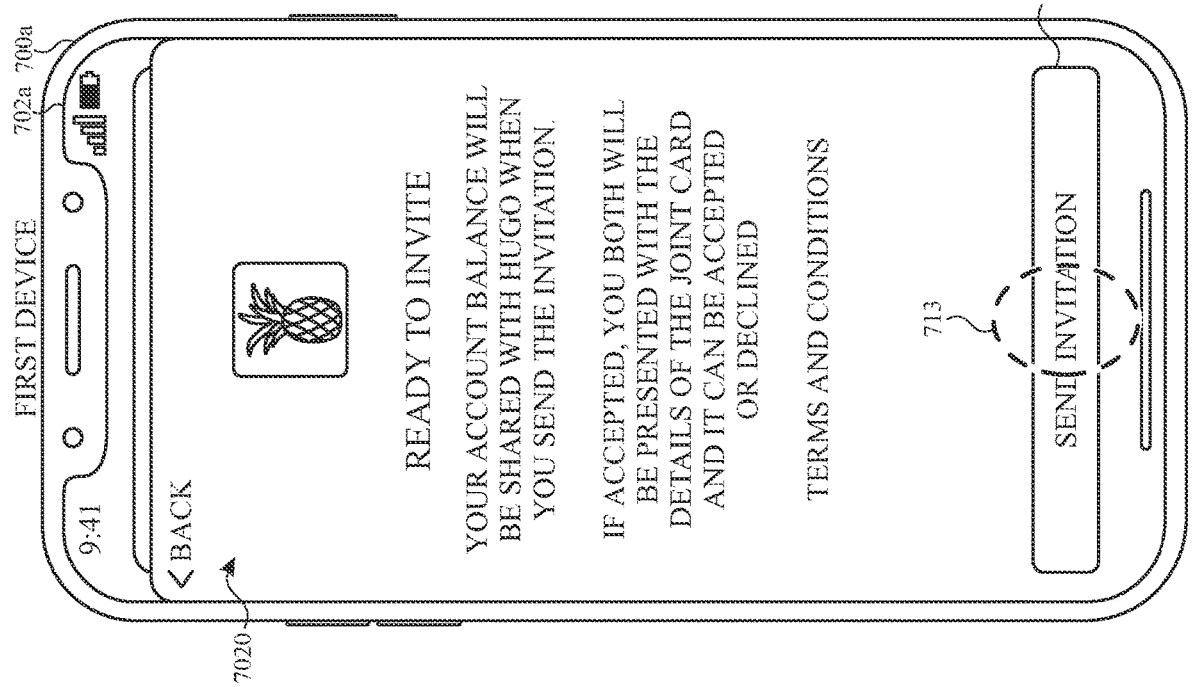

FIG. 7G illustrates device 700a displaying, on display 702a, user interface 7022. User interface 7022 includes confirmation notification 726 indicating that the respective family member has been invited to become a joint owner of the account. In some embodiments, confirmation notification 726 is displayed in response to detecting input 713 (e.g., a tap gesture) corresponding to the location of send invitation affordance 724 on display 702a, as shown in FIG. 7F.

Figure 7H:
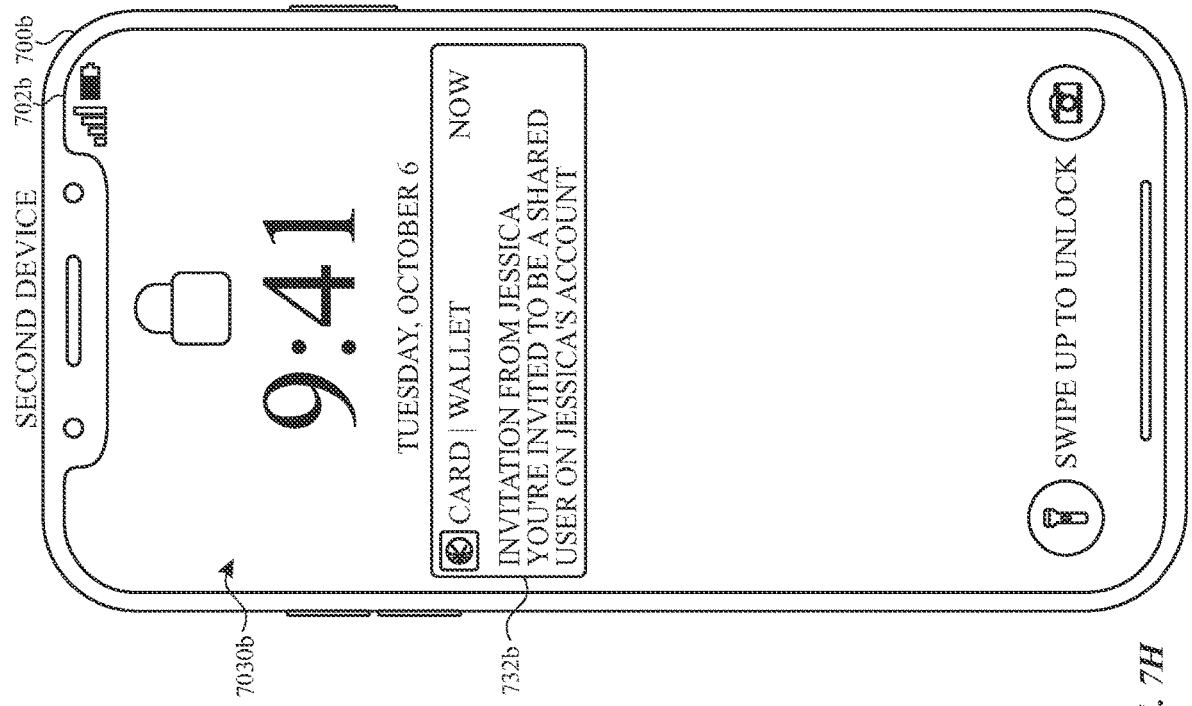

FIG. 7H illustrates device 700a displaying, on display 702a, user interface 7010 for viewing details and settings for the account. As shown in FIG. 7H, after sending the invitation to the respective family member, family member user interface object 728a is included in user interface 7010. In some embodiments, family member user interface object 728a includes an indication of the invitation status for the respective family member (e.g., "invitation pending"). After the respective family member accepts the invitation, the invitation status changes to indicate the current status (e.g., "co-owner", as shown in FIG. 7AB).

Figure 7I:
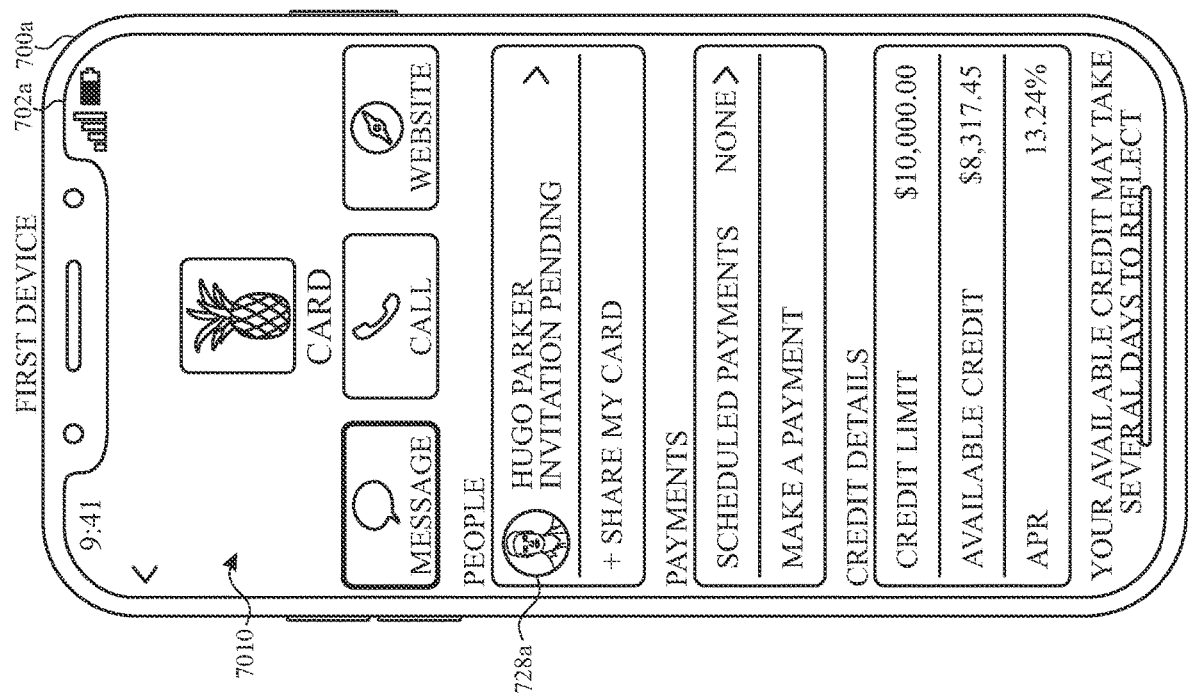
Figure 7K:
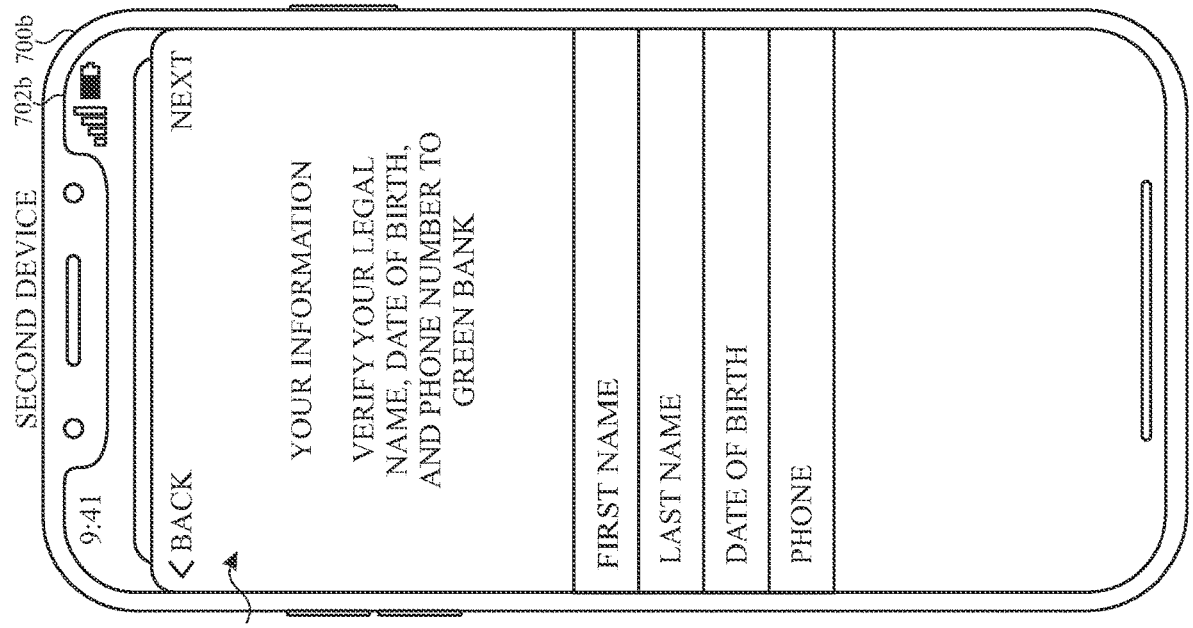

FIG. 7I illustrates device 700*b* (e.g., "second device") associated with a second user identity (e.g., "Hugo Parker"). Device 700*b* receives an indication that the second user identity has been invited to become a joint owner of the account. In response to receiving the indication, device 700*b* displays, on display 702*b*, notification 732*b* that an invitation to become a joint owner of the account has been received. In some embodiments, notification 732*b* is displayed on a lock screen interface 7030*b* while device 700*b* is in a locked state.

Figure 7J:
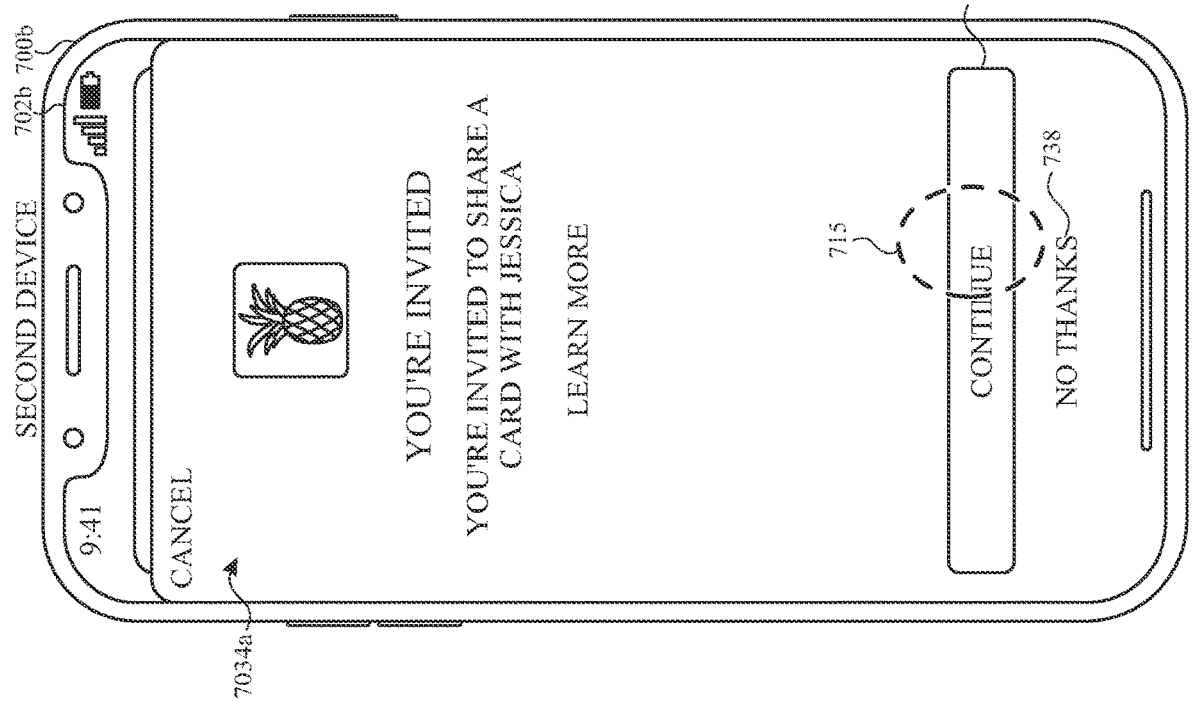
Figure 7M:
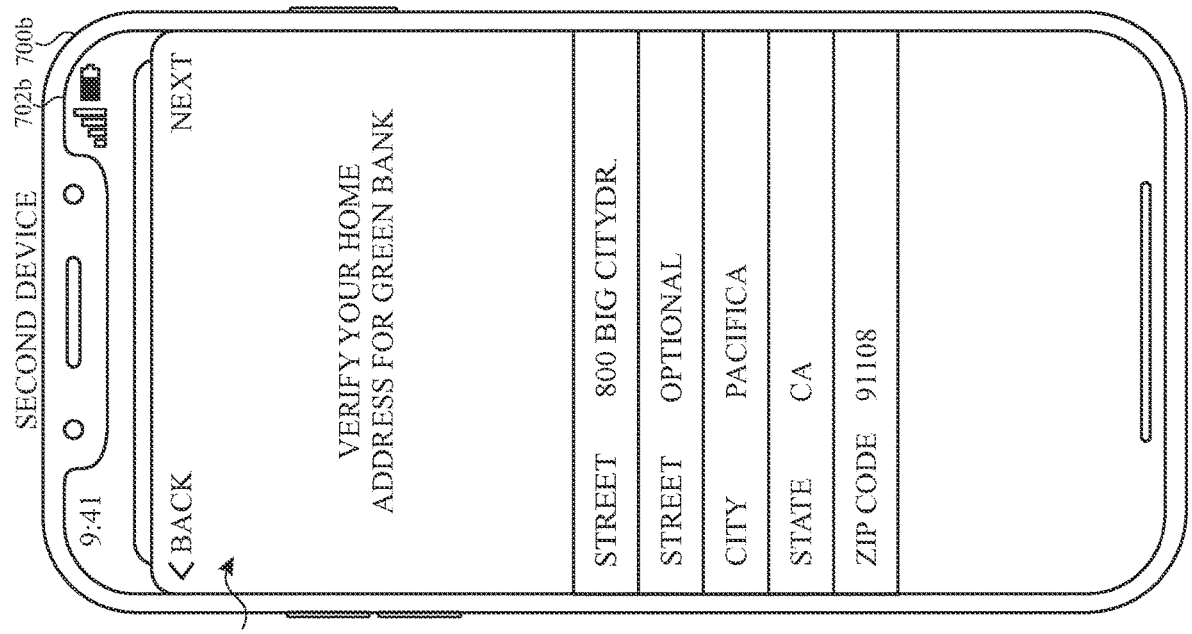
Figure 7L:
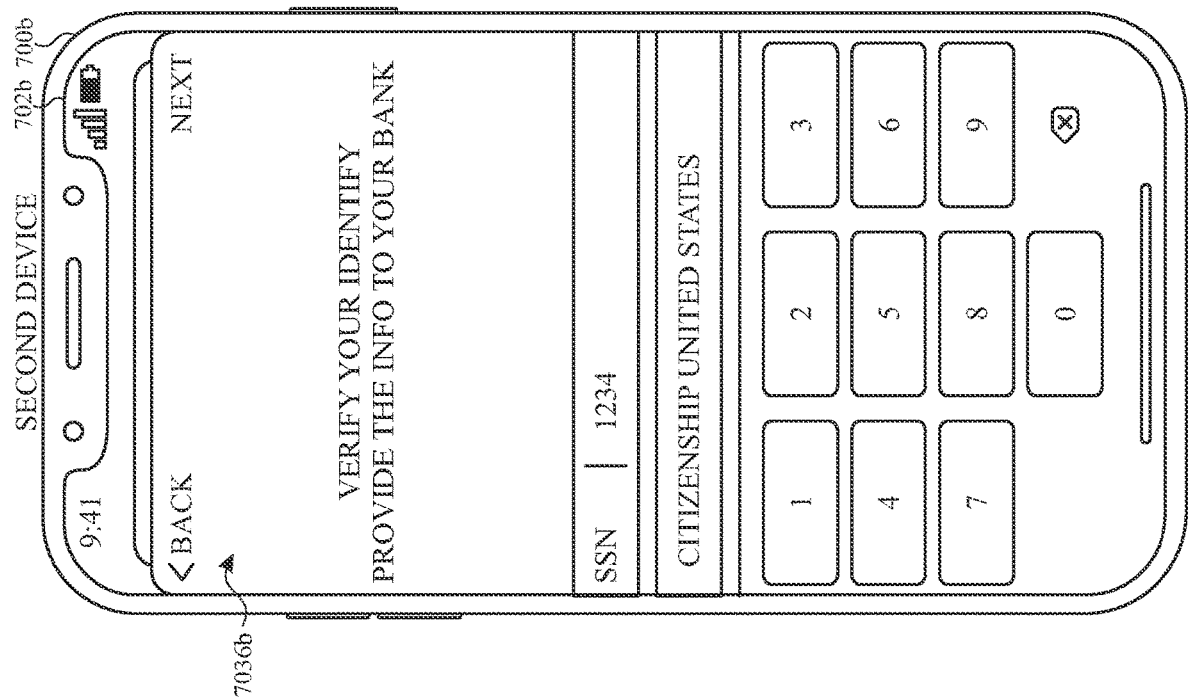
Figure 7N:
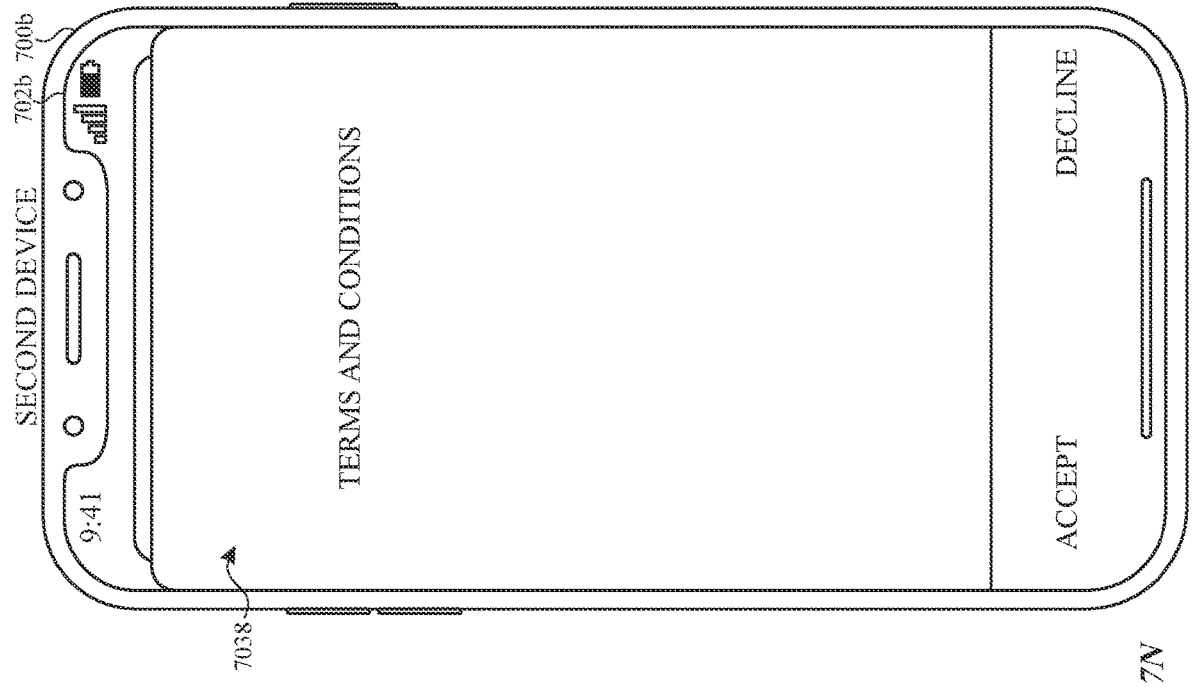

FIG. 7J illustrates device 700*b* displaying, on display 702*b*, user interface 7034*a* for becoming a shared user of the account. In some embodiments, user interface 7034*a* is displayed in response to detecting a selection of notification 732*b* (e.g., a tap gesture or a long press on notification 732*b*), as shown in FIG. 7I. In some embodiments, user interface 7034*a* is displayed in response to detecting a request to access the service associated with the account (e.g., in response to launching an application associated with the service (e.g., a wallet application)).

As shown in FIG. 7J, user interface 7034*a* includes continue affordance 736 and decline affordance 738 (e.g., "no thanks"). If continue affordance 736 is selected, the process for becoming a joint owner of the account will continue. If decline affordance 738 is selected, the process for becoming a joint owner of the account will cease and the second user identity associated with device 700*b* will not become a joint owner of the account.

FIGS. 7K-7N illustrate device 700*b* displaying, on display 702*b*, user interfaces 7036*a*-7036*d*. User interface 7036*a*-7036*d* include a series of information entry fields. In some embodiments, the series of information entry fields are displayed in response to detecting input 715 (e.g., a tap gesture) corresponding to the location of continue affordance 736 on display 702*a*, as shown in FIG. 7J. The series of information fields are used to obtain information for the service to verify the identity of the second user identity and to determine whether the second user identity is eligible to become a joint owner of the account. In some embodiments, the series of information fields include fields for the name, date of birth, phone number, social security number, citizenship, address, and/or income of the second user identity.

Figure 7O:
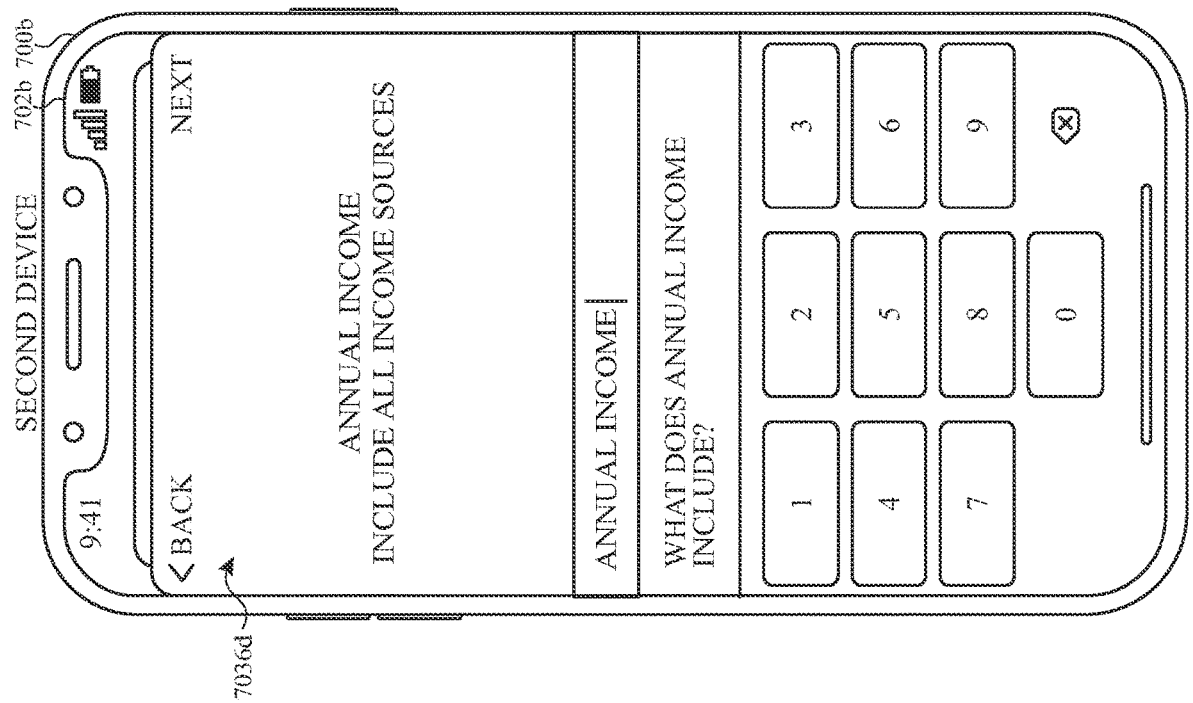
Figure 7O:
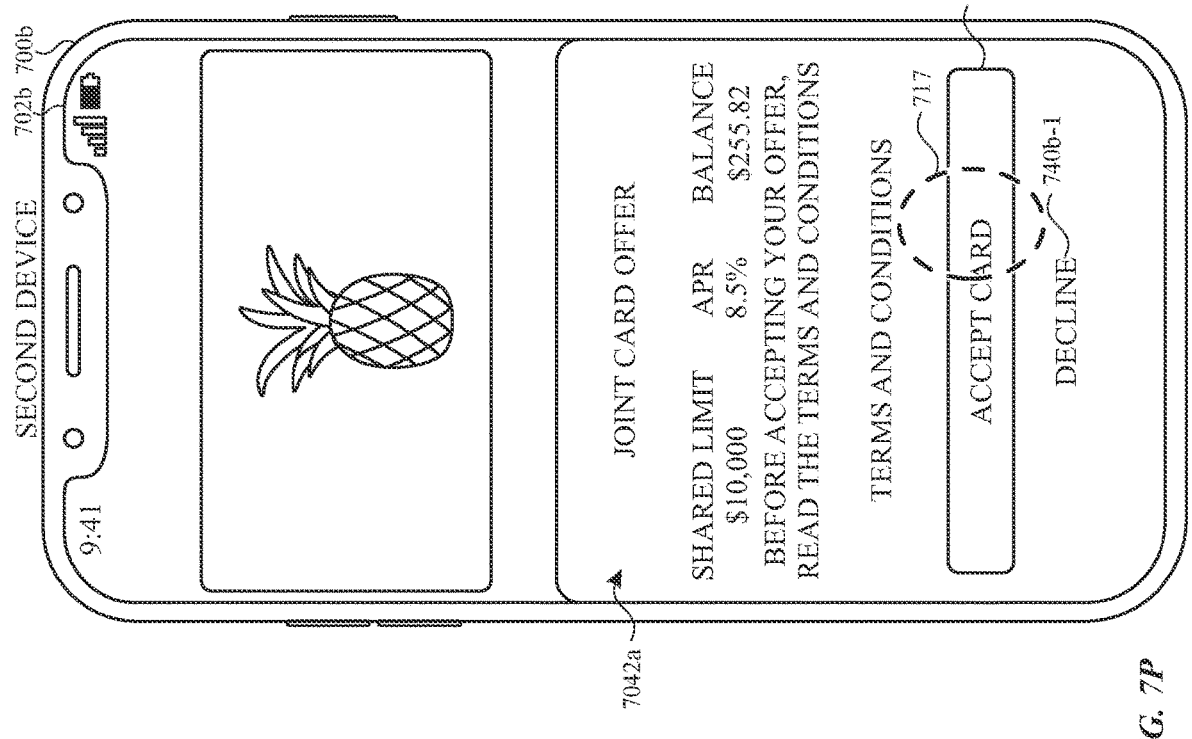

FIG. 7O illustrates device 700*b* displaying, on display 702*b*, user interface 7038. User interface 7038 includes terms and conditions for applying to become a joint owner of the account. In some embodiments, the terms and conditions are displayed after entering information into the series of information fields displayed in FIGS. 7K-7N.

Figure 7P:
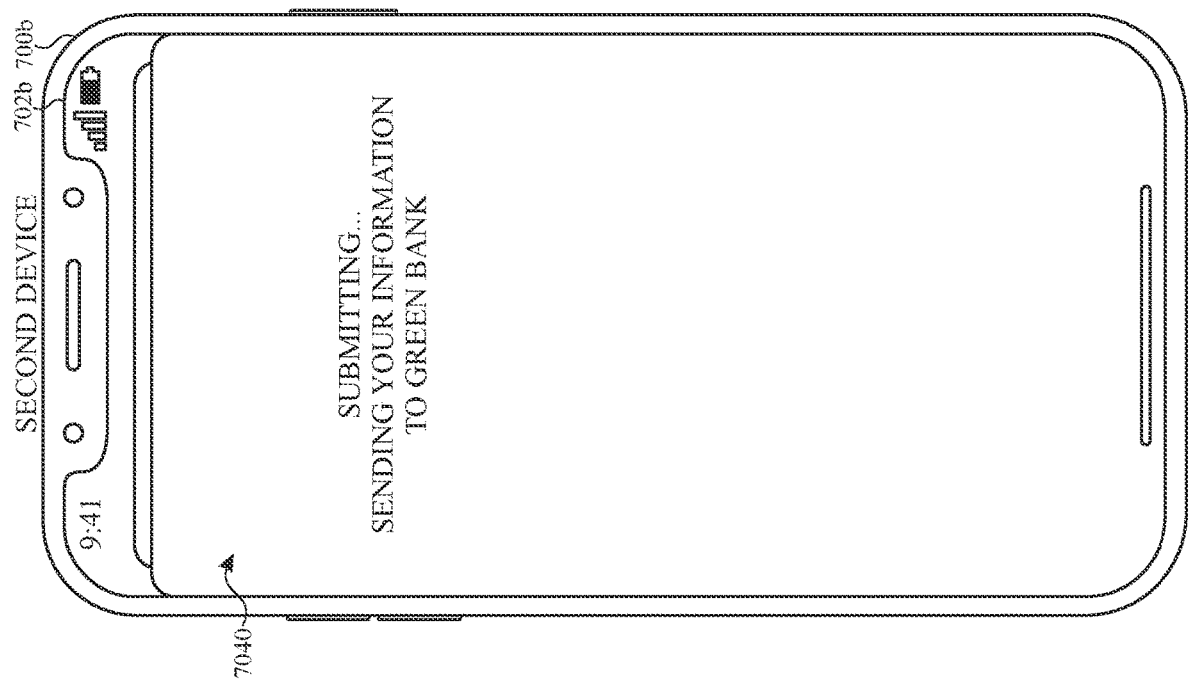

FIG. 7P illustrates device 700*b* displaying, on display 702*b*, user interface 7040. User interface 7040 includes a notification indicating that the information entered in the series of information entry fields (as shown in FIGS. 7K-7N) is being submitted to the service (e.g., "Green Bank"). In some embodiments, the notification is displayed in response to detecting acceptance of the terms and conditions for applying to become a joint owner of the account, as shown in FIG. 7O.

FIG. 7Q illustrates device 700*b* displaying, on display 702*b*, user interface 7042*a* for becoming a shared user of the account. In some embodiments, user interface 7042*a* is displayed after receiving an indication that the second user identity has been approved to become a joint owner of the account (e.g., after submitting the information entered in the series of information entry fields as shown in FIGS. 7K-7N). In some embodiments, user interface 7042*a* is displayed in response to detecting a request to access a service associated with the account (e.g., in response to launching an application associated with the service (e.g., a wallet application)) and after submitting the information entered in the series of information entry fields as shown in FIGS. 7K-7N.

User interface 7042*a* includes information about the type of account sharing being offered (e.g., a joint account, where the second user identity associated with device 700*b* would become a joint owner of the account) and details about the account. In some embodiments, the details about the account include a credit limit, account balance, percentage rate, and/or terms and conditions for the account.

User interface 7042*a* further includes accept affordance 738*b*-1 and decline affordance 740*b*-1. If accept affordance 738*b*-1 is selected (e.g., with a tap gesture), the second user identity associated with device 700*b* will become a joint owner of the account. In some embodiments, after selecting accept affordance 738*b*-1, device 700*b* will be provided access to transaction and balance information for all participants and owners of the account. If decline affordance 740*b*-1 is selected, the second user identity associated with device 700*b* will not become a joint owner of the account.

Figure 7R:
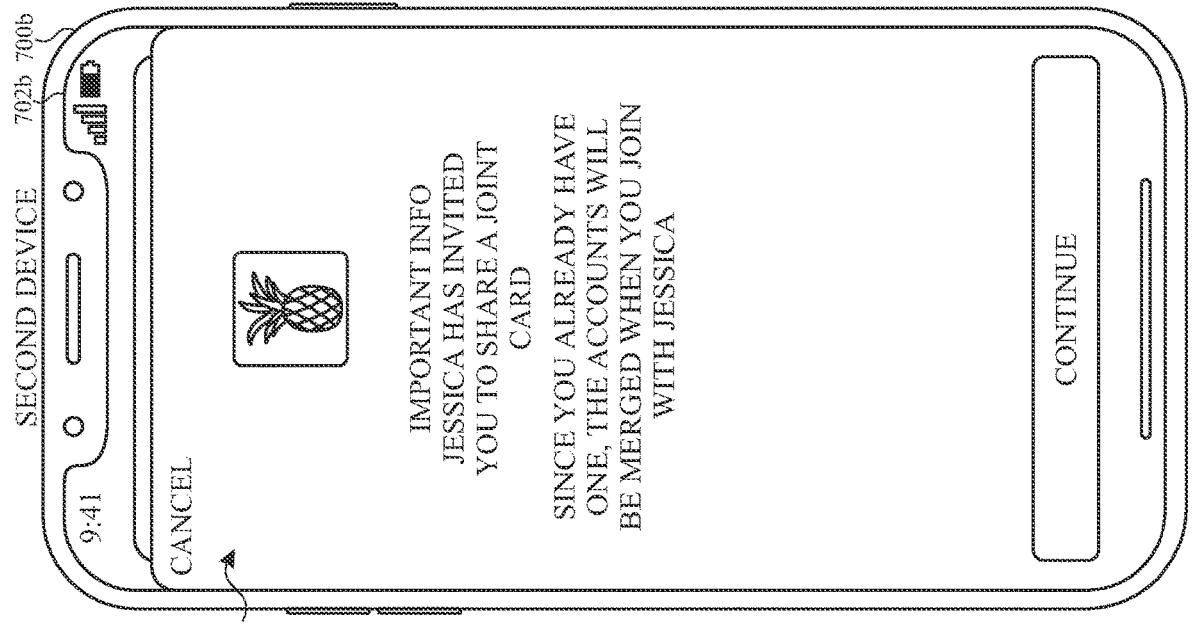

FIG. 7R illustrates device 700*b* displaying, on display 702*b*, user interface 7044. User interface 7044 includes status indicators 742*a* and 742*b*. In some embodiments, status indicators 742*a* and 742*b* are concurrently displayed in response to detecting input 717 (e.g., a tap gesture) corresponding to the location of accept affordance 738*a* on display 702*a*, as shown in FIG. 7Q. Status indicator 742*a* indicates the current acceptance status for the second user identity associated with device 700*b* (e.g., "accepted"). Status indicator 742*b* indicates the current acceptance status (e.g., "pending") for the first user identity associated with device 700*a* (e.g., the primary account owner). Status indicator 742*b* provides an indication that the first user identity also needs to approve the second user identity becoming a joint owner of the account, after the second user identity has already accepted. In some embodiments, the credit limit, percentage rate, and/or terms and conditions for the account may change based on information associated with second user identity (e.g., credit history). In some embodiments, due to possible changes to the account, the first user identity is provided with an opportunity to review the changes and to accept or decline the second user identity from becoming a joint owner of the account after the second user identity has already accepted.

Figure 7S:
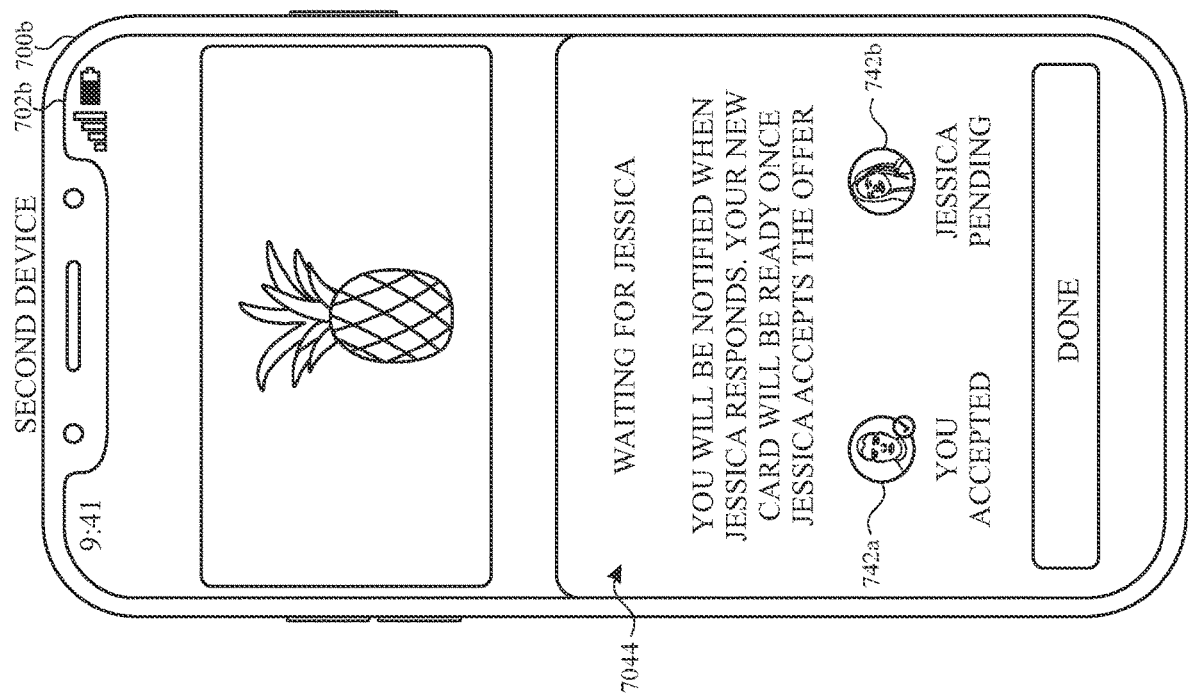

FIG. 7S illustrates device 700*b* displaying, on display 702*b*, user interface 7034*b* for becoming a shared user of the account. In some embodiments, user interface 7034*b* is displayed in response to detecting input 715 (e.g., a tap gesture) corresponding to the location of continue affordance 736 on display 702*a*, as shown in FIG. 7J, bypassing the series of information entry fields as shown in FIGS. 7K-7N. In some embodiments, the series of information entry fields shown in FIGS. 7K-7N are bypassed when the second user identity associated with device 700*b* is already an account holder with the service (e.g., when the second user identity already has a credit card with the same bank as the account and/or as the primary account owner associated with device 700*a*). As shown in FIG. 7S, user interface 7034*b* includes a notification that the second user identity already has an account with the service, and that the existing account of the second user identity will be merged with the account of the first user identity associated with device 700*a*.

Figure 7T:
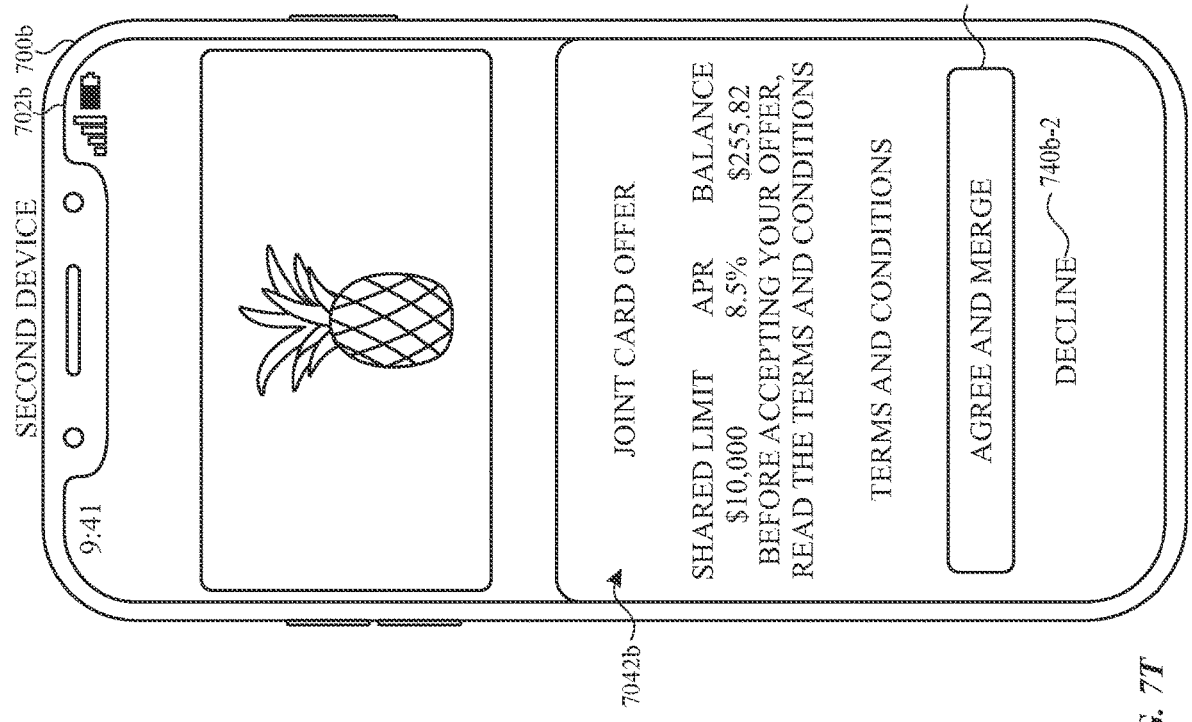

FIG. 7T illustrates device 700*a* displaying, on display 702*a*, user interface 7046. User interface 7046 includes an income entry field for a second user identity that already has an account with the service. In some embodiments, when the second user identity that already has an account with the service is invited to become a joint owner of the account of the first user identity (e.g., the primary account owner associated with device 700a), the service may request the second user identity (e.g., the user associated with device 700b) to confirm their income, in order to determine a joint credit limit for a merged account.

Figure 7U:
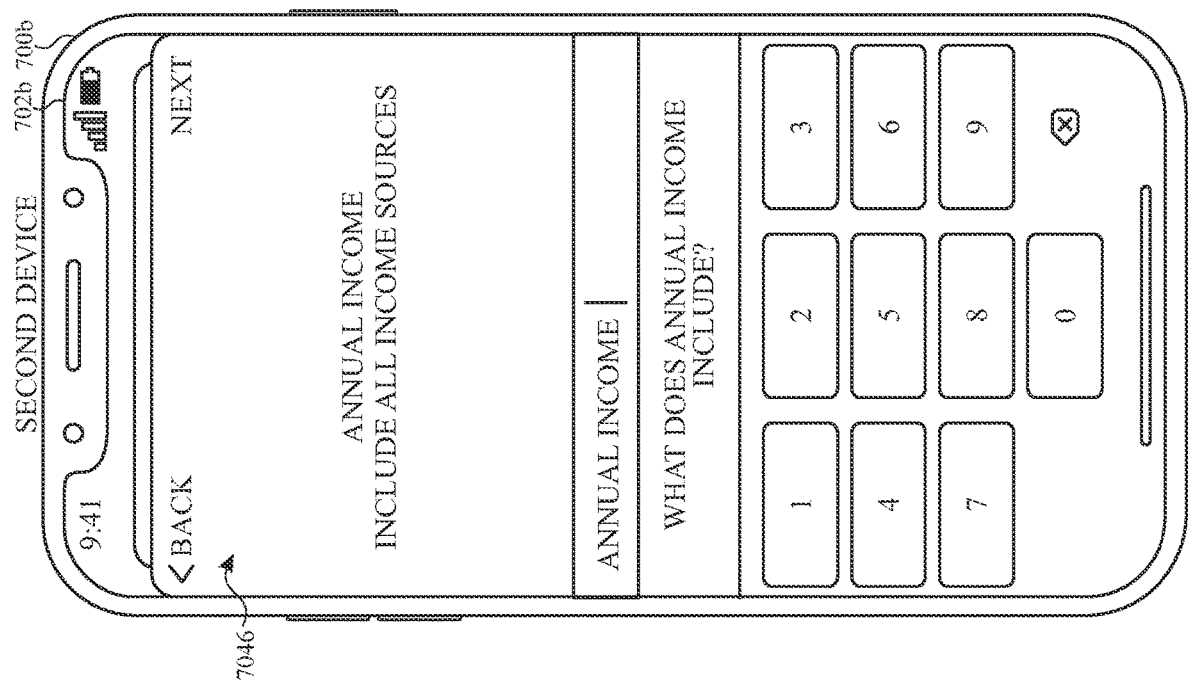
Figure 7W:
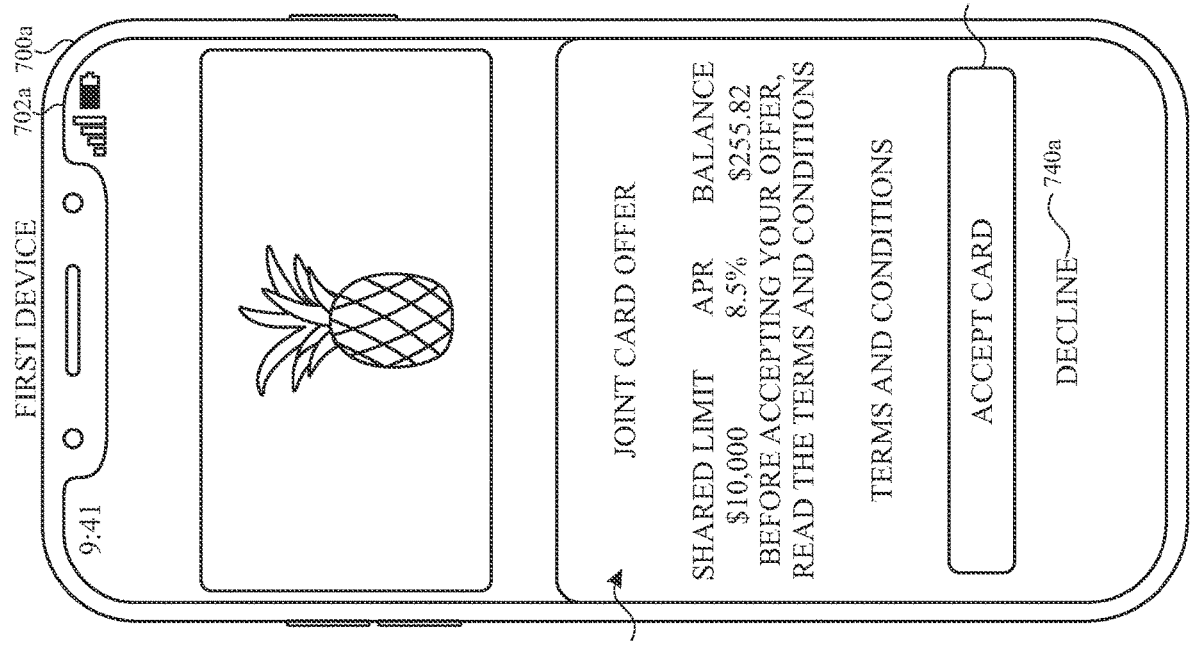

FIG. 7U illustrates device 700b displaying, on display 702b, user interface 7042b for becoming a shared user of the account when the second user identity already has an account with the service. In some embodiments, user interface 7042b is displayed after submitting income information as shown in FIG. 7T. In some embodiments, user interface 7042b is displayed in response to detecting selection of the continue affordance as shown in FIG. 7S (e.g., a tap gesture on the continue affordance). In some embodiments, user interface 7042b is displayed in response to detecting a request to access a service associated with the account (e.g., in response to launching an application associated with the service (e.g., a wallet application)) after receiving an invitation to become a joint owner of the account of the first user identity associated with device 700a.

User interface 7042b includes information about the type of account sharing being offered (e.g., a joint account, where the account of the second user identity associated with device 700b would be merged with the account of the primary account owner associated with device 700a) and details about the merged account. In some embodiments, the details about the merged account include a credit limit, account balance, percentage rate, and/or terms and conditions for the merged account.

User interface 7042b further includes merge affordance 744 and decline affordance 740b-2. If merge affordance 744 is selected (e.g., with a tap gesture), the process for merging the account of the second user identity associated with device 700b with the account of the first user identity associated with device 700a will continue (e.g., the accounts will be merged). In some embodiments, after selecting merge affordance 744 (e.g., after the accounts are merged), device 700b will be provided with access to transaction and balance information for all participants and owners of the merged account. If decline affordance 740b-2 is selected, the account of the second user identity associated with device 700b will not be merged with the account of the first user identity associated with device 700a.

Figure 7V:
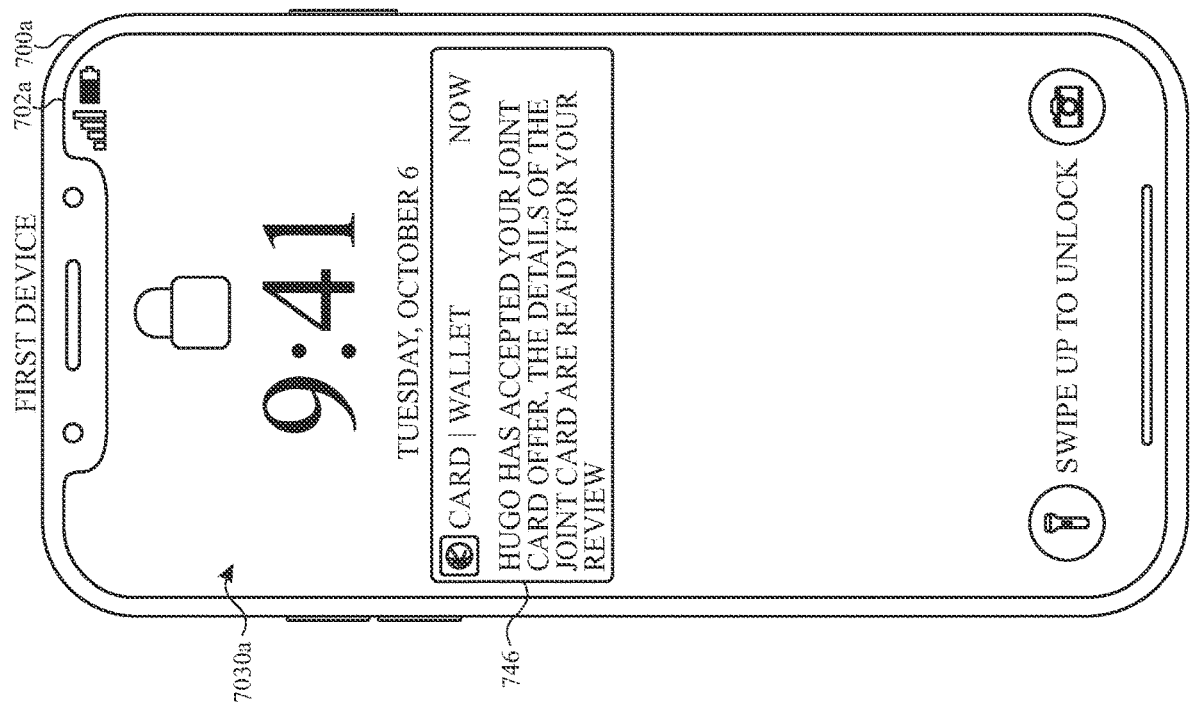

FIG. 7V illustrates device 700a (e.g., "first device") associated with the first user identity (e.g., the primary account owner) displaying, on display 702a, notification 746 that the second user identity has accepted the invitation to become a joint owner of the account. In some embodiments, notification 746 is displayed in response to receiving an indication that the second user identity has accepted the invitation and has been approved to become a joint owner of the account by the service. In some embodiments, notification 746 is displayed on a lock screen interface 7030a while device 700a is in a locked state.

FIG. 7W illustrates device 700a displaying, on display 702a, user interface 7048 for accepting a joint owner for the account. In some embodiments, user interface 7048 is displayed after receiving an indication that the second user identity has accepted the invitation and been approved to become a joint owner of the account. In some embodiments, user interface 7048 is displayed in response to detecting a selection of notification 746, as shown in FIG. 7V (e.g., a tap gesture, a swipe gesture, a long press gesture on notification 746). In some embodiments, user interface 7048 is displayed in response to detecting a request to access a service associated with the account (e.g., in response to launching an application associated with the service (e.g., a wallet application)).

User interface 7048 includes information about the type of account sharing that was offered to the second user identity (e.g., a joint account, where the second user identity associated with device 700b would become a joint owner of the account) and details about the account. In some embodiments, the details about the account include a credit limit, account balance, percentage rate, and/or terms and conditions for the account.

User interface 7048 further includes accept affordance 738a and decline affordance 740a. If accept affordance 738a is selected (e.g., with a tap gesture), the second user identity associated with device 700b will become a joint owner of the account (e.g., the accounts will be merged if the second user identity had an account with the service). In some embodiments, after selecting accept affordance 738a, device 700b will be provided access to transaction and balance information for all participants and owners of the account. If decline affordance 740a is selected, the second user identity associated with device 700b will not become a joint owner of the account.

FIG. 7X illustrates device 700b (e.g., "second device") associated with the second user identity displaying, on display 702b, a user interface 7050 for a wallet application. User interface 7050 includes representation of card 775 corresponding to the account. In some embodiments, representation of card 775 is displayed in user interface 7050 after both the first user identity associated with device 700a and the second user identity associated with device 700b have accepted the second user identity becoming a joint owner of the account.

FIG. 7Y illustrates device 700a (e.g., "first device") associated with the first user identity (e.g., the primary account owner) displaying, on display 702a, user interface 7016b for sharing the account. User interface 7016b includes first sharing option 718a and second sharing option 718b for a respective family member. In some embodiments, first and second sharing options 718a and 718b are displayed in response to detecting input 719 (e.g., a tap gesture) corresponding to the location of affordance 716c (e.g., the affordance for "Jane Parker") on display 702a, as shown in FIG. 7C.

Figure 7Z:
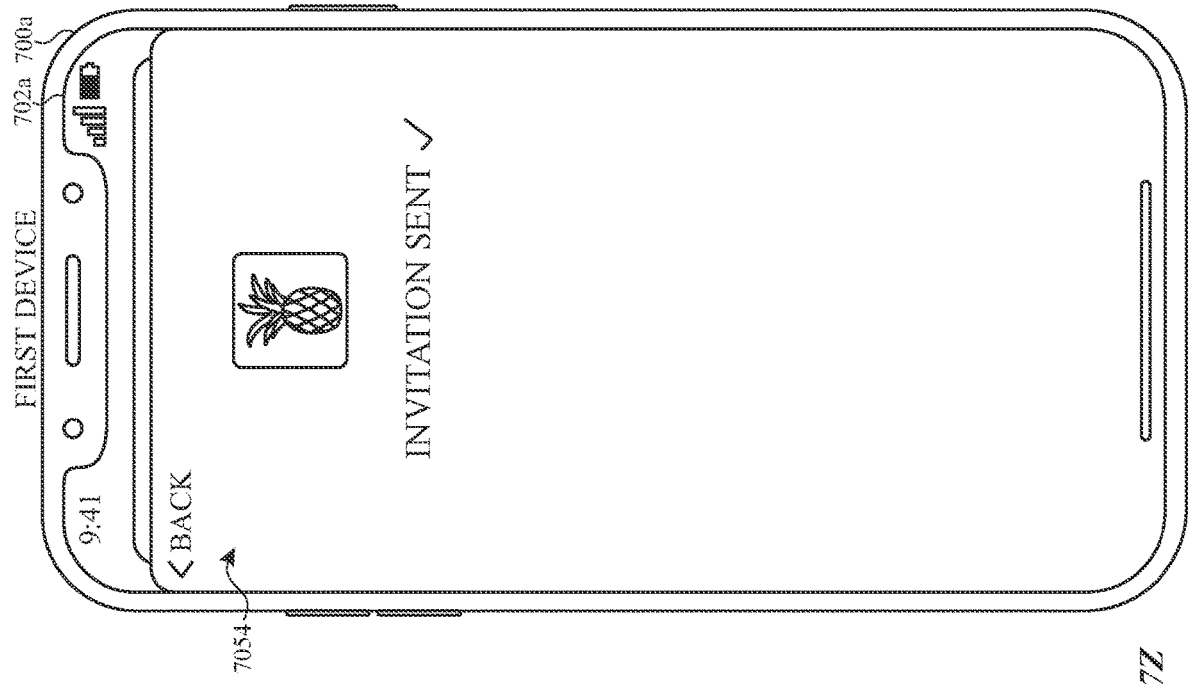
Figure 7A:
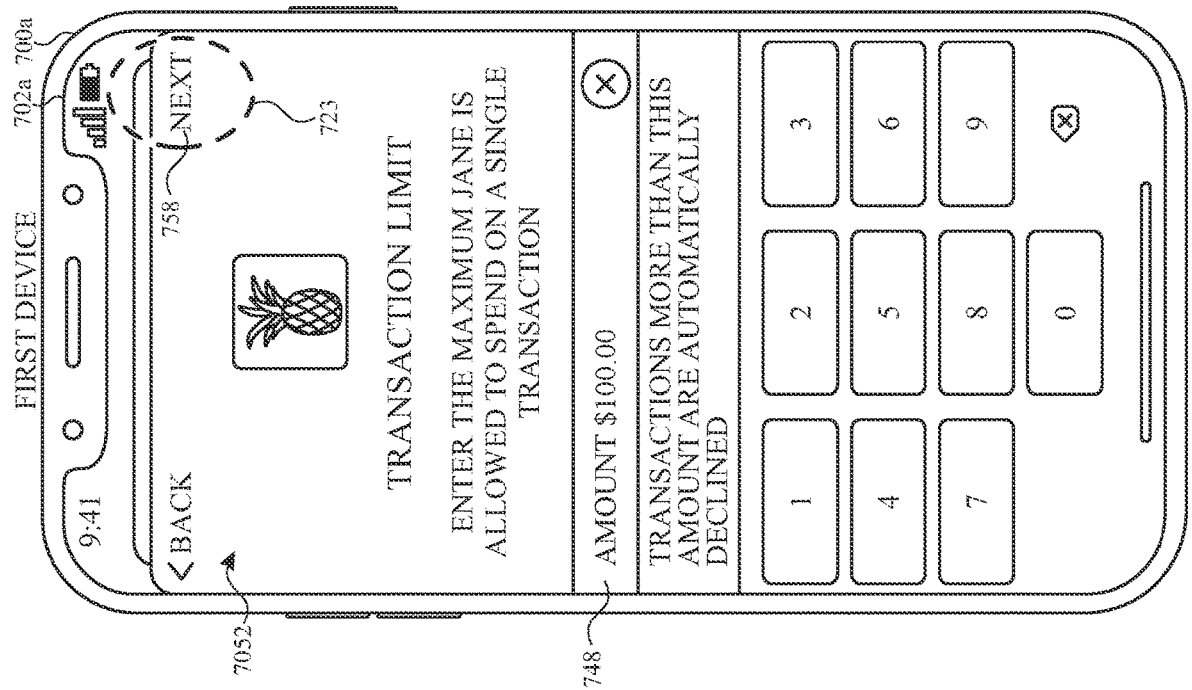
Figure 7A:
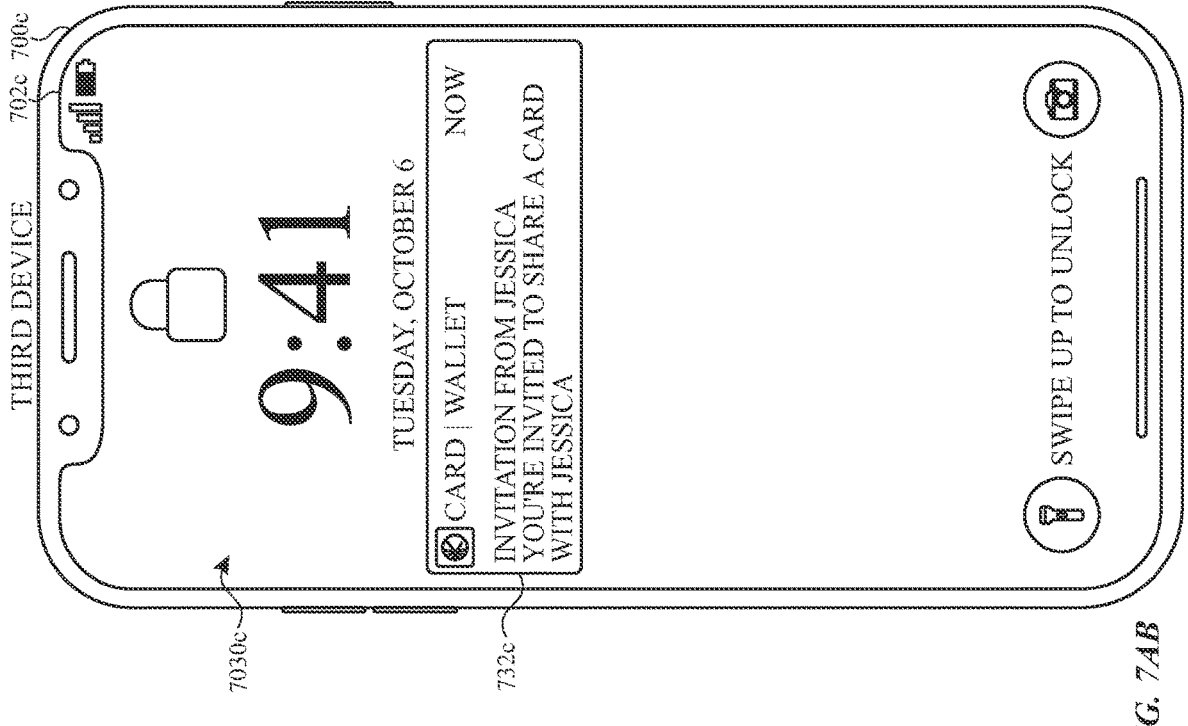
Figure 7A:
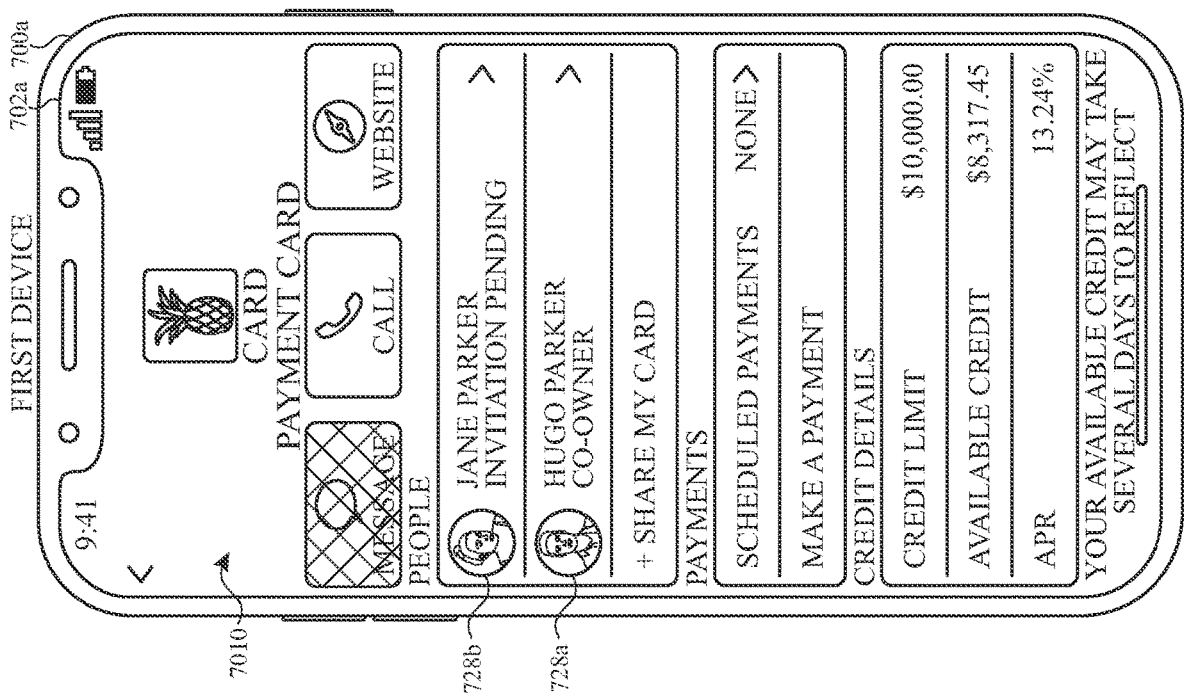
Figure 7A:
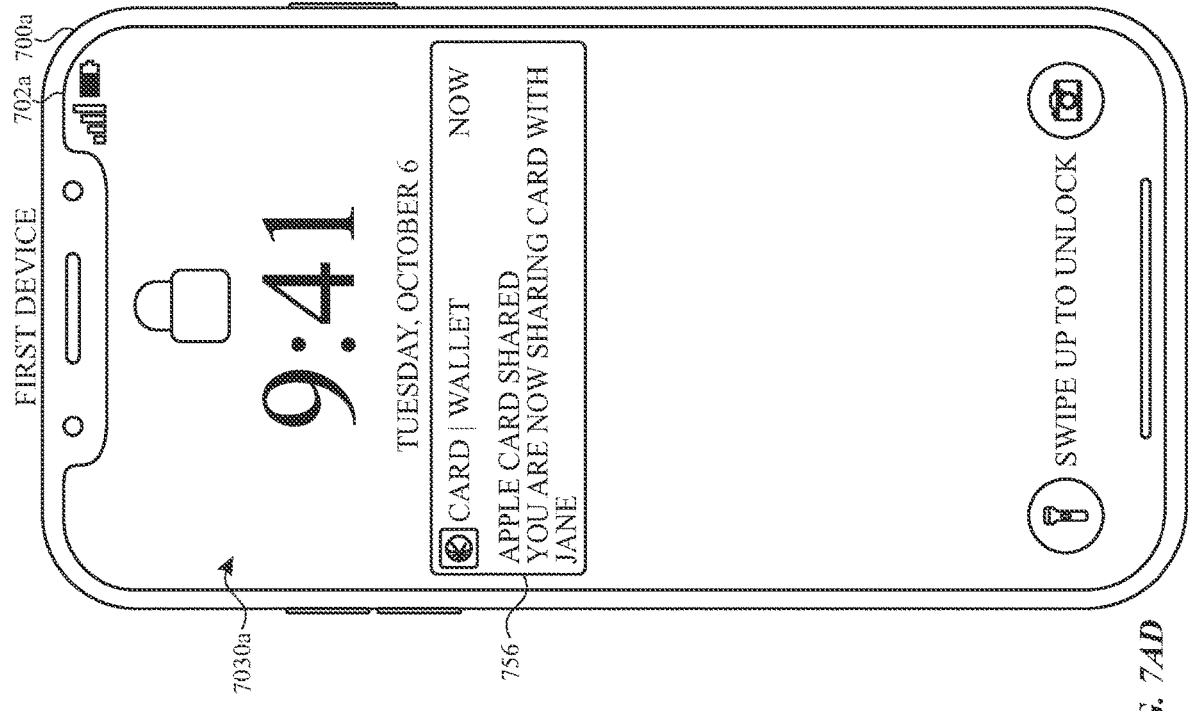
Figure 7A:
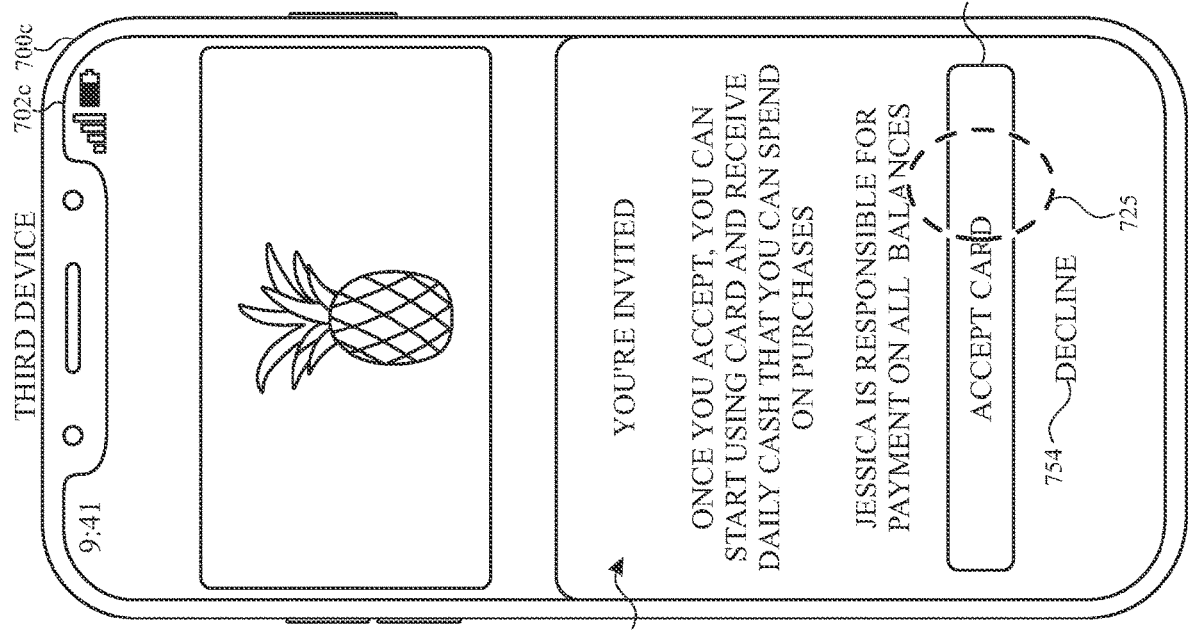
Figure 7A:
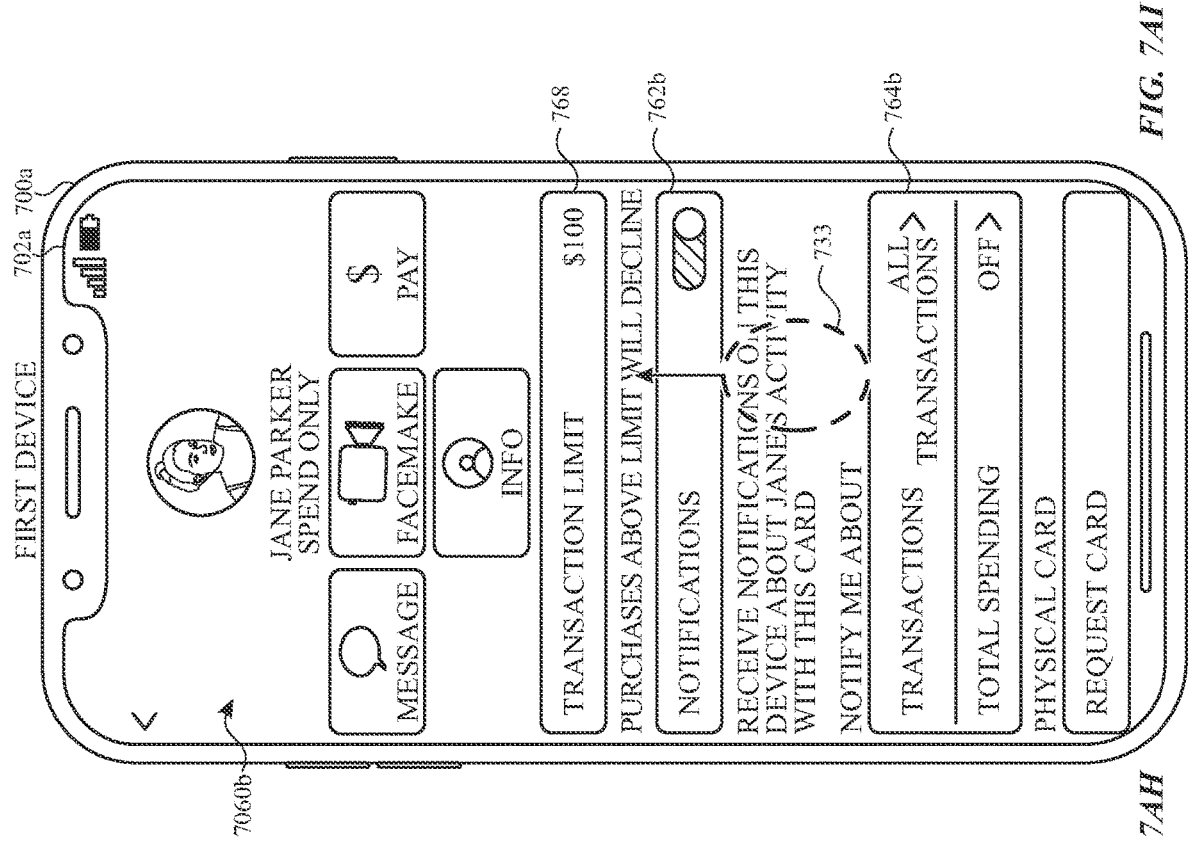
Figure 7A:
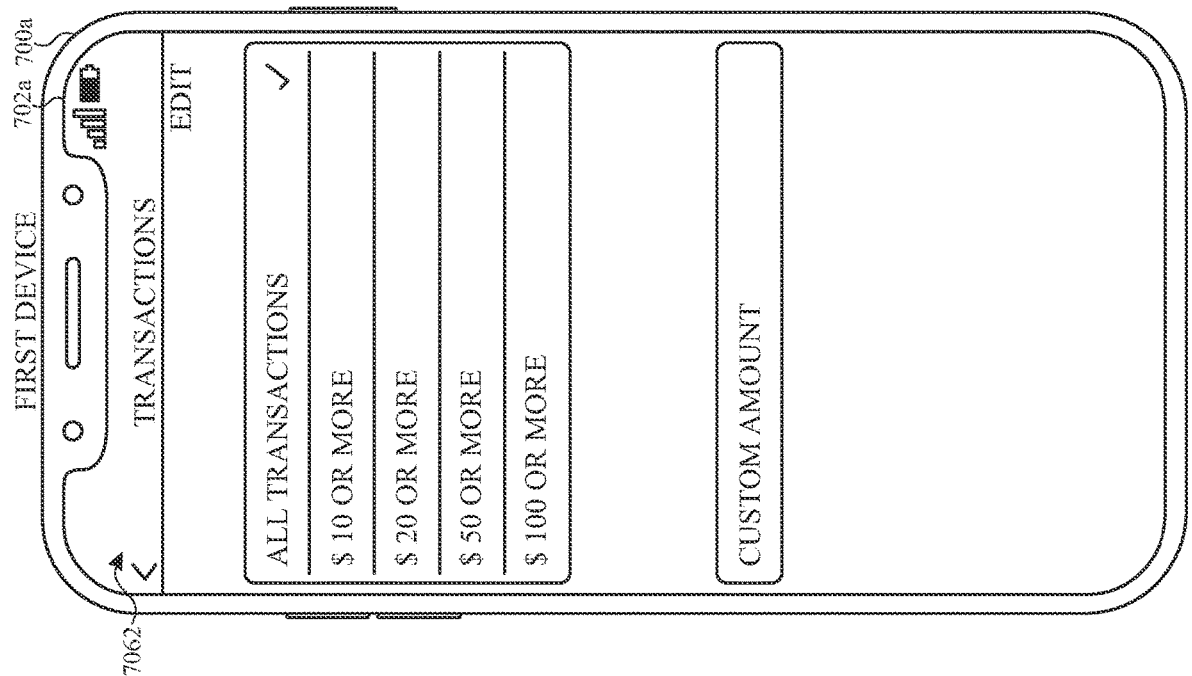
Figure 7A:
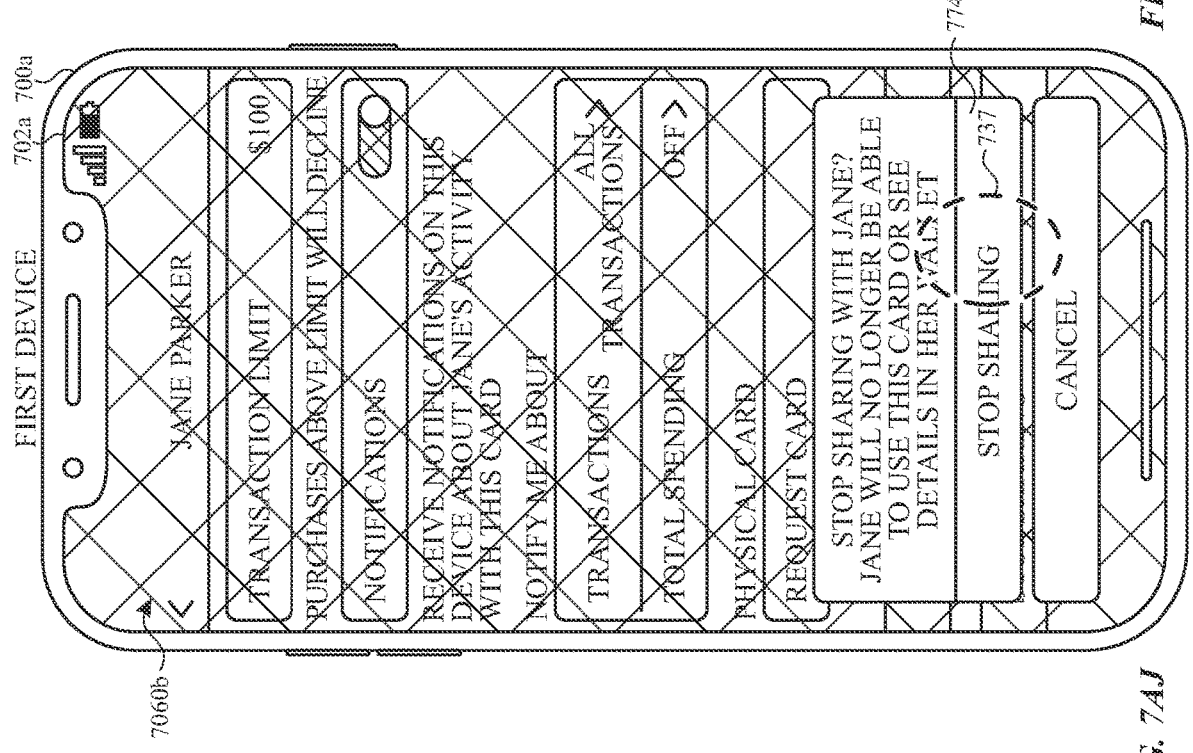
Figure 7A:
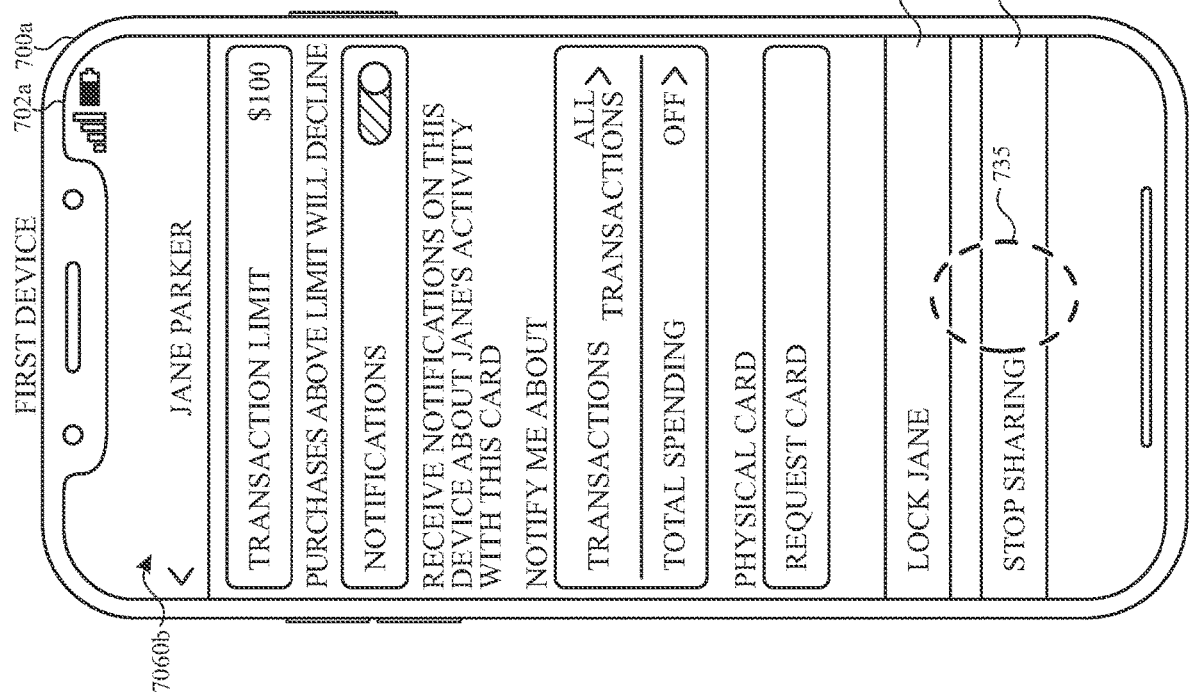
Figure 7A:
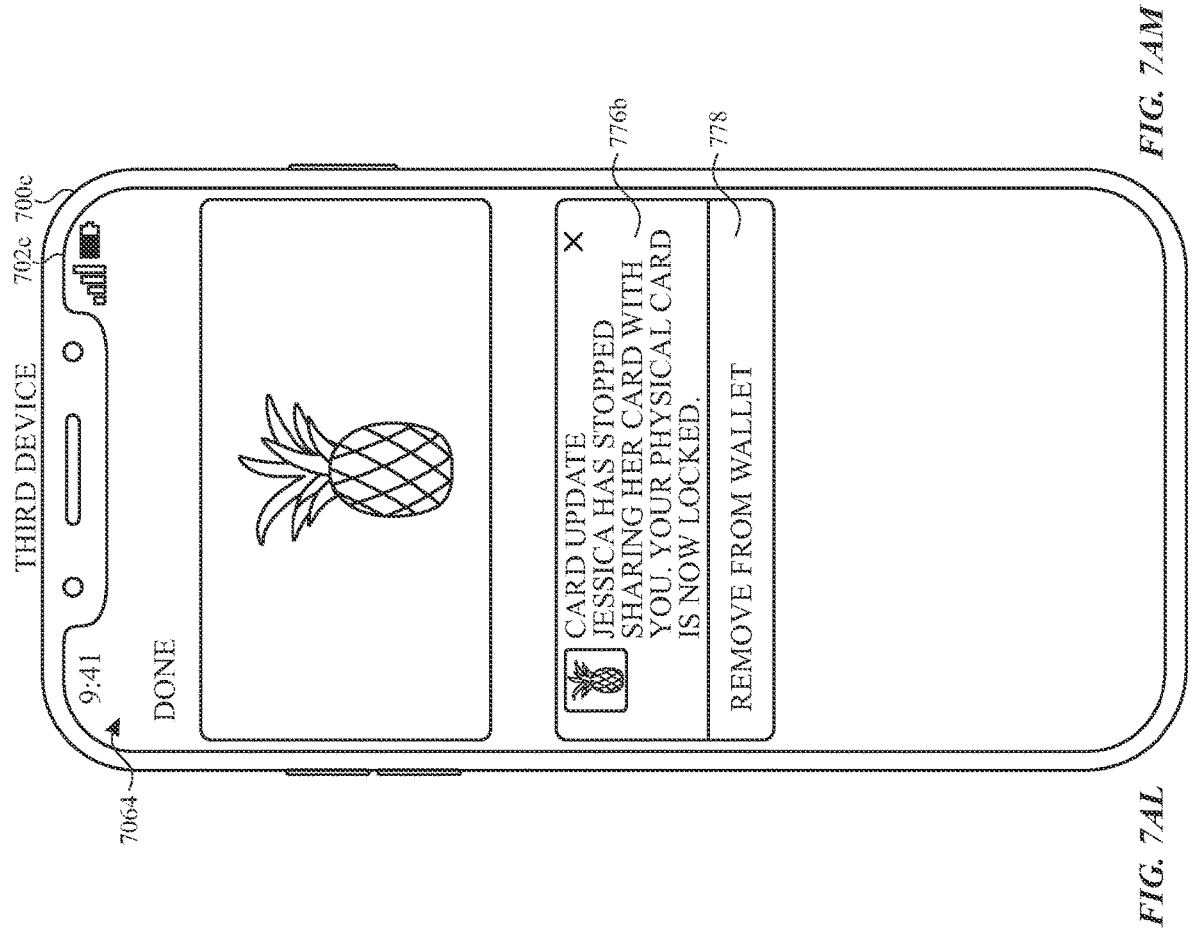
Figure 7A:
Figure 7A:
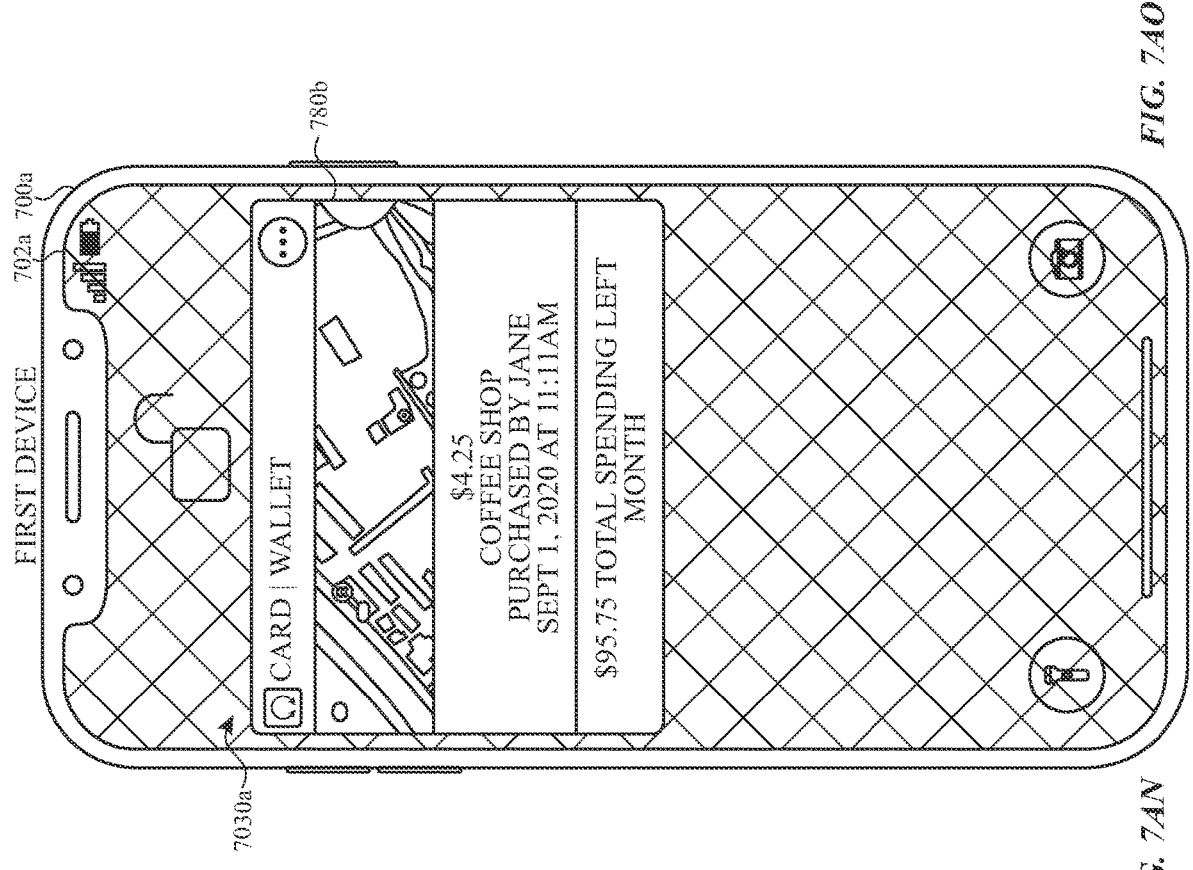
Figure 7A:
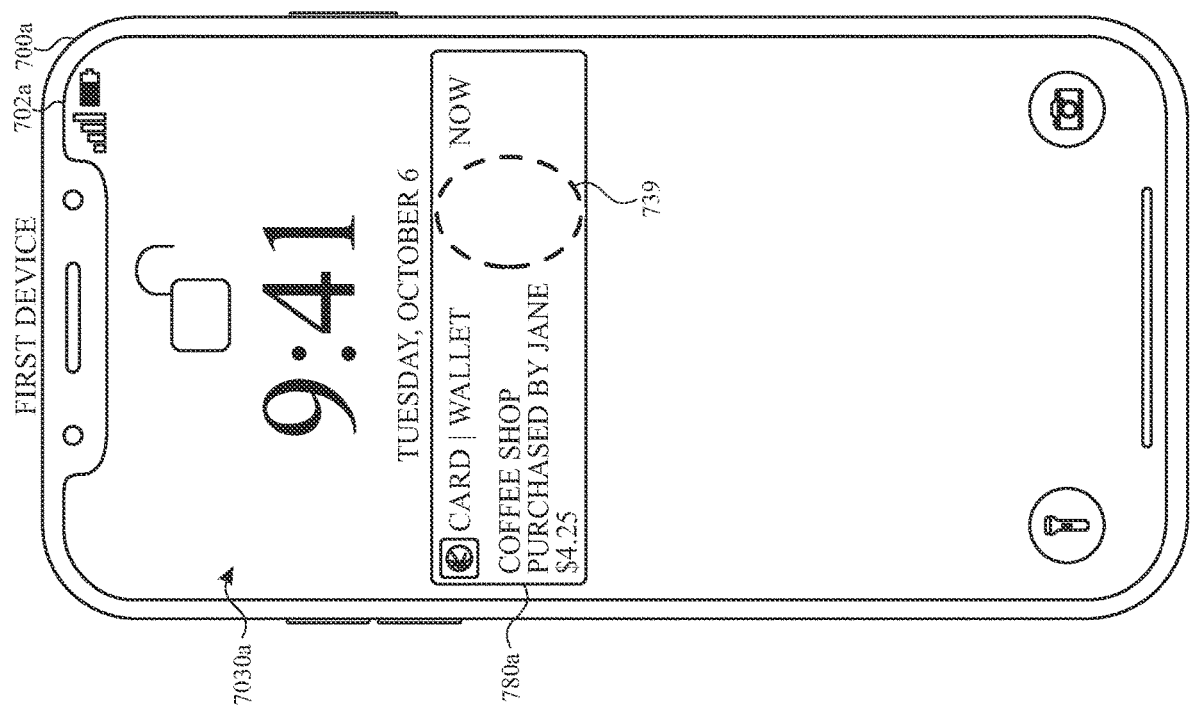
Figure 7A:
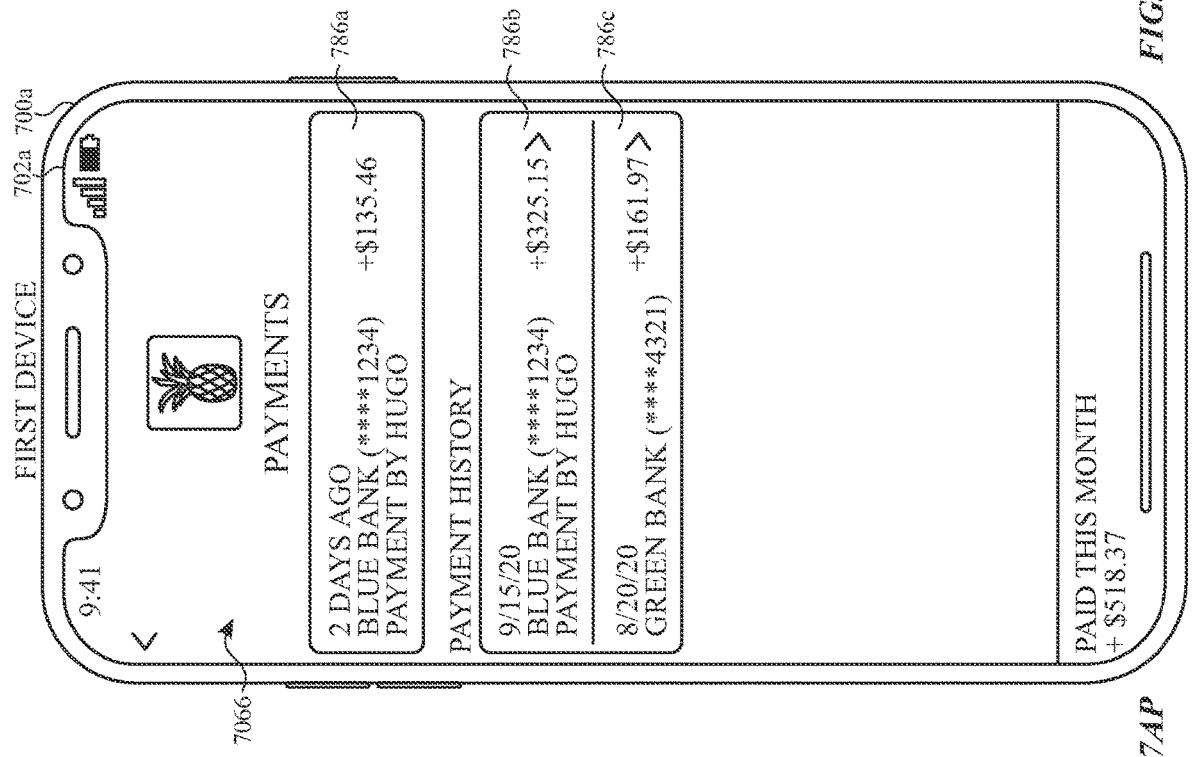
Figure 7A:
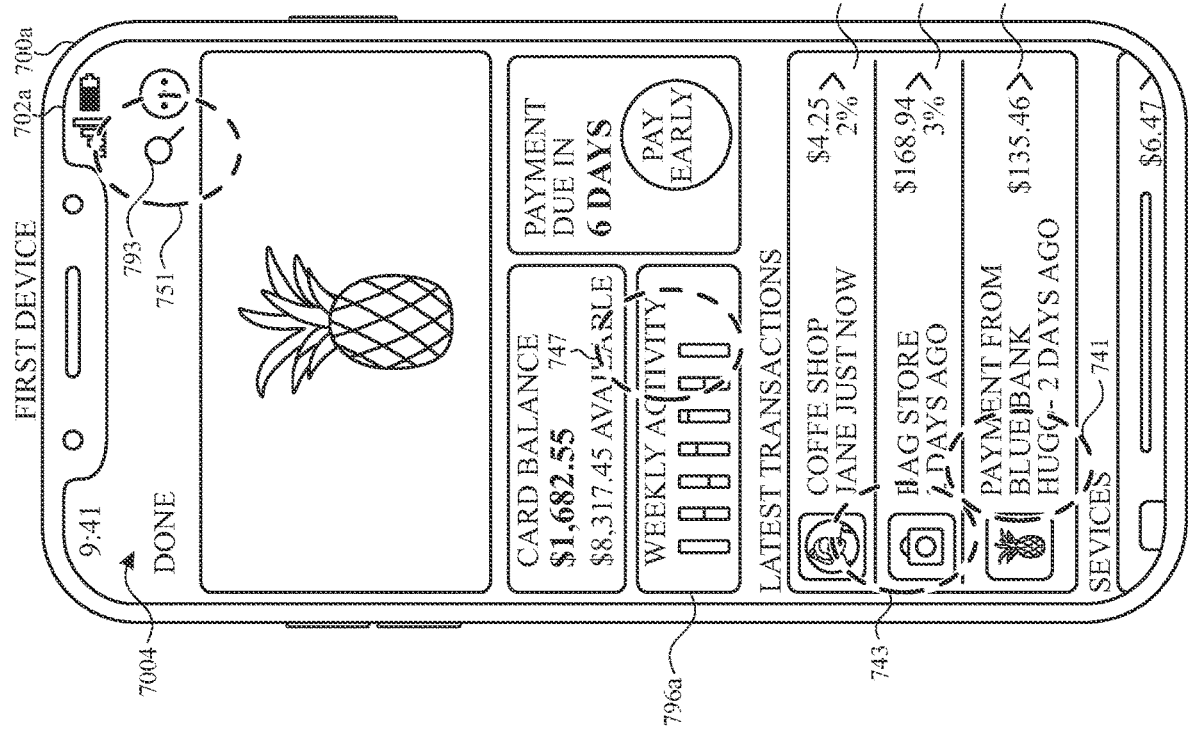
Figure 7A:
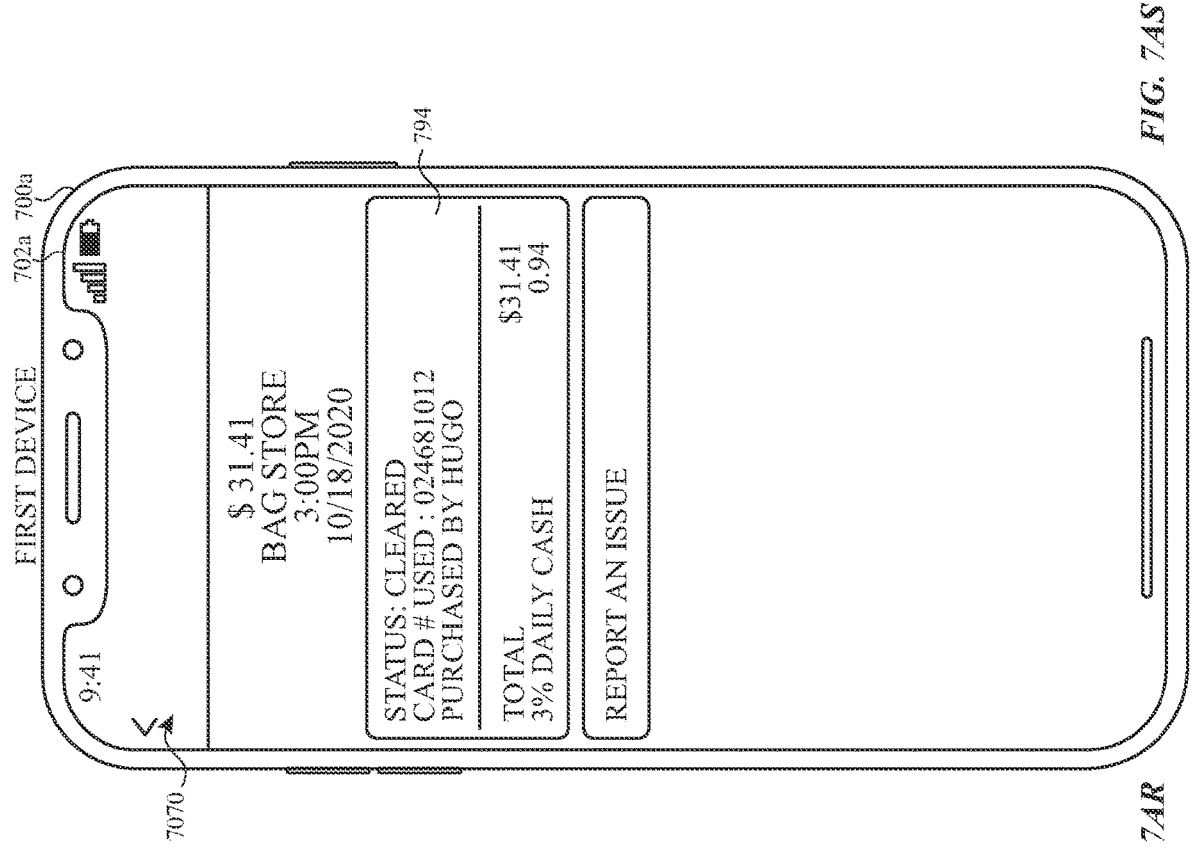
Figure 7A:
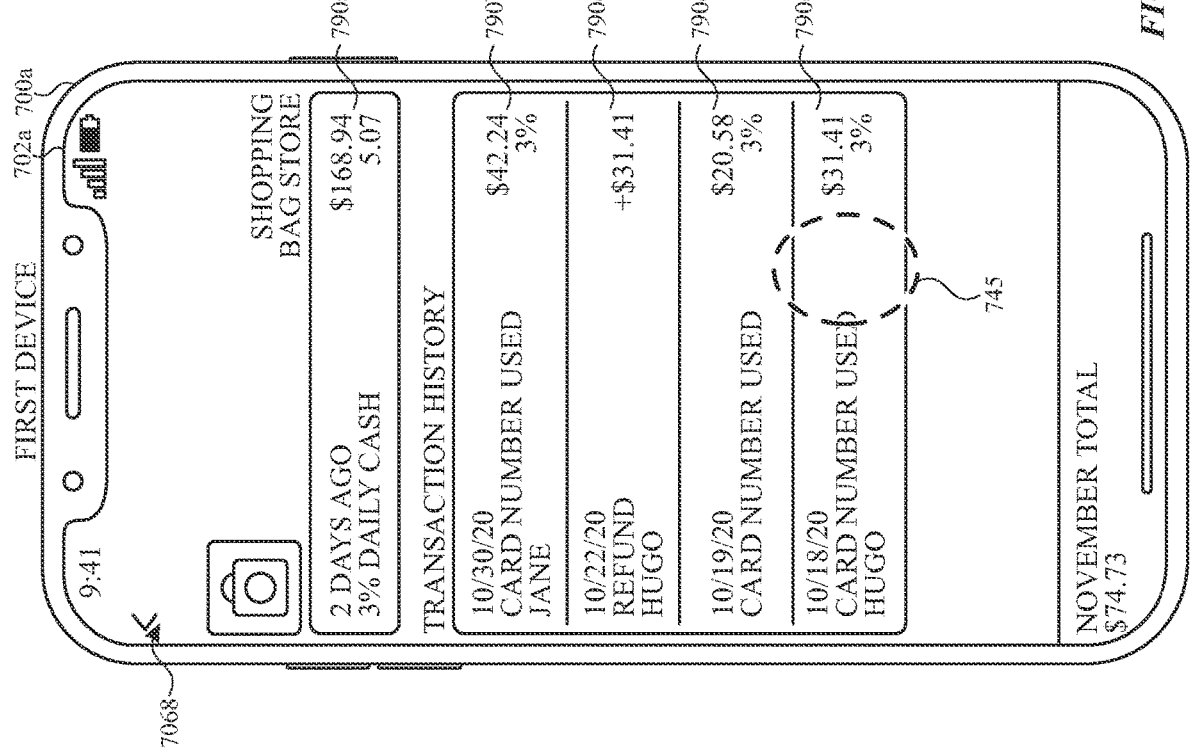
Figure 7A:
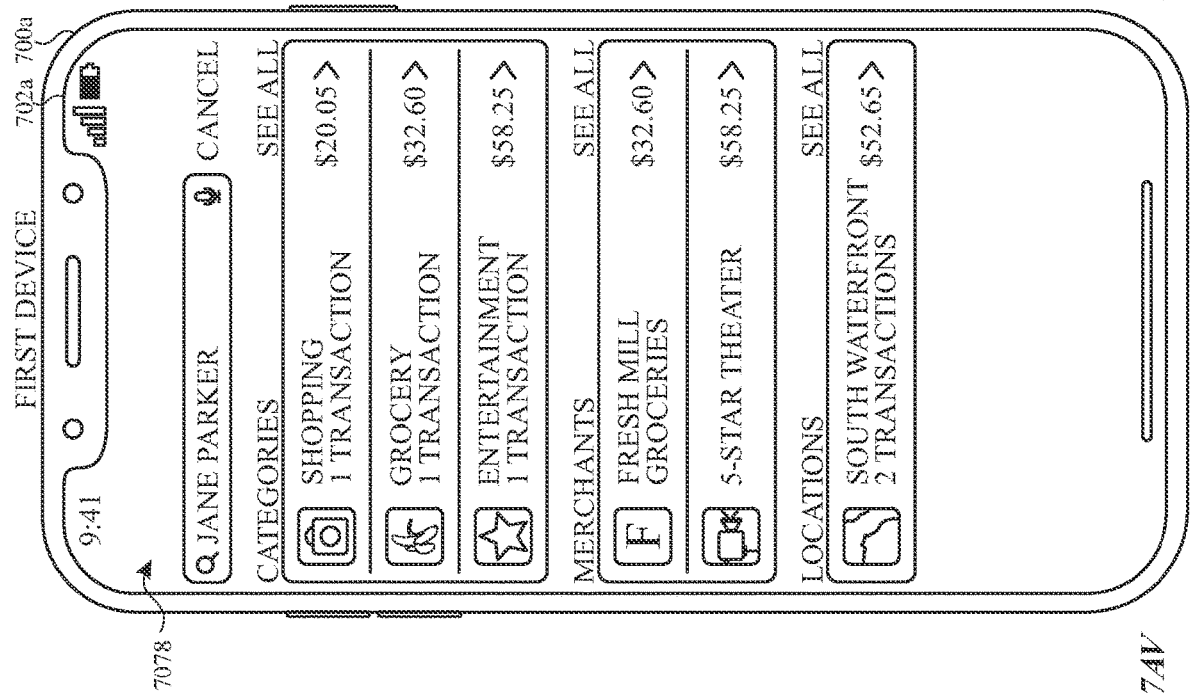
Figure 7A:
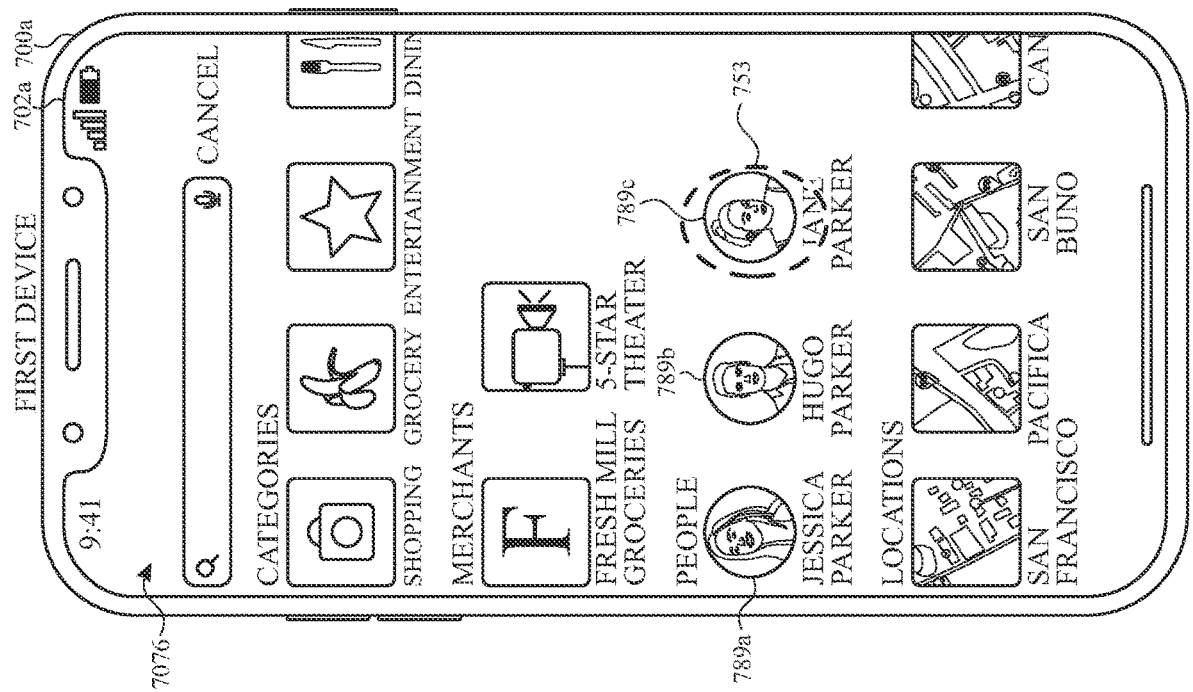
Figure 7A:
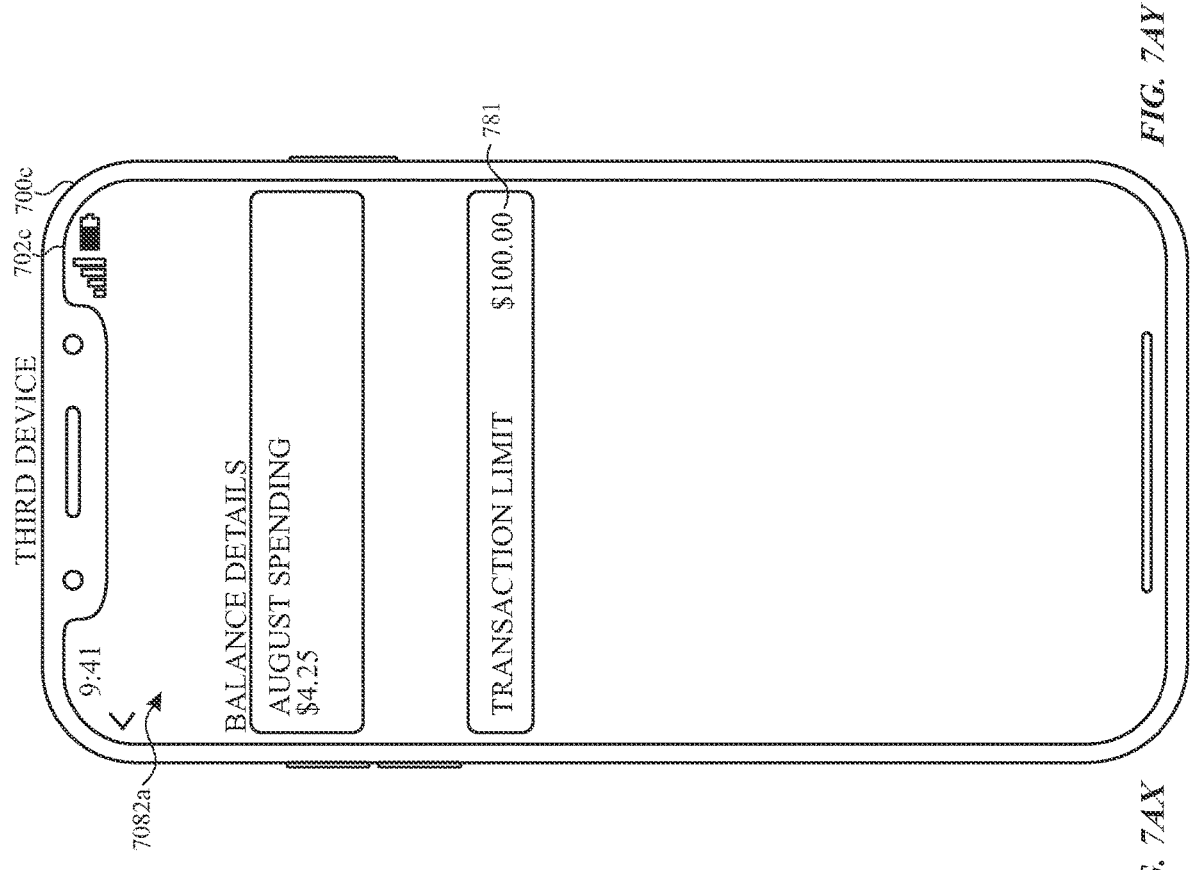
Figure 7A:
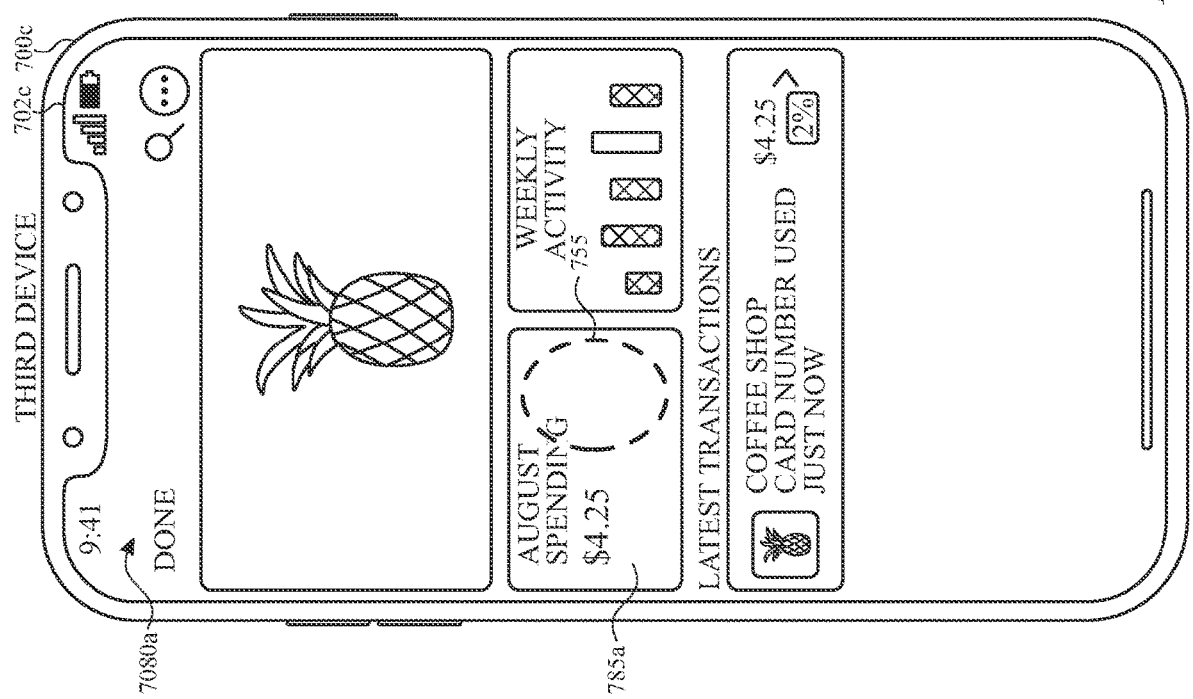
Figure 7A:
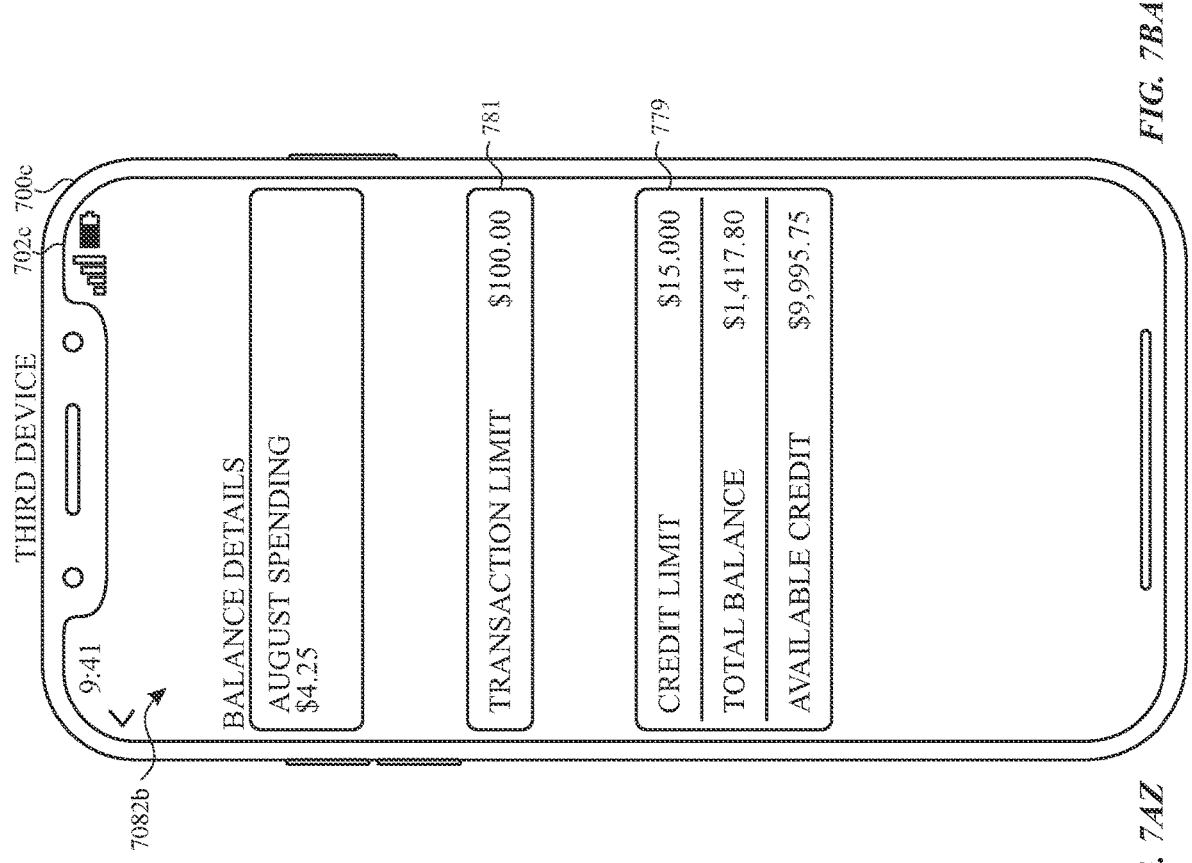

FIG. 7Z illustrates device 700a displaying, on display 702a, user interface 7052. User interface 7052 includes transaction limit field 748. In some embodiments, transaction limit field 748 is displayed in response to detecting input 721 (e.g., a tap gesture) corresponding to the location of second sharing option 718b (e.g., the option for inviting a user to become a participant of the account without becoming a joint owner of the account) on display 702a, as shown in FIG. 7Y. In some embodiments, before inviting a respective family member to become a participant of the account, device 700a receives, from the first user identity associated with device 700a (e.g., the primary account owner), a limit on the amount the respective family member can spend using the account. In some embodiments, the limit is per transaction (e.g., a maximum amount that can be spent on a single transaction). In some embodiments, the limit is for a predetermined period of time (e.g., a maximum amount that can be spent over a week or over a month).

FIG. 7AA illustrates device 700a displaying, on display 702a, user interface 7054. User interface 7054 includes a confirmation notification indicating that the respective family member has been invited to become a participant of the account without becoming a joint owner of the account. In some embodiments, the confirmation notification shown in FIG. 7AA is displayed in response to detecting input 723 (e.g., a tap gesture) corresponding to the location of next affordance 758 on display 702a, as shown in FIG. 7Z.

FIG. 7AB illustrates device 700a displaying, on display 702a, user interface 7010 for viewing details and settings for the account. As shown in FIG. 7AB, after sending the invitation for the respective family member to become a participant of the account without becoming a joint owner of the account, family member user interface object 728b is included in user interface 7010. In some embodiments, family member user interface object 728b includes an indication of the invitation status for the respective family member (e.g., "invitation pending"). After the respective family member accepts the invitation, the invitation status changes to indicate the current status (e.g., "spend only", as shown in FIG. 7AF).

FIG. 7AC illustrates device 700c (e.g., "third device") associated with a third user identity (e.g., "Jane Parker"). Device 700c receives an indication that the third user identity has been invited to become a participant of the account. In response to receiving the indication, device 700c displays, on display 702c, notification 732c that an invitation to become a participant of the account has been received. In some embodiments, notification 732c is displayed on a lock screen interface 7030c while device 700c is in a locked state.

FIG. 7AD illustrates device 700c displaying, on display 702c, user interface 7056 for becoming a shared user of the account. In some embodiments, user interface 7056 is displayed after receiving an indication that the third user identity has been invited to become a participant of the account. In some embodiments, user interface 7056 is displayed in response to detecting a selection of notification 732c, as shown in FIG. 7AC (e.g., a tap gesture, a swipe gesture, a long press gesture on notification 732c). In some embodiments, user interface 7056 is displayed in response to detecting a request to access a service associated with the account (e.g., in response to launching an application associated with the service (e.g., a wallet application)). In contrast to becoming a joint owner of the account (as described in reference to FIGS. 7K-7P), no additional information needs to be provided in order for the third user identity to accept the invitation and become a participant of the account.

User interface 7056 includes information about the type of account sharing being offered (e.g., a participant account, where the third user identity associated with device 700c can use the account without being a joint owner of the account). User interface 7056 further includes accept affordance 752 and decline affordance 754. If accept affordance 752 is selected (e.g., with a tap gesture), the third user identity associated with device 700c will become a participant of the account. In some embodiments, in contrast to becoming a joint owner of the account (as described in reference to FIGS. 7K-7P), no additional information needs to be provided in order for the third user identity to accept the invitation and become a participant of the account. If decline affordance 754 is selected, the third user identity associated with device 700c will not become a participant of the account.

FIG. 7AE illustrates device 700a (e.g., "first device") associated with the first user identity (e.g., the primary account owner) displaying, on display 702a, notification 756 that the third user identity has accepted the invitation to become a participant of the account. In some embodiments, notification 756 is displayed in response to receiving an indication that the third user identity has accepted the invitation to become a joint owner of the account. In some embodiments, notification 756 is displayed on a lock screen interface 7030a while device 700a is in a locked state.

FIG. 7AF illustrates device 700a displaying, on display 702a, user interface 7010 for viewing details and settings for the account. As shown in FIG. 7AF, the status for the second user identity associated with family member user interface object 728a is "co-owner", and the status for the third user identity associated with family member user interface object 728b is "spend only". The "co-owner" status indicates that the second user identity is a joint owner of the account and has access to all account funds and account information. The "spend only" status indicates that the third user identity is a participant of the account (not a joint owner) and does not have access to all account funds or account information (e.g., does not have access to view transactions performed by other user entities using the account).

FIG. 7AG illustrates device 700a displaying, on display 702a, user interface 7060a for viewing settings for a joint owner of the account (e.g., settings for "Hugo Parker"). In some embodiments, user interface 7060a is displayed in response to detecting input 727 (e.g., a tap gesture) corresponding to the location of family member user interface object 728a on display 702a (e.g., the user interface object corresponding to the second user identity "Hugo Parker"), as shown in FIG. 7AF. As shown in FIG. 7AG, user interface 7060a includes option 762a for enabling notifications for the second user identity (e.g., for a joint owner of the account). In some embodiments, enabling option 762a enables notifications to be provided when (e.g., each time) the account is used by the second user identity. In some embodiments, enabling option 762a enables notifications to be provided when (e.g., each time) the second user identity uses the account for a transaction over a transaction amount threshold. In some embodiments, the transaction amount threshold is a threshold amount for a single transaction (e.g., a notification is provided if a single transaction is over $10, over $20, over $50, over $100, or over another custom amount). In some embodiments, the transaction amount threshold is a total amount spent during a specific time period (e.g., a day, a week, a month) (e.g., a notification is provided if a transaction causes the total amount spent during a specific time period to exceed the transaction amount threshold (e.g., $10, $20, $50, $100, or another custom amount)). In some embodiments, the transaction amount threshold is set or modified by selecting transaction threshold user interface object 764a.

FIG. 7AH illustrates device 700a displaying, on display 702a, user interface 7062 for selecting a transaction amount threshold. In some embodiments, user interface 7062 is displayed in response to detecting input 729 (e.g., a tap gesture) corresponding to the location of transaction threshold user interface object 764a, as shown in FIG. 7AG. In some embodiments, as shown in FIG. 7AH, user interface 7062 includes a plurality of transaction amount threshold options. Each threshold option corresponds to a different transaction amount threshold (e.g., over $10, over $20, over $50, over $100, over a custom amount). In some embodiments, after detecting a user input corresponding to selection of a transaction amount threshold, a notification will be provided when (e.g., each time) a transaction is completed that exceeds the selected transaction amount threshold (e.g., when a single transaction exceeds the threshold and/or when the total amount spent over a specific time period exceeds the threshold). In some embodiments, transactions that do not exceed the selected transaction amount threshold will not cause a notification to be provided.

FIG. 7AI illustrates device 700a displaying, on display 702a, user interface 7060b for viewing settings for a participant of the account (e.g., settings for "Jane Parker"). In some embodiments, user interface 7060b is displayed in response to detecting input 731 (e.g., a tap gesture) corresponding to the location of family member user interface object 728b on display 702a (e.g., the user interface object corresponding to the third user identity "Jane Parker"), as shown in FIG. 7AF. In some embodiments, as shown in FIG. 7AI, user interface 7060b includes indication 768 of a transaction limit (e.g., $100) for the third user identity using the account. In some embodiments, if the third user identity attempts to complete a transaction for an amount exceeding the transaction limit, the transaction will not be completed. In some embodiments, user interface 7060b further includes option 762b for enabling notifications for the third user identity (e.g., for a participant of the account). In some embodiments, enabling option 762b enables notifications to be provided when (e.g., each time) the account is used by the third user identity. In some embodiments, enabling option 762b enables notifications to be provided when (e.g., each time) the third user identity uses the account for a transaction over a transaction amount threshold (e.g., over $10, over $20, over $50, over $100, over a custom amount). In some embodiments, the transaction amount threshold is set or modified by selecting transaction threshold user interface object 764b.

FIG. 7AJ illustrates device 700a displaying, on display 702a, an additional portion of user interface 7060b. In some embodiments, the additional portion of user interface 7060b is displayed in response to detecting input 733 (e.g., a swipe gesture) on user interface 7060b, as shown in FIG. 7AI. In some embodiments, as shown in FIG. 7AJ, the additional portion of user interface 7060b includes lock option 770 that, when selected, disables the third user identity (e.g., a participant of the account) from using the account for transactions, while continuing to share the account with the third user identity. In some embodiments, after detecting a selection of lock option 770 (e.g., a tap gesture on lock option 770), the third user identity is prevented from using the account for completing transactions without removing the third user identity as a participant of the account (e.g., the third user identity can view previous transaction information, but cannot use the account to complete new transactions; the account is locked for the third user identity). In some embodiments, as shown in FIG. 7AJ, the additional portion of user interface 7060b further includes stop sharing option 772 that, when selected, ceases sharing of the account with the third user identity (e.g., removes the third user identity as a participant of the account). In some embodiments, after detecting a selection of stop sharing option 772 (e.g., a tap gesture on stop sharing option 772), sharing of the account with the third user identity is ceased (e.g., the third user identity cannot view previous transactions or use the account for new transactions; the third user identity is removed as a participant of the account).

FIG. 7AK illustrates device 700a displaying, on display 702a, confirmation affordance 774 overlaying user interface 7060b. In some embodiments, confirmation affordance 774 is displayed in response to detecting input 735 (e.g., a tap gesture) corresponding to stop sharing option 772 on display 702a, as shown in FIG. 7AJ. In some embodiments, confirmation affordance 774 is displayed to confirm sharing of the account with the third user identity will be ceased. In some embodiments, after detecting a selection of confirmation affordance 774 (e.g., a tap gesture on confirmation affordance 774), sharing of the account with the third user identity is ceased (e.g., the third user identity cannot view previous transactions or use the account for new transactions; the third user identity is removed as a participant of the account).

FIG. 7AL illustrates device 700c (e.g., "third device") associated with the third user identity (e.g., "Jane Parker") displaying, on display 702c, notification 776a that sharing of the account has ceased. In some embodiments, notification 776a is displayed after receiving an indication that an owner of the account has requested that sharing of the account with the third user identity be ceased (e.g., after input 737 (e.g., a tap gesture) corresponding to confirmation affordance 774 is detected by device 700a on display 702a, as shown in FIG. 7AK). In some embodiments, notification 776a is displayed on a lock screen interface 7030c while device 700c is in a locked state. In some embodiments, notification 776a indicates that the third user identity has been removed as a participant of the account and can no longer view previous transactions or use the account to complete new transactions.

FIG. 7AM illustrates device 700c displaying, on display 702c, a user interface 7064 for a wallet application. In some embodiments, user interface 7064 is displayed in response to detecting an input (e.g., a tap gesture, a swipe gesture, a long press gesture) on notification 776a, as shown in FIG. 7AL. In some embodiments, user interface 7064 includes notification 776b that sharing of the account has ceased. In some embodiments, notification 776b is displayed after receiving an indication that an owner of the account has requested that sharing of the account with the third user identity be ceased (e.g., after input 737 (e.g., a tap gesture) corresponding to confirmation affordance 774 is detected by device 700a on display 702a, as shown in FIG. 7AK). In some embodiments, notification 776b indicates that the third user identity has been removed as a participant of the account and can no longer view previous transactions or use the account to complete new transactions. In some embodiments, notification 776b includes remove affordance 778 for removing a representation of the account (e.g., a representation of a card associated with the account) from the wallet application.

FIG. 7AN illustrates device 700a (e.g., "first device") associated with the first user identity (e.g., the primary account owner) displaying, on display 702a, notification 780a indicating that a transaction has been completed. In some embodiments, notification 780a is displayed after a transaction has been completed that is over a transaction limit (e.g., a total spending limit over a set duration (e.g., a per transaction limit, a daily limit, a weekly limit, and/or a monthly limit)). In some embodiments, notification 780a is displayed when a transaction has been completed that is over a transaction amount threshold (e.g., as set in user interface 766, as shown in FIG. 7AH). In some embodiments, notification 780a is displayed on lock screen interface 7030a. In some embodiments, notification 780a includes a summary of a transaction (e.g., by the first user identity, by the second user identity, by the third user identity, by a participant, and/or by a joint owner). In some embodiments, the summary of the transaction includes a merchant name, a transaction amount, and/or an indication of the user identity that completed the transaction. In some embodiments, in response to detecting a user input (e.g., a tap gesture, a swipe gesture) on notification 780a, an application associated with the account (e.g., a wallet application) is displayed.

FIG. 7AO illustrates device 700a displaying, on display 702a, notification 780b including detailed information for a transaction. In some embodiments, notification 780b is displayed in response to detecting input 739 (e.g., a long press gesture) corresponding to the location of notification 780*a* on display 702*a*, as shown in FIG. 7AN. In some embodiments, notification 780*b* is displayed on lock screen interface 7030*a*. In some embodiments, detailed information for the transaction includes a merchant name, a transaction amount, a transaction time, an indication of the user identity that completed the transaction, merchant location information (e.g., an address of the merchant and/or a location on a map of the merchant), and/or an indication of the total spending with the account over a predetermined time (e.g., over a day, over a week, over a month). In some embodiments, in response to detecting a user input (e.g., a tap gesture, a swipe gesture, a long press gesture) on notification 780*b*, an application associated with the account (e.g., a wallet application) is displayed.

FIG. 7AP illustrates device 700*a* displaying, on display 702*a*, user interface 7004 for viewing details and settings for the account. In some embodiments, user interface 7004 includes a plurality (e.g., list) of transactions 782*a*-782*c* for the account. In some embodiments, the plurality (e.g., list) of transactions 782*a*-782*c* include transactions completed by all user identities associated with the account (e.g., the first user identity, the second user identity, the third user identity, a participant, and/or a joint owner). In some embodiments, each transaction in the plurality (e.g., list) of transactions 782*a*-782*c* includes an indication of the user identity (e.g., a name of a family member) that completed the transaction (e.g., based on the transaction having been initiated by the respective user identity). In some embodiments, the indication of the user identity (e.g., the name of a family member) is omitted from transactions completed by the first user identity associated with device 700*a* (e.g., no name is shown for the primary account owner associated with device 700*a*).

In some embodiments, as shown in FIG. 7AP, user interface 7004 further includes activity user interface object 796*a* and/or search icon 793.

FIG. 7AQ illustrates device 700*a* displaying, on display 702*a*, user interface 7066 for viewing payment transactions. In some embodiments, user interface 7066 is displayed in response to detecting input 741 (e.g., a tap gesture) corresponding to transaction 782*c* on display 702*a*, as shown in FIG. 7AP. In some embodiments, user interface 7066 includes a plurality (e.g., list) of payment transactions 786*a*-786*c* for the account. In some embodiments, the plurality (e.g., list) of payment transactions 786*a*-786*c* include transactions completed by all user identities associated with the account (e.g., the first user identity, the second user identity, the third user identity, a participant, and/or a joint owner). In some embodiments, each transaction in the plurality (e.g., list) of payment transactions 786*a*-786*c* includes an indication of the user identity (e.g., a name of a family member) that completed the transaction (e.g., based on the transaction having been initiated by the respective user identity). In some embodiments, the indication of the user identity (e.g., the name of a family member) is omitted from payment transactions completed by the first user identity associated with device 700*a* (e.g., no name is shown for the primary account owner associated with device 700*a*).

FIG. 7AR illustrates device 700*a* displaying, on display 702*a*, user interface 7068 for viewing transactions associated with a respective merchant. In some embodiments, user interface 7068 is displayed in response to detecting input 743 (e.g., a tap gesture) corresponding to transaction 782*b* on display 702*a*, as shown in FIG. 7AP. In some embodiments, user interface 7068 includes a plurality (e.g., list) of transactions 790*a*-790*e* associated with a respective merchant (e.g., "Bag Store"). In some embodiments, the respective merchant corresponds to the merchant where transaction 782*b* (as shown in FIG. 7AP) was completed. In some embodiments, the plurality (e.g., list) of transactions 790*a*-790*e* associated with the respective merchant include transactions completed by all user identities associated with the account (e.g., the first user identity, the second user identity, the third user identity, a participant, and/or a joint owner). In some embodiments, each transaction in the plurality (e.g., list) of transactions 790*a*-790*e* associated with the respective merchant includes an indication of the user identity (e.g., a name of a family member) that completed the transaction (e.g., based on the transaction having been initiated by the respective user identity). In some embodiments, the indication of the user identity (e.g., the name of a family member) is omitted from transactions associated with the respective merchant that were completed by the first user identity associated with device 700*a* (e.g., no name is shown for the primary account owner associated with device 700*a*).

FIG. 7AS illustrates device 700*a* displaying, on display 702*a*, user interface 7070 including detailed information 794 for a transaction. In some embodiments, user interface 7070 is displayed in response to detecting input 745 (e.g., a tap gesture) corresponding to the location of transaction 790*e* on display 702*a*, as shown in FIG. 7AR. In some embodiments, detailed information 794 for the transaction includes a merchant name, a transaction amount, a cash back amount (e.g., a percentage of the transaction amount that will be returned to a cash account), an indication of the user identity that completed the transaction, and/or an indication of the card number used for the transaction. In some embodiments, the indication of the user identity (e.g., the name of a family member) is omitted if the transaction was completed by the first user identity associated with device 700*a* (e.g., no name is shown for the primary account owner associated with device 700*a*).

FIG. 7AT illustrates device 700*a* displaying, on display 702*a*, activity interface 7072 for all user identities associated with the account (e.g., the first user identity, the second user identity, the third user identity, a participant, and/or a joint owner). In some embodiments, activity interface 7072 is displayed in response to detecting input 747 (e.g., a tap gesture) corresponding to the location of activity user interface object 796*a* on display 702*a*, as shown in FIG. 7AP. In some embodiments, activity interface 7072 includes activity chart 798 indicating an amount spent per day by all user identities associated with the account (e.g., the first user identity, the second user identity, the third user identity, a participant, and/or a joint owner). In some embodiments, activity interface 7072 includes user identity user interface objects 799*a*-799*c* for a plurality of user identities associated with the account. In some embodiments, each of the user identity user interface objects 799*a*-799*c* include in indication of the amount spent by the respective user identity over a predetermined time period (e.g., daily spend, weekly spend, monthly spend).

FIG. 7AU illustrates device 700*a* displaying, on display 702*a*, activity interface 7074 for the third user identity associated with the account. In some embodiments, activity interface 7074 is displayed in response to detecting input 749 (e.g., a tap gesture) corresponding to the location of user identity user interface object 799*b* (e.g., corresponding to the third user identity "Jane Parker") on display 702*a*, as shown in FIG. 7AT. In some embodiments, activity interface 7074 includes activity chart 795 indicating an amount spent per day by the third user identity. In some embodiments, activity chart 795 indicates the amount spent per day by the third user identity by highlighting (e.g., with a different color) the amount spent by the third user identity, while not highlighting the amount spent by other user identities (e.g., the first user identity, the second user identity, a participant, and/or a joint owner). In some embodiments, activity chart 795 indicates the amount spent per day by the third user identity by only showing the amount spent by the third user identity and omitting the amount spent by other user identities (e.g., the first user identity, the second user identity, a participant, and/or a joint owner).

FIG. 7AV illustrates device 700a displaying, on display 702a, search interface 7076. In some embodiments, search interface 7076 is displayed in response to detecting input 751 (e.g., a tap gesture) corresponding to the location of search icon 793, as shown in FIG. 7AP. In some embodiments, search interface 7076 includes family member user interface objects 789a-789c. While shown with three family member user interface objects in FIG. 7AV, the number of family member user interface objects may vary based on the number of family members with which a user of device 700a has established a relationship. In some embodiments, the family member user interface objects included in search interface 7076 include all family members with which a user of device 700a has established a relationship. In some embodiments, the family member user interface objects included in search interface 7076 include all family members with which the account has been shared (e.g., all participants and owners of the account).

FIG. 7AW illustrates device 700a displaying, on display 702a, search interface 7078. In some embodiments, search interface 7078 is displayed in response to detecting input 753 (e.g., a tap gesture) corresponding to the location of family member user interface object 789c (e.g., corresponding to the third user identity "Jane Parker"), as shown in FIG. 7AV. In some embodiments, selecting a family member user interface object, as shown in FIG. 7AV, causes the name of the selected family member to be entered into a search field of the search interface 7078, as shown in FIG. 7AW. In some embodiments, selecting a family member user interface object, as shown in FIG. 7AV, causes a plurality (e.g., list) of transactions associated with the selected family member to be displayed in search interface 7078, as shown in FIG. 7AW.

FIG. 7AX illustrates device 700c (e.g., "third device") associated with the third user identity (e.g., "Jane Parker") displaying, on display 702c, user interface 7080a for viewing details and settings for the account. In some embodiments, user interface 7080a includes a plurality (e.g., list) of transactions associated with the third user identity, without including transactions associated with other user identities (e.g., the first user identity, the second user identity, other owners of the account, other participants of the account). In some embodiments, user interface 7080a further includes spending summary 785a. In some embodiments, spending summary 785a includes an indication of an amount the third user identity has spent over a predetermined time period (e.g., a day, a week, a month).

FIG. 7AY illustrates device 700c displaying, on display 702c, user interface 7082a for viewing account details for the third user identity. In some embodiments, user interface 7082a is displayed in response to detecting input 755 (e.g., a tap gesture) corresponding to the location of spending summary 785a on display 702c, as shown in FIG. 7AX. In some embodiments, user interface 7082a includes an indication of an amount the third user identity has spent over a predetermined time period (e.g., a day, a week, a month) and/or a transaction limit 781 for the third user identity (e.g., a per transaction limit; a limit for the total amount that can be spent using the account over a predetermined time period (e.g., a day, a week, a month)).

FIG. 7AZ illustrates device 700c (e.g., "third device") associated with the third user identity (e.g., "Jane Parker") displaying, on display 702c, user interface 7080b for viewing details and settings for the account. In some embodiments, user interface 7080b includes a plurality (e.g., list) of transactions associated with the third user identity, without including transactions associated with other user identities (e.g., the first user identity, the second user identity, other owners of the account, other participants of the account). In some embodiments, user interface 7080b further includes spending summary 785b. In some embodiments, spending summary 785b includes an indication of an amount the third user identity has spent over a predetermined time period (e.g., a day, a week, a month) and/or an amount of credit available for the account. In some embodiments, the amount of credit available for the account is included in spending summary 785b when the third user identity is over 18 years old. In some embodiments, the amount of credit available for the account is included in spending summary 785b when an option has been enabled allowing the amount of credit available for the account to be displayed to the third user identity (e.g., when an owner of the account (e.g., the first user identity and/or the second user identity) enables the amount of credit available for the account to be displayed to the third user identity).

FIG. 7BA illustrates device 700c displaying, on display 702c, user interface 7082b for viewing account details for the third user identity. In some embodiments, user interface 7082b is displayed in response to detecting input 757 (e.g., a tap gesture) corresponding to the location of spending summary 785b on display 702c, as shown in FIG. 7AZ. In some embodiments, user interface 7082b includes an indication of an amount the third user identity has spent over a predetermined time period (e.g., a day, a week, a month), a transaction limit 781 for the third user identity (e.g., a per transaction limit; a limit for the total amount that can be spent using the account over a predetermined time period (e.g., a day, a week, a month)), and/or balance information 779 for the account. In some embodiments, balance information 779 indicates the credit limit for the account, the total balance of the account (for all users), and/or the remaining credit available for the account. In some embodiments, balance information 779 is included in user interface 7082b when the third user identity is over 18 years old. In some embodiments, balance information 779 is included in user interface 7082b when an option has been enabled allowing balance information 779 to be displayed to the third user identity (e.g., when an owner of the account (e.g., the first user identity and/or the second user identity) enables balance information 779 to be displayed to the third user identity).

FIG. 8 is a flow diagram illustrating a method for sharing an account with another user identity using a computer system, in accordance with some embodiments. Method 800 is performed at a computer system (e.g., 100, 300, 500, 600a, 700a) associated with a first user identity (e.g., a primary account owner) that is in communication with a display generation component (e.g., 602a, 702a, a display) and one or more input devices (e.g., a touch-sensitive surface). Some operations in method 800 are, optionally, combined, the orders of some operations are, optionally, changed, and some operations are, optionally, omitted.

As described below, method 800 provides an intuitive way for sharing an account with another user identity. The method reduces the cognitive burden on a user sharing an account, thereby creating a more efficient human-machine interface. The method also reduces the need for resources (e.g., computer resources, such as memory), by enabling sharing of the resource among multiple users. For battery-operated computing devices, enabling a user to share an account faster and more efficiently conserves power and increases the time between battery charges.

In method 800, the computer system (e.g., 600a, 700a) (e.g., a smart device, such as a smartphone or a smartwatch; a mobile device) displays (802), via the display generation component (e.g., 602a, 702a), a user interface (e.g., 6014 as shown in FIG. 6D; 7014 as shown in FIG. 7D) for sharing an account associated with the first user identity (e.g., a data storage account, a banking account, and/or a credit account) with a second user identity (e.g., a family member and/or another user with which a user of the computer system has established a relationship). The user interface includes a first sharing option (e.g., 618a, 718a) and a second sharing option (e.g., 618b, 718b).

The computer system detects (804), via the one or more input devices, one or more inputs (e.g., 609, 611, 709, 711, 713, 721) corresponding to a request to share the account (e.g., selection of a sharing option and a "send invitation" affordance on the user interface).

In response (806) to detecting the one or more inputs corresponding to the request to share the account and in accordance (808) with a determination that the one or more inputs include a selection of the first sharing option (e.g., 618a, 718a), the computer system transmits a request to invite the second user identity to become a joint owner of the account (e.g., the second user will have access to all account data storage and data usage information; and/or the second user will have access to all account resources and transaction information). In some embodiments, after selecting the first sharing option, a user interface for confirming the income of the first user identity (e.g., as shown in FIG. 7E) is displayed before transmitting the request to invite the second user identity to become a joint owner of the account.

In some embodiments, after transmitting the request to invite the second user identity to become a joint owner of the account, a computer system associated with the second user identity (e.g., 600b, 700b) displays, via a display generation component (e.g., 602b, 702b), a notification (e.g., 624 as shown in FIG. 6F; 732b as shown in FIG. 7I) that an invitation to become a joint owner of the account has been received. In some embodiments, after transmitting the request to invite the second user identity to become a joint owner of the account, if the second user identity has never been (and/or currently is not) associated with the service providing the account (e.g., the second user identity has not previously been an owner of any account with the service), the computer system associated with the second user identity (e.g., 700b) displays, via a display generation component (e.g., 702b), information about features and responsibilities for being a joint owner of the account (e.g., as shown in FIG. 7J). In some embodiments, after transmitting the request to invite the second user identity to become a joint owner of the account, the computer system associated with the second user identity (e.g., 700b) displays, via a display generation component (e.g., 702b), a series of information entry fields (e.g., as shown FIGS. 7K-7N) (e.g., fields for name, date of birth, phone number, social security number, citizenship, address, and/or income) for verifying the identity of the second user identity and/or for determining whether the second user identity is eligible to become a joint owner of the account. In some embodiments, after transmitting the request to invite the second user identity to become a joint owner of the account, the computer system associated with the second user identity (e.g., 600b, 700b) displays, via a display generation component (e.g., 602b, 702b), details about the account (e.g., user interface 6026 as shown in FIG. 6G; user interface 7042a as shown in FIG. 7Q; user interface 7042b as shown in FIG. 7U). In some embodiments, the details about the account include a credit limit, account balance, percentage rate, and/or terms and conditions for the account. In some embodiments, the percentage rate and/or credit limit is based on a combined credit worthiness of the first user identity and the second user identity.

In response (806) to detecting the one or more inputs corresponding to the request to share the account and in accordance (810) with a determination that the one or more inputs include a selection of the second sharing option (e.g., 618b, 718b), the computer system (e.g., 600a, 700a) transmits a request to invite the second user identity to become a participant of the account without becoming a joint owner of the account (e.g., the second user will have access to a limited amount of data storage and will only see their data usage; and/or the second user will have access to a limited amount of account resources and will only see their own transactions).

Displaying sharing options that, when selected, invite another user identity to become a joint owner of an account or a participant of the account provides enhanced control over how the account can be used by the other user identity (e.g., having access to all account information and funds, or having limited access to account information and funds). Providing enhanced control increases the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after accepting the invitation to become a participant of the account, a computer system associated with the second user identity (e.g., 700c) displays, via a display generation component (e.g., 702c), an offer for a rebate (e.g., cash back on certain types of transactions). In some embodiments, the computer system (e.g., 700a) displays an indication (e.g., 726 as shown in FIG. 7G; 728a as shown in FIG. 7H; 728b as shown in FIG. 7AB) confirming that the request to invite the second user identity to become a participant or a joint owner has been transmitted (e.g., an indication that the invitation is currently pending or has been accepted).

In some embodiments, prior to displaying the first sharing option and the second sharing option, the computer system (e.g., 600a, 700a) displays, via the display generation component (e.g., 602a, 702a), one or more identity user interface objects (e.g., 616a-616c as shown in FIG. 6C; 716a-716c as shown in FIG. 7C) corresponding to one or more user identities available for sharing the account with (e.g., family members and/or other users with which a user of the computer system has established a relationship), where the one or more identity user interface objects includes an identity user interface object corresponding to the second user identity (and not corresponding to the first user identity). In some embodiments, while displaying the one or more identity user interface objects, the computer system (e.g., 600a, 700a) detects, via the one or more input devices, a user input (e.g., 607, 707, 719) directed to a respective identity user interface object of the one or more identity user interface objects. In some embodiments, the user interface for sharing the account (e.g., as shown in FIG. 6D; as shown in FIG. 7D; as shown in FIG. 7Y) (e.g., a data storage account, a banking account, and/or a credit account) with the second user identity is displayed in response to receiving the user input directed to the respective identity user interface object and in accordance with a determination that the respective identity user interface object corresponds to the second user identity. In some embodiments, the one or more identity user interface objects (e.g., 616a-616c; 716a-716c) includes a second identity user interface object corresponding to a third user identity. In some embodiments, a user interface for sharing the account with the third user identity (and not the second user identity) (e.g., as shown in FIG. 7Y) is displayed in response to receiving a user input (e.g., 719) directed to the second identity user interface object. Displaying identity user interface objects corresponding to one or more user identities available for sharing the account with provides enhanced control over who the account is shared with. Providing enhanced control enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Further, enabling sharing of the resources of the account among two user identities makes the computer system more efficient. For example, two user identities may share the same memory space, thereby reducing the need for the computer system to manage two separate memory spaces.

In some embodiments, in accordance with a determination that the one or more inputs (e.g., 721) include a selection of the second sharing option (e.g., 718b), the computer system (e.g., 700a) displays, via the display generation component (e.g., 702a), an option to configure a transaction limit for the second user identity (e.g., as shown in FIG. 7Z) (e.g., a per transaction spending limit and/or a total spending limit over a set duration (e.g., a daily limit, a weekly limit, and/or a monthly limit)). In some embodiments, a series of one or more inputs is detected corresponding to entry of an amount for the transaction limit for the second user identity. Displaying an option to configure a transaction limit for another user identity provides enhanced control over how much the second user identity can spend using the account. Providing enhanced control enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Further, transaction limits enable the computer system to limit overconsumption of computer resources. For example, users may be limited in how much memory they may consume per file and/or over a duration of time.

In some embodiments, after transmitting the request to invite the second user identity to become a joint owner of the account, the computer system (e.g., 600a, 700a) receives an indication that the second user identity has accepted the invitation to become a joint owner of the account. In some embodiments, after receiving the indication (e.g., in response to detecting activation of a displayed notification (e.g., 746) corresponding to the indication), the computer system (e.g., 700a) displays, via the display generation component (e.g., 702a), a confirmation user interface (e.g., user interface 7048 as shown in FIG. 7W) including: an accept option (e.g., 738a) that, when selected, accepts the second user identity becoming a joint owner of the account, and a decline option (e.g., 740a) that, when selected, declines the second user identity becoming a joint owner of the account. In some embodiments, an input corresponding to selection of the accept option is detected (e.g., a tap gesture), and in response to detecting the input, a process is initiated to make the second user identity a joint owner of the account. In some embodiments, an input corresponding to selection of the decline option is detected (e.g., a tap gesture), and in response to detecting the input, the second user identity is not made a joint owner of the account. Displaying options to accept or decline another user identity from becoming a joint owner of the account provides enhanced control over whether to allow the other user identity to become a joint owner (e.g., after viewing new terms, credit limit, and/or percentage rate for a jointly owned account). Providing enhanced control enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Further, providing the user with options to proceed with or decline joint ownership enables the computer system to receive user confirmation before providing two accounts with joint access to the same resource, thereby making the account more secure. This is particularly beneficial when the resource includes private information, such as a private files or private spending details.

In some embodiments, after transmitting the request to invite the second user identity to become a participant of the account without becoming a joint owner of the account (e.g., as shown in FIG. 7AA), the computer system (e.g., 700a) receives an indication that the second user identity has accepted the invitation to become a participant of the account. In some embodiments, after receiving the indication, the computer system (e.g., 700a) displays, via the display generation component (e.g., 702a), a notification (e.g., 756) that the account is shared with the second user identity. Displaying a notification that the account is shared with another user identity provides feedback about the status of the account. For example, the user of the computer system is made aware that an additional user has access to the resources of the account. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, joint owners of the account have access to transaction and balance information of all participants and owners of the account (e.g., as shown in FIGS. 7AP-7AR) (e.g., when a user becomes a joint owner of an account, that user can access past transactions authorized by any other joint owner of the account and past transactions authorized by any other participant (non-joint owner) of the account). In some embodiments, joint owners of the account have access to a payment interface (e.g., by selecting a payment affordance) to make payments to the account. Providing joint owners of the account with access to transaction and balance information of all participants and owners of the account provides enhanced control over the account to the joint owners and improves feedback about the status of the account. Providing enhanced control and improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a respective participant of the account that is not a joint owner of the account has access to transaction information for the respective participant without having access to transaction information (and, in some embodiments, balance information) for other participants or owners (e.g., the sole owner, multiple joint owners) of the account (e.g., as shown in FIGS. 7AX and 7AY) (e.g., when a user becomes a participant of an account, that user can access their own past transactions but not transactions of other participants or owners). In some embodiments, participants of the account that are not joint owners of the account have access to an installment payment option that allows participants to pay for a transaction using installment payments. In some embodiments, joint owners of the account have access to information about the installment payments. Providing a respective participant of the account with access to transaction information for the respective participant without providing access to transaction information for other participants or owners of the account provides enhanced control over the information that is available to the respective participant. Further, the limited access further enables the security of the account, particularly when the contents/resources of the account includes private information, such as a private files or private spending details. Providing enhanced control enhances the operability of the device and makes the user-device interface more secure and efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a respective participant of the account that is not a joint owner of the account has access to transaction information for the respective participant and available credit information for the account without having access to transaction information for other participants or owners (e.g., the sole owner, multiple joint owners) of the account (e.g., as shown in FIGS. 7AZ and 7BA) (e.g., when a user becomes a participant of an account (and, in some embodiments, is over 18), that user can access their own past transactions and view the available credit for the account, but cannot view transactions of other participants or owners). In some embodiments, the computer system (e.g., 700*a*) displays a user-selectable option (e.g., a toggle) to enable/disable providing a participant of the account with available credit information (e.g., a balance of the account, the remaining resources of the account). While displaying the user-selectable option, the computer system (e.g., 700*a*) receives input directed to the user-selectable option. In accordance with a determination that the input directed to the user-selectable option corresponds to a request to disable providing the participant of the account with available credit information, the computer system (e.g., 700*a*) causes the participant of the account to not be provided with available credit information. In accordance with a determination that the input directed to the user-selectable option corresponds to a request to enable providing the participant of the account with available credit information, the computer system (e.g., 700*a*) causes the participant of the account to be provided with available credit information. Providing a respective participant of the account with access to transaction information for the respective participant and available credit information for the account without providing access to transaction information for other participants or owners of the account provides enhanced control over the information that is available to the respective participant. Providing enhanced control enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 700*a*) concurrently displays, via the display generation component (e.g., 702*a*), spending information for a plurality of user identities associated with the account (e.g. participants and owners of the account) over a predetermined time period (e.g., daily spend, weekly spend, monthly spend) (e.g., as shown in FIGS. 7AP, 7AR, and 7AT). In some embodiments, concurrently displaying spending information for the plurality of user identities associated with the account over the predetermined time period includes displaying a first transaction (and, optionally, a second transaction) (using the account) that was initiated by the first user identity and a third transaction (and, optionally, a fourth transaction) (using the account) that was initiated by the second user identity. In some embodiments, the first, second, third, and fourth transaction are displayed based on being within the selected predetermined time period. In some embodiments, the computer system receives user input selecting a second predetermined time period and a plurality of transactions of the account (initiated by the first and second user identities) are concurrently displayed, without displaying transactions of the account that were not initiated within the second predetermined time period. In some embodiments, a selection of a respective user identity is detected (e.g., 749) (e.g., a tap input on a respective identity user interface object), and in response to detecting the selection, spending information for the respective user identity over the predetermined time period is displayed without displaying spending information for other user identities associated with the account (e.g., as shown in FIG. 7AU). In some embodiments, a search interface is displayed (e.g., as shown in FIG. 7AV), where the search interface includes concurrently displaying spending information for a plurality of user identities associated with the account (e.g. participants and owners of the account). Concurrently displaying spending information for a plurality of user identities associated with the account provides improved visual feedback about the status of the account (e.g., by indicating the amount spent by each user identity). Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 700*a*) displays, via the display generation component (e.g., 702*a*), a settings interface (e.g., 7060*a* as shown in FIG. 7AG; 7060*b* as shown in FIG. 7AI) including an option (e.g., 762*a*, 762*b*) that, when enabled, enables notifications to be provided when (e.g., each time) the account is used (e.g., used by the first user identity, used by the second identity, used by a participant, and/or used by a joint owner). In some embodiments, while the option is disabled, the computer system detects a user input to enable the option (e.g., a tap or swipe gesture on the option), and in response to detecting the user input to enable the option, the computer system enables notifications to be displayed via the display generation component when (e.g., each time) the account is used (e.g., used by the first user identity, used by a second user identity, used by a participant, and/or used by a joint owner). Displaying an option that enables notifications to be displayed when the account is used provides enhanced control over what information is provided to an owner of the account. Providing enhanced control enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Further, enabling receiving notifications when the account is used reduces or eliminates the need for the user to navigate various user interfaces and provide user inputs to review transactions, thereby reducing the number of inputs needed to determine that the transaction was used. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 700*a*) displays, via the display generation component (e.g., 702*a*), a settings interface (e.g., 7062 as shown in FIG. 7AH) including an option for selecting a transaction amount threshold (e.g., over $10, over $50, over $100, over a custom amount, no threshold (e.g., all transactions cause a notification)), where transaction amounts that exceed the transaction amount threshold cause a notification to be provided. In some embodiments, the computer system detects a user input corresponding to a selection of a respective transaction amount threshold. In some embodiments, after detecting the user input corresponding to the selection of the respective transaction amount threshold and in accordance with a determination that a transaction has been completed that exceeds the transaction amount threshold, the computer system provides a notification corresponding to the transaction (e.g., 780*a* as shown in FIG. 7AN) (e.g., a notification of the amount of the transaction and a merchant where the transaction occurred). In some embodiments, after detecting the user input corresponding to the selection of the respective transaction amount threshold and in accordance with a determination that a transaction has been completed that does not exceed the transaction amount threshold, the computer system forgoes providing a notification corresponding to the transaction. Displaying an option for selecting a transaction amount threshold provides enhanced control over what information is provided to an owner of the account. Providing enhanced control enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Further, enabling receiving notifications when the account is used in a transaction that exceeds a threshold reduces or eliminates the need for the user to navigate various user interfaces and provide user inputs to review transactions, thereby reducing the number of inputs needed to determine that the transaction was used. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 700*a*) displays, via the display generation component (e.g., 702*a*), a notification including a summary of a transaction (e.g., 780*a* as shown in FIG. 7AN) (e.g., by the first user identity, by the second user identity, by a participant, and/or by a joint owner). In some embodiments, the computer system detects, via the one or more input devices, a request (e.g., 739) (e.g., a long press on the notification) to view detailed information for the transaction, and in response to detecting the request to view detailed information for the transaction, the computer system displays the detailed information for the transaction (e.g., 780*b* as shown in FIG. 7AO) (e.g., merchant information, card information, and/or total spending for the month). In some embodiments, a tap gesture on the notification (e.g., 780*a* as shown in FIG. 7AN) is detected, and, in response to detecting the tap gesture, an application associated with the account (e.g., a wallet application) is displayed. Displaying a notification including a summary of a transaction and displaying detailed information for the transaction provides improved visual feedback about the status of the account (e.g., by indicating that a transaction with the account has occurred). Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 700*a*) displays, via the display generation component (e.g., 702*a*), a notification indicating that a transaction limit (e.g., a per transaction spending limit and/or a total spending limit over a set duration (e.g., a daily limit, a weekly limit, and/or a monthly limit)) for the account has been exceeded. Displaying a notification indicating that a transaction limit for the account has been exceeded provides improved visual feedback about the status of the account (e.g., by indicating that a transaction with the account has occurred). Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 700*a*) displays, via the display generation component (e.g., 702*a*), a settings interface (e.g., 7060*b* as shown in FIGS. 7AI and 7AJ) including an option (e.g., lock option 770) that, when selected, disables a respective participant of the account from using the account for transactions while continuing to share the account with the respective participant. In some embodiments, the computer system detects a user input corresponding to selection of the option (e.g., a tap gesture on the option), and in response to detecting the user input corresponding to selection of the option, the computer system disables the respective participant of the account from using the account for transactions while continuing to share the account with the respective participant (e.g., the respective participant can view previous transactions, but cannot use the account for new transactions). Displaying an option for disabling a respective participant of the account from using the account for transactions while continuing to share the account with the respective participant provides enhanced control over how the account is used by the respective participant. Providing enhanced control enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Further, disabling the respective participant of the account from using the account without being removed as a participant of the account enables the computer system to secure the account (by not allowing transactions) while continuing to provide the participant with reduced access, such as reviewing past transactions of the participant, thereby making the account more secure.

In some embodiments, the computer system (e.g., 700*a*) displays, via the display generation component (e.g., 702*a*), a settings interface (e.g., 7060*b* as shown in FIGS. 7AI and 7AJ) including an option (e.g., stop sharing option 772) that, when selected, ceases sharing of the account with a respective participant. In some embodiments, the computer system detects a user input (e.g., 735) corresponding to selection of the option (e.g., a tap gesture on the option), and in response to detecting the user input corresponding to selection of the option, the computer system ceases sharing of the account with the respective participant (e.g., the respective participant cannot view previous transactions or use the account for new transactions and/or is no longer a participant of the account). Displaying an option for ceasing sharing of the account with a respective participant provides enhanced control over how the account is used by the respective participant. Providing enhanced control enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Further, ceasing sharing the account with the respective participant enables the computer system to secure the account (e.g., by not allowing transactions by the participant and/or others to be accessed by the participant), thereby making the account more secure.

In some embodiments, the computer system (e.g., 700*a*) displays, via the display generation component (e.g., 702*a*), a settings interface (e.g., 7060*a* as shown in FIG. 7AG) including an option that, when selected, ceases sharing of the account with a respective joint owner. In some embodiments, the computer system detects a user input corresponding to selection of the option (e.g., a tap gesture on the option), and in response to detecting the user input corresponding to selection of the option, the computer system ceases sharing of the account with the respective joint owner (e.g., the respective joint owner cannot view previous transactions or use the account for new transactions and/or is no longer a joint owner of the account). In some embodiments, ceasing to share the account a joint owner closes the account for all users. Displaying an option for ceasing sharing of the account with a respective joint owner provides enhanced control over how the account is used by the respective joint owner. Providing enhanced control enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Further, ceasing sharing the account with the joint owner enables the computer system to secure the account (e.g., by not allowing transactions by the joint owner and/or others to be accessed by the joint owner), thereby making the account more secure.

In some embodiments, the computer system (e.g., 700*a*) displays, via the display generation component (e.g., 702*a*), one or more affordances corresponding to one or more user identities to which the account is being shared (e.g., 799*a*-799*c* as shown in FIG. 7AT). In some embodiments, the computer system detects, via the one or more input devices, an input (e.g., 749) corresponding to a selection of a respective affordance (e.g., 799*b*) of the one or more affordances, the respective affordance corresponding to a respective user identity. In some embodiments, in response to detecting the input corresponding to a selection of the respective affordance, the computer system displays, via the display generation component, transaction information associated with (e.g., transaction information for transactions initiated by) the respective user identity (e.g., a list of transactions over a set time period (e.g., a day, a week, a month)) (e.g., as shown in FIG. 7AU). Displaying transaction information associated with a respective user identity provides improved visual feedback about the status of the account (e.g., by indicating what transactions the respective user identity has performed). Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 700*a*) displays, via the display generation component (e.g., 702*a*), a plurality (e.g., list) of transactions for the account (e.g., as shown in FIGS. 7AP-7AR). In some embodiments, a first transaction of the plurality of transactions includes an indication of a respective user identity (e.g., a name of a family member) corresponding to the first transaction (e.g., based on the first transaction having been initiated by the respective user identity), and a second transaction of the plurality of transactions includes an indication of a respective user identity (different from the user identity corresponding to the first transactions) corresponding to the second transaction (e.g., based on the second transaction having been initiated by the respective user identity). In some embodiments, a third transaction of the plurality of transactions forgoes including an indication of a respective user identity corresponding to the third transaction based on the third transaction having been initiated by the first user identity (e.g., the owner of the computer system and/or account). Displaying an indication of a respective user identity corresponding to each transaction provides improved visual feedback about each transaction (e.g., by indicating who performed the transaction). Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to share an account with another user identity and to view/configure the shared account. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to view account information and available user identities to which the account can be shared. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing an account, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an account can be shared with another user identity based on non-personal information data or a bare minimum amount of personal information, such as the content being requested by the device associated with a user, other non-personal information available to the service provider of the account, or publicly available information.

What is claimed is:

1. A computer system associated with a first user identity, comprising:
   a display generation component;
   one or more input devices;
   one or more processors; and
   memory storing one or more programs configured to be executed by the one or more processors, the one or more programs including instructions for:
   displaying, via the display generation component, a user interface for sharing an account associated with the first user identity with a second user identity, the user interface including a first sharing option and a second sharing option;

detecting, via the one or more input devices, one or more inputs corresponding to a request to share the account; and in response to detecting the one or more inputs corresponding to the request to share the account:

in accordance with a determination that the one or more inputs include a selection of the first sharing option, transmitting a request to invite the second user identity to become a joint owner of the account, wherein a respective joint owner of the account has access to transaction and balance information of all participants and owners of the account; and in accordance with a determination that the one or more inputs include a selection of the second sharing option, transmitting a request to invite the second user identity to become a participant of the account without becoming a joint owner of the account, wherein a respective participant of the account that is not a joint owner of the account has access to view spending transactions completed by the respective participant using funds from the account without having access to view spending transactions completed by other participants or owners of the account;

wherein accepting an invitation to become a respective participant of the account without becoming a joint owner of the account enables a computer system associated with the second user identity to display an account details user interface that concurrently includes a plurality of spending transactions completed by the second user identity using funds from the account.

2. The computer system of claim 1, wherein the one or more programs further include instructions for:

prior to displaying the first sharing option and the second sharing option, displaying, via the display generation component, one or more identity user interface objects corresponding to one or more user identities available for sharing the account with, wherein the one or more identity user interface objects includes an identity user interface object corresponding to the second user identity; and while displaying the one or more identity user interface objects, detecting, via the one or more input devices, a user input directed to a respective identity user interface object of the one or more identity user interface objects, wherein the user interface for sharing the account with the second user identity is displayed in response to receiving the user input directed to the respective identity user interface object and in accordance with a determination that the respective identity user interface object corresponds to the second user identity.

3. The computer system of claim 1, wherein the one or more programs further include instructions for:

in accordance with a determination that the one or more inputs include a selection of the second sharing option, displaying, via the display generation component, an option to configure a transaction limit for the second user identity.

4. The computer system of claim 3, wherein the transaction limit is a per-transaction limit.

5. The computer system of claim 1, wherein the one or more programs further include instructions for:

after transmitting the request to invite the second user identity to become a joint owner of the account, receiving an indication that the second user identity has accepted the request to become a joint owner of the account; and after receiving the indication, displaying, via the display generation component, a confirmation user interface including:

an accept option that, when selected, accepts the second user identity becoming a joint owner of the account, and a decline option that, when selected, declines the second user identity becoming a joint owner of the account.

6. The computer system of claim 1, wherein the one or more programs further include instructions for:

after transmitting the request to invite the second user identity to become a participant of the account without becoming a joint owner of the account, receiving an indication that the second user identity has accepted the request to become a participant of the account; and after receiving the indication, displaying, via the display generation component, a notification that the account is shared with the second user identity.

7. The computer system of claim 1, wherein a respective participant of the account that is not a joint owner of the account has access to transaction information for the respective participant and available credit information for the account without having access to transaction information for other participants or owners of the account.

8. The computer system of claim 1, wherein the one or more programs further include instructions for:

concurrently displaying, via the display generation component, spending information for a plurality of user identities associated with the account over a predetermined time period.

9. The computer system of claim 1, wherein the one or more programs further include instructions for:

displaying, via the display generation component, a settings interface including an option that, when enabled, enables notifications to be provided when the account is used;

while the option is disabled, detecting a user input to enable the option; and in response to detecting the user input to enable the option, enabling notifications to be displayed via the display generation component when the account is used.

10. The computer system of claim 1, wherein the one or more programs further include instructions for:

displaying, via the display generation component, a settings interface including an option for selecting a transaction amount threshold, wherein transaction amounts that exceed the transaction amount threshold cause a notification to be provided;

detecting a user input corresponding to a selection of a respective transaction amount threshold;

after detecting the user input corresponding to the selection of the respective transaction amount threshold:

in accordance with a determination that a transaction has been completed that exceeds the transaction amount threshold, providing a notification corresponding to the transaction; and in accordance with a determination that a transaction has been completed that does not exceed the transaction amount threshold, forgoing providing a notification corresponding to the transaction.

11. The computer system of claim 1, wherein the one or more programs further include instructions for:
displaying, via the display generation component, a notification including a summary of a transaction;
detecting, via the one or more input devices, a request to view detailed information for the transaction; and
in response to detecting the request to view detailed information for the transaction, displaying the detailed information for the transaction.

12. The computer system of claim 1, wherein the one or more programs further include instructions for:
displaying, via the display generation component, a notification indicating that a transaction limit for the account has been exceeded.

13. The computer system of claim 1, wherein the one or more programs further include instructions for:
displaying, via the display generation component, a settings interface including an option that, when selected, disables a respective participant of the account from using the account for transactions while continuing to share the account with the respective participant;
detecting a user input corresponding to selection of the option; and
in response to detecting the user input corresponding to selection of the option, disabling the respective participant of the account from using the account for transactions while continuing to share the account with the respective participant.

14. The computer system of claim 1, wherein the one or more programs further include instructions for:
displaying, via the display generation component, a settings interface including an option that, when selected, ceases sharing of the account with a respective participant;
detecting a user input corresponding to selection of the option; and
in response to detecting the user input corresponding to selection of the option, ceasing sharing of the account with the respective participant.

15. The computer system of claim 1, wherein the one or more programs further include instructions for:
displaying, via the display generation component, a settings interface including an option that, when selected, ceases sharing of the account with a respective joint owner;
detecting a user input corresponding to selection of the option; and
in response to detecting the user input corresponding to selection of the option, ceasing sharing of the account with the respective joint owner.

16. The computer system of claim 1, wherein the one or more programs further include instructions for:
displaying, via the display generation component, one or more affordances corresponding to one or more user identities to which the account is being shared;
detecting, via the one or more input devices, an input corresponding to a selection of a respective affordance of the one or more affordances, the respective affordance corresponding to a respective user identity; and
in response to detecting the input corresponding to a selection of the respective affordance, displaying, via the display generation component, transaction information associated with the respective user identity.

17. The computer system of claim 1, wherein the one or more programs further include instructions for:
displaying, via the display generation component, a plurality of transactions for the account, wherein:
a first transaction of the plurality of transactions includes an indication of a respective user identity corresponding to the first transaction; and
a second transaction of the plurality of transactions includes an indication of a respective user identity corresponding to the second transaction.

18. The computer system of claim 1, wherein:
the request to invite the second user identity to become a joint owner is transmitted via a wireless antenna; and
the request to invite the second user identity to become a participant of the account without becoming a joint owner of the account is transmitted via a wireless antenna; and
the one or more programs further including instructions for:
receiving, via the wireless antenna, an indication that the second user identity has accepted an invitation to become a joint owner of the account or an invitation to become a participant of the account;
after receiving the indication that the second user identity has accepted the invitation to become a joint owner of the account or the invitation to become a participant of the account, displaying, via the display generation component, a notification of a transaction by the second user identity, wherein the notification of the transaction by the second user identity is displayed within a second user interface;
detecting, via the one or more input devices, a second input corresponding to the notification of the transaction by the second user identity; and
in response to detecting the second input corresponding to the notification of the transaction by the second user identity:
in accordance with a determination that the second input is a first type of input, displaying a third user interface corresponding to an application associated with the account; and
in accordance with a determination that the second input is a second type of input, displaying, within the second user interface, a second notification including detailed information for the transaction completed by the second user identity.

19. A non-transitory computer-readable storage medium storing one or more programs configured to be executed by one or more processors of a computer system associated with a first user identity that is in communication with a display generation component and one or more input devices, the one or more programs including instructions for:
displaying, via the display generation component, a user interface for sharing an account associated with the first user identity with a second user identity, the user interface including a first sharing option and a second sharing option;
detecting, via the one or more input devices, one or more inputs corresponding to a request to share the account; and
in response to detecting the one or more inputs corresponding to the request to share the account:
in accordance with a determination that the one or more inputs include a selection of the first sharing option, transmitting a request to invite the second user identity to become a joint owner of the account, wherein a respective joint owner of the account has access to transaction and balance information of all participants and owners of the account; and in accordance with a determination that the one or more inputs include a selection of the second sharing option, transmitting a request to invite the second user identity to become a participant of the account without becoming a joint owner of the account, wherein a respective participant of the account that is not a joint owner of the account has access to view spending transactions completed by the respective participant using funds from the account without having access to view spending transactions completed by other participants or owners of the account;

wherein accepting an invitation to become a respective participant of the account without becoming a joint owner of the account enables a computer system associated with the second user identity to display an account details user interface that concurrently includes a plurality of spending transactions completed by the second user identity using funds from the account.

20. The non-transitory computer-readable storage medium of claim 19, wherein the one or more programs further include instructions for:

prior to displaying the first sharing option and the second sharing option, displaying, via the display generation component, one or more identity user interface objects corresponding to one or more user identities available for sharing the account with, wherein the one or more identity user interface objects includes an identity user interface object corresponding to the second user identity; and while displaying the one or more identity user interface objects, detecting, via the one or more input devices, a user input directed to a respective identity user interface object of the one or more identity user interface objects, wherein the user interface for sharing the account with the second user identity is displayed in response to receiving the user input directed to the respective identity user interface object and in accordance with a determination that the respective identity user interface object corresponds to the second user identity.

21. The non-transitory computer-readable storage medium of claim 19, wherein the one or more programs further include instructions for:

in accordance with a determination that the one or more inputs include a selection of the second sharing option, displaying, via the display generation component, an option to configure a transaction limit for the second user identity.

22. The non-transitory computer-readable storage medium of claim 21, wherein the transaction limit is a per-transaction limit.

23. The non-transitory computer-readable storage medium of claim 19, wherein the one or more programs further include instructions for:

after transmitting the request to invite the second user identity to become a joint owner of the account, receiving an indication that the second user identity has accepted the request to become a joint owner of the account; and after receiving the indication, displaying, via the display generation component, a confirmation user interface including:

an accept option that, when selected, accepts the second user identity becoming a joint owner of the account, and a decline option that, when selected, declines the second user identity becoming a joint owner of the account.

24. The non-transitory computer-readable storage medium of claim 19, wherein the one or more programs further include instructions for:

after transmitting the request to invite the second user identity to become a participant of the account without becoming a joint owner of the account, receiving an indication that the second user identity has accepted the request to become a participant of the account; and after receiving the indication, displaying, via the display generation component, a notification that the account is shared with the second user identity.

25. The non-transitory computer-readable storage medium of claim 19, wherein a respective participant of the account that is not a joint owner of the account has access to transaction information for the respective participant and available credit information for the account without having access to transaction information for other participants or owners of the account.

26. The non-transitory computer-readable storage medium of claim 19, wherein the one or more programs further include instructions for:

concurrently displaying, via the display generation component, spending information for a plurality of user identities associated with the account over a predetermined time period.

27. The non-transitory computer-readable storage medium of claim 19, wherein the one or more programs further include instructions for:

displaying, via the display generation component, a settings interface including an option that, when enabled, enables notifications to be provided when the account is used;

while the option is disabled, detecting a user input to enable the option; and in response to detecting the user input to enable the option, enabling notifications to be displayed via the display generation component when the account is used.

28. The non-transitory computer-readable storage medium of claim 19, wherein the one or more programs further include instructions for:

displaying, via the display generation component, a settings interface including an option for selecting a transaction amount threshold, wherein transaction amounts that exceed the transaction amount threshold cause a notification to be provided;

detecting a user input corresponding to a selection of a respective transaction amount threshold;

after detecting the user input corresponding to the selection of the respective transaction amount threshold:

in accordance with a determination that a transaction has been completed that exceeds the transaction amount threshold, providing a notification corresponding to the transaction; and in accordance with a determination that a transaction has been completed that does not exceed the transaction amount threshold, forgoing providing a notification corresponding to the transaction.

29. The non-transitory computer-readable storage medium of claim 19, wherein the one or more programs further include instructions for:

displaying, via the display generation component, a notification including a summary of a transaction;

detecting, via the one or more input devices, a request to view detailed information for the transaction; and in response to detecting the request to view detailed information for the transaction, displaying the detailed information for the transaction.

30. The non-transitory computer-readable storage medium of claim 19, wherein the one or more programs further include instructions for:

displaying, via the display generation component, a notification indicating that a transaction limit for the account has been exceeded.

31. The non-transitory computer-readable storage medium of claim 19, wherein the one or more programs further include instructions for:

displaying, via the display generation component, a settings interface including an option that, when selected, disables a respective participant of the account from using the account for transactions while continuing to share the account with the respective participant;

detecting a user input corresponding to selection of the option; and in response to detecting the user input corresponding to selection of the option, disabling the respective participant of the account from using the account for transactions while continuing to share the account with the respective participant.

32. The non-transitory computer-readable storage medium of claim 19, wherein the one or more programs further include instructions for:

displaying, via the display generation component, a settings interface including an option that, when selected, ceases sharing of the account with a respective participant;

detecting a user input corresponding to selection of the option; and in response to detecting the user input corresponding to selection of the option, ceasing sharing of the account with the respective participant.

33. The non-transitory computer-readable storage medium of claim 19, wherein the one or more programs further include instructions for:

displaying, via the display generation component, a settings interface including an option that, when selected, ceases sharing of the account with a respective joint owner;

detecting a user input corresponding to selection of the option; and in response to detecting the user input corresponding to selection of the option, ceasing sharing of the account with the respective joint owner.

34. The non-transitory computer-readable storage medium of claim 19, wherein the one or more programs further include instructions for:

displaying, via the display generation component, one or more affordances corresponding to one or more user identities to which the account is being shared;

detecting, via the one or more input devices, an input corresponding to a selection of a respective affordance of the one or more affordances, the respective affordance corresponding to a respective user identity; and in response to detecting the input corresponding to a selection of the respective affordance, displaying, via the display generation component, transaction information associated with the respective user identity.

35. The non-transitory computer-readable storage medium of claim 19, wherein the one or more programs further include instructions for:

displaying, via the display generation component, a plurality of transactions for the account, wherein:

a first transaction of the plurality of transactions includes an indication of a respective user identity corresponding to the first transaction; and a second transaction of the plurality of transactions includes an indication of a respective user identity corresponding to the second transaction.

36. The non-transitory computer-readable storage medium of claim 19, wherein:

the request to invite the second user identity to become a joint owner is transmitted via a wireless antenna; and the request to invite the second user identity to become a participant of the account without becoming a joint owner of the account is transmitted via a wireless antenna; and the one or more programs further including instructions for:

receiving, via the wireless antenna, an indication that the second user identity has accepted an invitation to become a joint owner of the account or an invitation to become a participant of the account;

after receiving the indication that the second user identity has accepted the invitation to become a joint owner of the account or the invitation to become a participant of the account, displaying, via the display generation component, a notification of a transaction by the second user identity, wherein the notification of the transaction by the second user identity is displayed within a second user interface;

detecting, via the one or more input devices, a second input corresponding to the notification of the transaction by the second user identity; and in response to detecting the second input corresponding to the notification of the transaction by the second user identity:

in accordance with a determination that the second input is a first type of input, displaying a third user interface corresponding to an application associated with the account; and in accordance with a determination that the second input is a second type of input, displaying, within the second user interface, a second notification including detailed information for the transaction completed by the second user identity.

37. A method, comprising:

at a computer system associated with a first user identity that is in communication with a display generation component and one or more input devices:

displaying, via the display generation component, a user interface for sharing an account associated with the first user identity with a second user identity, the user interface including a first sharing option and a second sharing option;

detecting, via the one or more input devices, one or more inputs corresponding to a request to share the account; and in response to detecting the one or more inputs corresponding to the request to share the account:

in accordance with a determination that the one or more inputs include a selection of the first sharing option, transmitting a request to invite the second user identity to become a joint owner of the account, wherein a respective joint owner of the account has access to transaction and balance information of all participants and owners of the account; and in accordance with a determination that the one or more inputs include a selection of the second sharing option, transmitting a request to invite the second user identity to become a participant of the account without becoming a joint owner of the account, wherein a respective participant of the account that is not a joint owner of the account has access to view spending transactions completed by the respective participant using funds from the account without having access to view spending transactions completed by other participants or owners of the account:

wherein accepting an invitation to become a respective participant of the account without becoming a joint owner of the account enables a computer system associated with the second user identity to display an account details user interface that concurrently includes a plurality of spending transactions completed by the second user identity using funds from the account.

38. The method of claim 37, further comprising:
prior to displaying the first sharing option and the second sharing option, displaying, via the display generation component, one or more identity user interface objects corresponding to one or more user identities available for sharing the account with, wherein the one or more identity user interface objects includes an identity user interface object corresponding to the second user identity; and
while displaying the one or more identity user interface objects, detecting, via the one or more input devices, a user input directed to a respective identity user interface object of the one or more identity user interface objects,
wherein the user interface for sharing the account with the second user identity is displayed in response to receiving the user input directed to the respective identity user interface object and in accordance with a determination that the respective identity user interface object corresponds to the second user identity.

39. The method of claim 37, further comprising:
in accordance with a determination that the one or more inputs include a selection of the second sharing option, displaying, via the display generation component, an option to configure a transaction limit for the second user identity.

40. The method of claim 39, wherein the transaction limit is a per-transaction limit.

41. The method of claim 37, further comprising:
after transmitting the request to invite the second user identity to become a joint owner of the account, receiving an indication that the second user identity has accepted the request to become a joint owner of the account; and
after receiving the indication, displaying, via the display generation component, a confirmation user interface including:
an accept option that, when selected, accepts the second user identity becoming a joint owner of the account, and
a decline option that, when selected, declines the second user identity becoming a joint owner of the account.

42. The method of claim 37, further comprising:
after transmitting the request to invite the second user identity to become a participant of the account without becoming a joint owner of the account, receiving an indication that the second user identity has accepted the request to become a participant of the account; and
after receiving the indication, displaying, via the display generation component, a notification that the account is shared with the second user identity.

43. The method of claim 37, wherein a respective participant of the account that is not a joint owner of the account has access to transaction information for the respective participant and available credit information for the account without having access to transaction information for other participants or owners of the account.

44. The method of claim 37, further comprising:
concurrently displaying, via the display generation component, spending information for a plurality of user identities associated with the account over a predetermined time period.

45. The method of claim 37, further comprising:
displaying, via the display generation component, a settings interface including an option that, when enabled, enables notifications to be provided when the account is used;
while the option is disabled, detecting a user input to enable the option; and
in response to detecting the user input to enable the option, enabling notifications to be displayed via the display generation component when the account is used.

46. The method of claim 37, further comprising:
displaying, via the display generation component, a settings interface including an option for selecting a transaction amount threshold, wherein transaction amounts that exceed the transaction amount threshold cause a notification to be provided;
detecting a user input corresponding to a selection of a respective transaction amount threshold;
after detecting the user input corresponding to the selection of the respective transaction amount threshold:
in accordance with a determination that a transaction has been completed that exceeds the transaction amount threshold, providing a notification corresponding to the transaction; and
in accordance with a determination that a transaction has been completed that does not exceed the transaction amount threshold, forgoing providing a notification corresponding to the transaction.

47. The method of claim 37, further comprising:
displaying, via the display generation component, a notification including a summary of a transaction;
detecting, via the one or more input devices, a request to view detailed information for the transaction; and
in response to detecting the request to view detailed information for the transaction, displaying the detailed information for the transaction.

48. The method of claim 37, further comprising:
displaying, via the display generation component, a notification indicating that a transaction limit for the account has been exceeded.

49. The method of claim 37, further comprising:
displaying, via the display generation component, a settings interface including an option that, when selected, disables a respective participant of the account from using the account for transactions while continuing to share the account with the respective participant;

detecting a user input corresponding to selection of the option; and in response to detecting the user input corresponding to selection of the option, disabling the respective participant of the account from using the account for transactions while continuing to share the account with the respective participant.

50. The method of claim 37, further comprising:

displaying, via the display generation component, a settings interface including an option that, when selected, ceases sharing of the account with a respective participant;

detecting a user input corresponding to selection of the option; and in response to detecting the user input corresponding to selection of the option, ceasing sharing of the account with the respective participant.

51. The method of claim 37, further comprising:

displaying, via the display generation component, a settings interface including an option that, when selected, ceases sharing of the account with a respective joint owner;

detecting a user input corresponding to selection of the option; and in response to detecting the user input corresponding to selection of the option, ceasing sharing of the account with the respective joint owner.

52. The method of claim 37, further comprising:

displaying, via the display generation component, one or more affordances corresponding to one or more user identities to which the account is being shared;

detecting, via the one or more input devices, an input corresponding to a selection of a respective affordance of the one or more affordances, the respective affordance corresponding to a respective user identity; and in response to detecting the input corresponding to a selection of the respective affordance, displaying, via the display generation component, transaction information associated with the respective user identity.

53. The method of claim 37, further comprising:

displaying, via the display generation component, a plurality of transactions for the account, wherein:

a first transaction of the plurality of transactions includes an indication of a respective user identity corresponding to the first transaction; and a second transaction of the plurality of transactions includes an indication of a respective user identity corresponding to the second transaction.

54. The method of claim 37, wherein:

the request to invite the second user identity to become a joint owner is transmitted via a wireless antenna; and the request to invite the second user identity to become a participant of the account without becoming a joint owner of the account is transmitted via a wireless antenna; and the method further comprising:

receiving, via the wireless antenna, an indication that the second user identity has accepted an invitation to become a joint owner of the account or an invitation to become a participant of the account;

after receiving the indication that the second user identity has accepted the invitation to become a joint owner of the account or the invitation to become a participant of the account, displaying, via the display generation component, a notification of a transaction by the second user identity, wherein the notification of the transaction by the second user identity is displayed within a second user interface;

detecting, via the one or more input devices, a second input corresponding to the notification of the transaction by the second user identity; and in response to detecting the second input corresponding to the notification of the transaction by the second user identity:

in accordance with a determination that the second input is a first type of input, displaying a third user interface corresponding to an application associated with the account; and in accordance with a determination that the second input is a second type of input, displaying, within the second user interface, a second notification including detailed information for the transaction completed by the second user identity.

* * * * *

UNITED STATES PATENT AND TRADEMARK OFFICE
CERTIFICATE OF CORRECTION

| | | |
|---|---|---|
| PATENT NO. | : 11,868,461 B2 | |
| APPLICATION NO. | : 17/395251 | |
| DATED | : January 9, 2024 | |
| INVENTOR(S) | : Mischa McLachlan et al. | |

It is certified that error appears in the above-identified patent and that said Letters Patent is hereby corrected as shown below:

In the Claims

In Column 67, Line 15, Claim 37, delete "account:" and insert -- account; --, therefor.

Signed and Sealed this
Sixteenth Day of July, 2024

Katherine Kelly Vidal
*Director of the United States Patent and Trademark Office*